(12) United States Patent
Baskaran et al.

(10) Patent No.: US 11,962,999 B2
(45) Date of Patent: Apr. 16, 2024

(54) METHOD, UE, AND NETWORK FOR PROVIDING KDF NEGOTIATION

(71) Applicant: NEC Corporation, Tokyo (JP)

(72) Inventors: Sheeba Backia Mary Baskaran, Tamil Nadu (IN); Sivabalan Arumugam, Tamil Nadu (IN); Anand Raghawa Prasad, Tokyo (JP); Sander De Kievit, Tokyo (JP); Takahito Yoshizawa, Boom (BE); Hironori Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 184 days.

(21) Appl. No.: 17/288,968

(22) PCT Filed: Oct. 30, 2019

(86) PCT No.: PCT/JP2019/042573
§ 371 (c)(1),
(2) Date: Apr. 27, 2021

(87) PCT Pub. No.: WO2020/090886
PCT Pub. Date: May 7, 2020

(65) Prior Publication Data
US 2021/0409939 A1 Dec. 30, 2021

(30) Foreign Application Priority Data
Nov. 2, 2018 (IN) .............................. 201811041581

(51) Int. Cl.
*G06F 21/00* (2013.01)
*H04W 12/041* (2021.01)
(Continued)

(52) U.S. Cl.
CPC ..... *H04W 12/041* (2021.01); *H04W 12/0431* (2021.01); *H04W 12/06* (2013.01); *H04W 60/04* (2013.01)

(58) Field of Classification Search
CPC ........... H04W 12/041; H04W 12/0431; H04W 12/06; H04W 12/0471; H04W 60/04
See application file for complete search history.

(56) References Cited

U.S. PATENT DOCUMENTS 10,893,446 B2 * 1/2021 Xu ..................... H04W 36/0044
11,012,855 B2 * 5/2021 Wu .................... H04W 12/0431
(Continued)

FOREIGN PATENT DOCUMENTS

CN 101645877 A * 2/2010
CN 101645877 A 2/2010

OTHER PUBLICATIONS

B. E. Pencheva, I. Atanasov, I. Asenov and V. Trifonov, "Mobility Management as a Radio Access Network Service," 2019 10th IFIP International Conference on New Technologies, Mobility and Security (NTMS), Canary Islands, Spain, 2019, pp. 1-5, doi: 10.1109/NTMS.2019.8763816. (Year: 2019).*
(Continued)

*Primary Examiner* — Kendall Dolly
(74) *Attorney, Agent, or Firm* — Sughrue Mion, PLLC

(57) ABSTRACT

A method for providing a key derivation function (KDF) negotiation in a 5G network is provided. The method which includes: selecting a specific KDF at a UE and at the network for at least one security related key derivation; and transmitting, said selected KDF to the UE and to other network functions to indicate said selected KDF for generating specific security key at a receiver side.

9 Claims, 35 Drawing Sheets

(51) Int. Cl.
*H04W 12/0431* (2021.01)
*H04W 12/06* (2021.01)
*H04W 60/04* (2009.01)

(56) References Cited

U.S. PATENT DOCUMENTS

| | | | | |
|---|---|---|---|---|
| 11,297,502 | B2* | 4/2022 | Muhanna | H04L 63/205 |
| 2010/0159882 | A1* | 6/2010 | He | H04W 12/0431 |
| | | | | 455/411 |
| 2019/0159025 | A1* | 5/2019 | Ben Henda | H04W 36/14 |
| 2019/0182718 | A1* | 6/2019 | Shan | H04W 8/06 |
| 2019/0306251 | A1* | 10/2019 | Talebi Fard | H04W 76/10 |
| 2021/0144593 | A1* | 5/2021 | Ahn | H04W 36/0016 |
| 2021/0176672 | A1* | 6/2021 | Velev | H04W 36/0033 |
| 2022/0078692 | A1* | 3/2022 | Stojanovski | H04W 36/0022 |
| 2022/0104308 | A1* | 3/2022 | Talebi Fard | H04W 4/90 |

OTHER PUBLICATIONS

R. Bertolini and M. Maman, "Evaluating Handover Performance for End-to-End LTE Networks with OpenAirInterface," 2021 IEEE 94th Vehicular Technology Conference (VTC2021-Fall), Norman, OK, USA, 2021, pp. 1-5, doi: 10.1109/VTC2021-Fall52928.2021. 9625562. (Year: 2021).*

International Search Report for PCT Application No. PCT/JP2019/042573, dated Dec. 16, 2019.

3rd Generation Partnership Project, "Technical Specification Group Services and System Aspects; Vocabulary for 3GPP Specifications (Release 15)", 3GPP TR 21.905 V15.0.0, pp. 1-66, Mar. 2018.

Arkko et al., "Improved Extensible Authentication Protocol for 3rd Generation Authentication and Key Agreement (EAP-AKA')", RFC 5448, pp. 1-29, May 2009.

3rd Generation Partnership Project, "Technical Specification Group Services and System Aspects; Security architecture and procedures for 5G system (Release 15)", 3GPP TS 33.501 V15.2.0, pp. 1-176, Sep. 2018.

3rd Generation Partnership Project, "Technical Specification Group Services and System Aspects; Security architecture and procedures for 5G system (Release 15)", 3GPP TS 33.220 V15.3.0, pp. 1-176, Sep. 2018.

Arkko et al., "Extensible Authentication Protocol Method for 3rd Generation Authentication and Key Agreement (EAP-AKA)", RFC 4187, pp. 1-79, Jan. 2006.

NEC, "UE 5G Security Capability with KDF Identifiers", 3GPP S3-173328, 3GPP TSG SA WG3 (Security) Meeting #89, Reno, US, Nov. 27-Dec. 1, 2017.

Huawei et al., "A solution for KDF negotiation between UE and ARPF", 3GPP S3-161679, 3GPP TSG SA WG3 (Security) Meeting #85, Santa Cruz de Tenerife, Spain, Nov. 7-11, 2016.

* cited by examiner

METHOD, UE, AND NETWORK FOR PROVIDING KDF NEGOTIATION

This application is a National Stage Entry of PCT/JP2019/042573 filed on Oct. 30, 2019, which claims priority from Indian Patent Application 201811041581 filed on Nov. 2, 2018, the contents of all of which are incorporated herein by reference, in their entirety.

TECHNICAL FIELD

The present disclosure relates to a method, a user equipment, UE, and a network for providing key derivation function, KDF, negotiation.

BACKGROUND ART

In a 5th generation, 5G, system, EAP-AKA' and 5G AKA are the primary authentication methods. The EAP-AKA' has an inbuilt network initiated-KDF negotiation mechanism which helps to agree on a single KDF to support master security key generation and agreement. A person skilled in the art would appreciate that the master key would be only one of the keys in a 5G system and hence the NPL2 does not provide a full solution for KDF negotiation in the entire 5G system. As the existing systems such as a 4th generation, 4G, system, and a 5G system (Phase-1) which support only one KDF (HMAC-SHA-256), the KDF negotiated between the UE and the 5G core network using EAP-AKA' results in a single KDF selection (HMAC-SHA-256) and this KDF will be used in the UE and throughout all the network functions/entities in an operator network (both serving and the home network) to generate any 5G security key or context. Whereas, the existing 5G AKA authentication method does not support KDF negotiation and as there is only one KDF (HMAC-SHA 256) used in the 5GS, the 5G AKA will use the KDF (HMAC-SHA-256) for all key derivations involved in the 5G Security.

CITATION LIST

Non Patent Literature

NPL 1: 3GPP TR 21.905: "Vocabulary for 3GPP Specifications". V15.0.0 (2018-03)
NPL 2: RFC 5448: "Improved Extensible Authentication Protocol: 3GPP specifications"
NPL 3: 3GPP TS 33.501: "Security architecture and procedures for 5G system" V15.2.0 (2018-09)
NPL 4: 3GPP TS 33.220: "Generic Authentication Architecture (GAA); Generic Bootstrapping Architecture (GBA)"
NPL 5: RFC 4187: "Extensible Authentication Protocol Method for 3rd Generation Authentication and Key Agreement (EAP-AKA)"

SUMMARY OF INVENTION

Technical Problem

The current 5GS does not support KDF negotiation and related bidding down prevention. As the 5GS has a long lifetime expectation and a more diverse expected use, different (more secure, more efficient, tailored for a specific CPU architecture) KDF adaptations and negotiation to select the new algorithms on the KDF will be needed. The following are the sub-problems related to KDF negotiation and bidding down prevention.

The current 5GS does not support KDF negotiation as there is only one KDF (HMAC-SHA-256) supported in the 5GS. Therefore, it is very important that 5GS security architecture should have the ability to negotiate new algorithms as needed whenever possibly one of the algorithms is obsolete.

However, it is extremely difficult and to some extent impossible to update an algorithm which most of the time involves hardware updates and network element replacement, which can be very costly and time consuming in most cases.

Further, the current 4G system and 5G system use a single KDF for various security key generations (e.g. for cipher key, CK, derivation, integrity key, IK, derivation, master key derivation, intermediate key derivation, anchor key derivation, NAS security, AS security etc.). Even though the 5G system derives security keys at various levels and for various purposes, flexible KDF negotiation involving more than one KDF or cryptographic algorithm negotiation between the UE and various 5G network functions/entities is missing to support flexible key derivation (for example, using strong KDFs among weaker ones when supported at both of the UE and the network side).

Also, if any of the existing KDF negotiation mechanism similar to the one used in EAP-AKA' is adopted for the 5GS, then only a common KDF can be selected by the core network which will be used for all types of security key derivations involved in the 5GS. This does not give way for flexible KDF negotiation and key derivation between the UE and the various network entities/functions.

Further, if any one of the network function does not support a stronger KDF supported by all other network functions in a 5GS, then common KDF negotiation will lead to selection of a least common denominator KDF supported by all network functions and the UE. This weakens the security.

The EAP-AKA' used in the 5GS supports only network initiated KDF negotiation. The network initiated KDF negotiation will end up generating the CK', IK' and intermediate keys even before negotiation and agreeing on a KDF with the UE, which will lead to the unnecessary computational costs and authentication failures when the KDF suggested by the core network is not supported or accepted by the UE.

The unprotected UE/network security capabilities or KDF capabilities indicating support for more secured KDFs can be bid down deliberately by the less trusted AMF or serving network to indicate such that UE/network only supports weaker KDFs to make the UE and the 5GS agree on a weaker KDF or cryptographic algorithms to perform any security attack.

In view of the problems described above, the present disclosure aims to provide a solution to solve at least one of the various problems.

Solution to Problem

In an aspect of the present disclosure, a method for providing key derivation function, KDF, negotiation in a 5G network is provided. The method includes:
  obtaining UE KDF information;
  selecting a specific KDF at a core network for at least one security related key derivation;

transmitting, said selected KDF to the UE and to other network functions to indicate said selected KDF for generating a specific security key at a receiver side.

In another aspect of the present disclosure, a method for providing KDF negotiation in a 5G network is provided. The method includes:
transmitting, at least one UE KDF capability to a core network to support a KDF negotiation; and
selecting a KDF to be used at a network function, NF, and the UE for deriving a similar security key using KDF capability of the at least one NF and at least one UE KDF capability;
storing network KDF capability information upon non-availability of KDF capabilities at the core network;
selecting at least one KDF based on the UE KDF capability, subscription information and the corresponding NF KDF capability;
indicating the selected KDFs to a target NF and the UE;
selecting, by the core network, a KDF for NAS security key generation based on the UE KDF capability and a network capability;
negotiating the KDF, for AS security context generation, between the UE and a gNB;
selecting, by the gNB, the UE KDF capability and the gNB capability; and
storing, by the core network, the UE KDF capability and the network selected KDF indicated by the core network.

In other aspect of the present disclosure, a UE for providing KDF negotiation in a 5G network is provided. The UE include a communication control module, an operating system, a controller; and a transceiver circuit. The controller is configured to select a specific KDF for at least one security related key derivation. The controller is further configured to re-request an alternate KDF from a selected list sent by the core network. The operating system of the UE is configured to re-negotiate KDF capabilities upon non-agreement on a KDF indicated by the network.

In a further aspect of the present disclosure, a network for providing KDF negotiation with a UE is provided. The network includes a communication control module, an operating system, a controller, and a transceiver circuit. The communication control module is configured to acquire a specific KDF sent by the UE. The controller is configured to generate a prioritized KDF list based on UE subscriber information. The controller is further configured to provide a serving network KDF capability for the serving network. A transceiver control module of the network is configured to transmit a selected KDF and a list of KDF with a priority set to the UE and other network functions, wherein the selected KDF indicates the highest priority in the list. The transceiver control module is configured to receive a request requesting an alternate KDF from the UE and to re-negotiate with the UE, upon non-agreement on the selected KDF, to reselect a KDF from a commonly supported KDF stored in a memory of the network.

BRIEF DESCRIPTION OF DRAWINGS

The foregoing and further objects, features and advantages of the present disclosure will become more apparent from the following description of exemplary embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting of its scope, for the subject matter may admit to other equally effective embodiments.

DESCRIPTION OF EMBODIMENTS

Figure 1A:
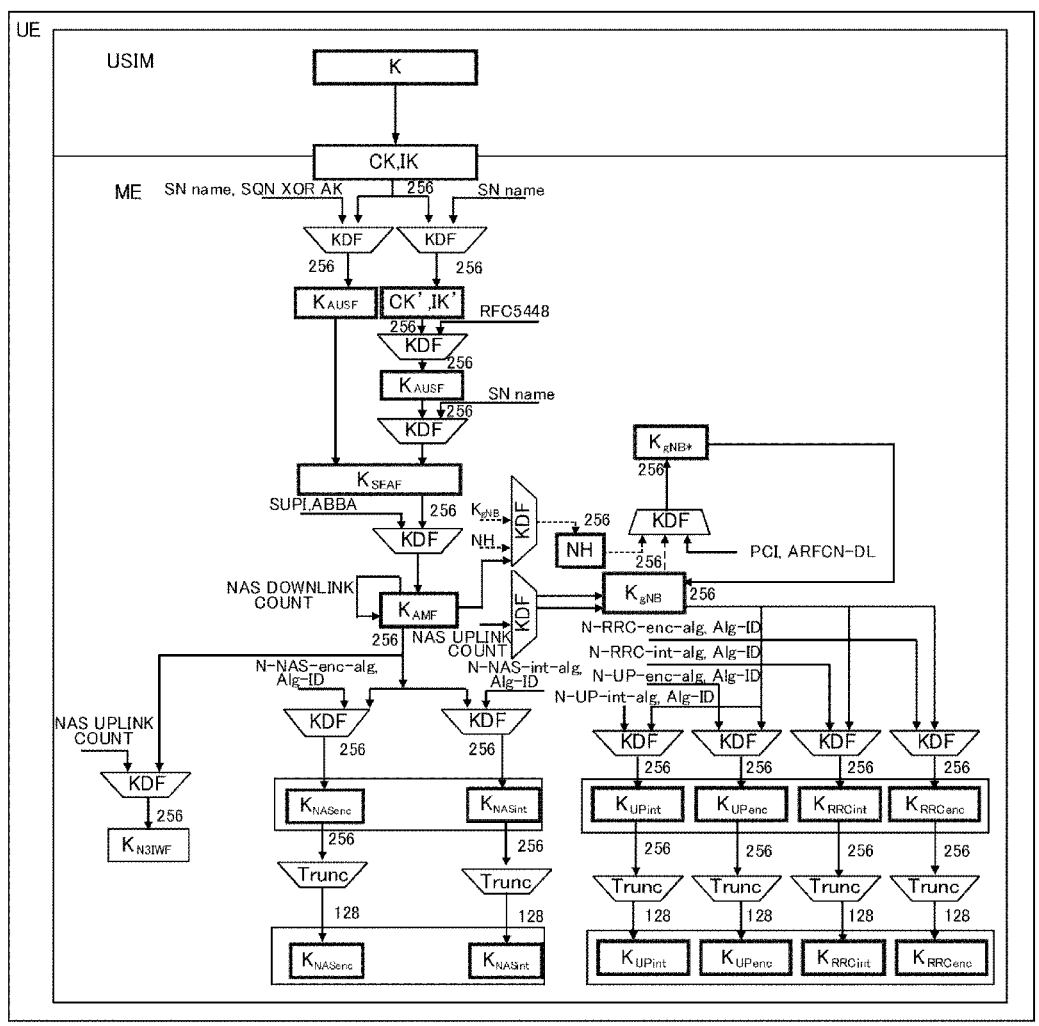
FIG. 1A is a block diagram illustrating the application of key derivation functions according to the related art.

According to an embodiment of the present disclosure, a method for providing key derivation function (KDF) negotiation in a 5G network is provided. The method includes: selecting a specific KDF at a UE and at the network for at least one security related key derivation, wherein a KDF capability parameter of the UE includes information of the KDFs supported by the UE with a first priority list, wherein a KDF capability parameter of the network includes information of the KDFs supported by the network/network function (NF) with a second priority list; selecting a prioritized KDF list upon non-availability of the UE KDF capability list by a core network; and transmitting said selected KDF to the UE and to other network functions to indicate said selected KDF for generating a specific security key at a receiver side.

The prioritized KDF list may be generated by the core network based on the UE subscriber information and the capability list of the core network.

Further, according to an embodiment of the present disclosure, a serving network KDF capability may be provided by the core network for the KDF selection for said serving network, wherein a high priority in the KDF list is allocated to the most common KDF stored in the core network.

The selected KDF transmitted from the core network to the UE and other network functions may include of at least one KDF or a list of KDF with a priority set, wherein the core network selected KDF is indicated with highest priority in the list. The UE re-requests with an alternate KDF from the selected list sent by the core network upon non-acceptance of the core network selected KDF by the UE or the receiving function.

According to another embodiment of the present disclosure, re-negotiation and indication of the KDF capabilities by the UE upon non-agreement on the KDF indicated by the core network and requesting the core network to reselect from the commonly supported KDF are disclosed.

Another embodiment of the present disclosure discloses a method for providing flexible KDF negotiation in a 5G network. The method includes: transmitting, at least one UE KDF capability and at least one network function (NF) KDF capability to a core network node to support a flexible KDF negotiation; selecting a KDF, wherein the KDF capability of the at least one NF and the KDF capability of at least one UE are enabled to select a KDF to be used at the NF and the UE for deriving a similar security key; storing network KDF capability information upon non-availability of the KDF capabilities at the network; selecting at least one KDF based on the UE KDF capability, subscription information and the corresponding NF KDF capability; indicating the selected KDFs to the target NF and the UE; selecting, by the core network, the KDF for NAS security key generation based on the UE KDF capability and the network capability; negotiating the KDF, for the AS security context generation between the UE and a gNB; selecting, by the gNB, the UE KDF capability and the gNB capability; and storing, by the core network, the UE KDF capability and the network selected KDF indicated by the core network.

The method as per the embodiment also discloses generation of a KDF MAC by the UE by sending, the UE KDF, by the UE to the network in a registration request message; and replaying, at the UE and by the core network, the registration request (NAS) including a security mode command message during KDF selection for a NAS security key; replaying, at the UE and by the core network, the registration request (AS) including a security mode command message during KDF selection for AS security key.

The present disclosure also discloses, in another embodiment, a method including: sending, the UE KDF capability, from a source gNB to a target gNB to initiate KDF selection at the target gNB for AS security key derivation; selecting, the KDF, by the target gNB based on the UE security capability and the target gNB KDF capability; verifying, by the target gNB, the UE KDF capability with the core network; providing, by the core network, the UE KDF capability in an acknowledgement message upon an incorrect UE KDF sent by the UE; providing, by the core network, the selected KDF for the AS security in a handover command message.

The method according to the present disclosure also discloses sending, by the source gNB, the UE KDF capability to the core network, sending, by the core network, the UE KDF capability to a target core network, wherein the target core network is configured to send the UE KDF capability to the target gNB; selecting, by the target gNB, the KDF for AS security derivation based on the gNB KDF capability and UE KDF capability; selecting, by the target core network, the KDF for NAS security key derivation based on the core network KDF capability and the UE KDF capability.

Another embodiment of the present disclosure discloses sending, an ABBA parameter, to the UE by the core network, sending, the ABBA parameter, to the UE by the core network during KDF negotiation in a registration request message; replaying, an ABBA parameter, between the UE and the network; and selecting, KDF, based on the ABBA parameter.

Another embodiment of the present disclosure discloses a user equipment for providing key derivation function (KDF) negotiation in a 5G network. The UE includes a communication control module; an operating system; a controller; and a transceiver circuit. The controller is configured to select a specific KDF for at least one security related key derivation. The controller is further configured to re-request with an alternate KDF from the selected list sent by the core network. The operating system of the UE is configured to re-negotiate the KDF capabilities upon non-agreement on the KDF indicated by the network.

Another embodiment of the present disclosure discloses a network for providing key derivation function (KDF) negotiation with a UE. The network includes a communication control module; an operating system; a controller; and a transceiver circuit. The communication control module is configured to acquire a specific KDF sent by the UE. The controller is configured to generate a prioritized KDF list based on the UE subscriber information. The controller is further configured to provide a serving network KDF capability for the serving network. A transceiver control module of the network is configured to transmit the selected KDF and a list of KDF with a priority set to the UE and other network functions. The core network selected KDF is indicated with highest priority in the list of KDF. The transceiver module is further configured to receive another request with an alternate KDF by the UE and to re-negotiate with the UE upon non-agreement on the KDF indicated by the core network to reselect from the commonly supported KDF stored in the memory of the network.

Exemplary embodiments now will be described with reference to the accompanying drawings. The disclosure may, however, be embodied in many different forms and should not be construed as limited to the embodiments set forth herein; rather, these embodiments are provided so that the present disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

It is to be noted, however, that the reference numerals in claims illustrate only typical embodiments of the present subject matter, and are therefore, not to be considered for limiting of its scope, for the subject matter may admit to other equally effective embodiments.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

It will be understood that the different networks described herein such as a core network, an access network, a home network, etc. are interchangeable in the context of the present disclosure. A person skilled in the art would appreciate that, based on design preferences, the specific order or hierarchy of the different network types may be rearranged while remaining within the scope of the present disclosure. It should be understood that any reference to a network such as a core network, an access network, a home network, a serving network are interchangeable and can be implemented depending upon design constraints and upon particular application. A person skilled in the art would also appreciate the meaning and scope of such network elements in the context of present disclosure.

Unless otherwise defined, all terms (including technical and scientific terms) used herein have the same meaning as commonly understood by one of ordinary skill in the art to which the present disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also include other functions and structures.

Also, all logical units described and depicted in the figures include the software and/or hardware components required for the unit to function. Further, each unit may include within itself one or more components which are implicitly understood. These components may be operatively coupled to each other and be configured to communicate with each other to perform the function of the said unit.

According to the related art as represented in FIGS. 1A, 1B, 2 and 3, only one KDF is used in the 5G system. Further, according to NPL3 (TS 33.501 Clause A.1), "KDF interface and input parameter construction" is as follows:

All key derivations (including input parameter encoding) for the 5GC are performed using the key derivation function (KDF) specified in NPL 4;

according to NPL4 (TS 33.220 Annex B (normative) "Specification of the key derivation function KDF"), the derived key=HMAC-SHA-256 (Key, S). This is the only one key derivation function that is used in the 5G system.

Also, as per NPL3, two primary authentication methods are supported in the 5G System (5GS), EAP-AKA' and 5G AKA. In NPL2, (EAP-AKA') network initiated KDF negotiation in EAP-AKA is implemented using the AT-KDF attribute. The AT_KDF is an attribute that the server uses to reference a specific key derivation function. It offers a negotiation capability that can be useful for future evolution of the key derivation functions. Servers must send one or more AT_KDF attributes in the EAP-Request/AKA'-Challenge message. These attributes represent the desired functions ordered by preference, the most preferred function being the first attribute. Upon receiving a set of these attributes, if the peer supports and is willing to use the key derivation function indicated by the first attribute, the function is taken into use without any further negotiation. However, if the peer does not support this function or is unwilling to use it, it does not process the received EAP-Request/AKA'-Challenge in any way except by responding with the EAP-Response/AKA'-Challenge message that contains only one attribute, AT_KDF with the value set to the selected alternative. If there is no suitable alternative, the peer behaves as if AUTN had been incorrect and authentication fails (see FIG. 3 of NPL 5).

Figure 34:
FIG. 34 is a diagram showing a screenshot.

A screenshot from NPL2 is shown in FIG. 34. As shown in FIG. 34, the KDF negotiation messages are exchanged, which will lead to the above mentioned authentication failure case.

In 5G AKA, no KDF negotiation takes place at all and only single KDF will be used for all security related key or parameter derivation in the 5G system.

Figure 1B:
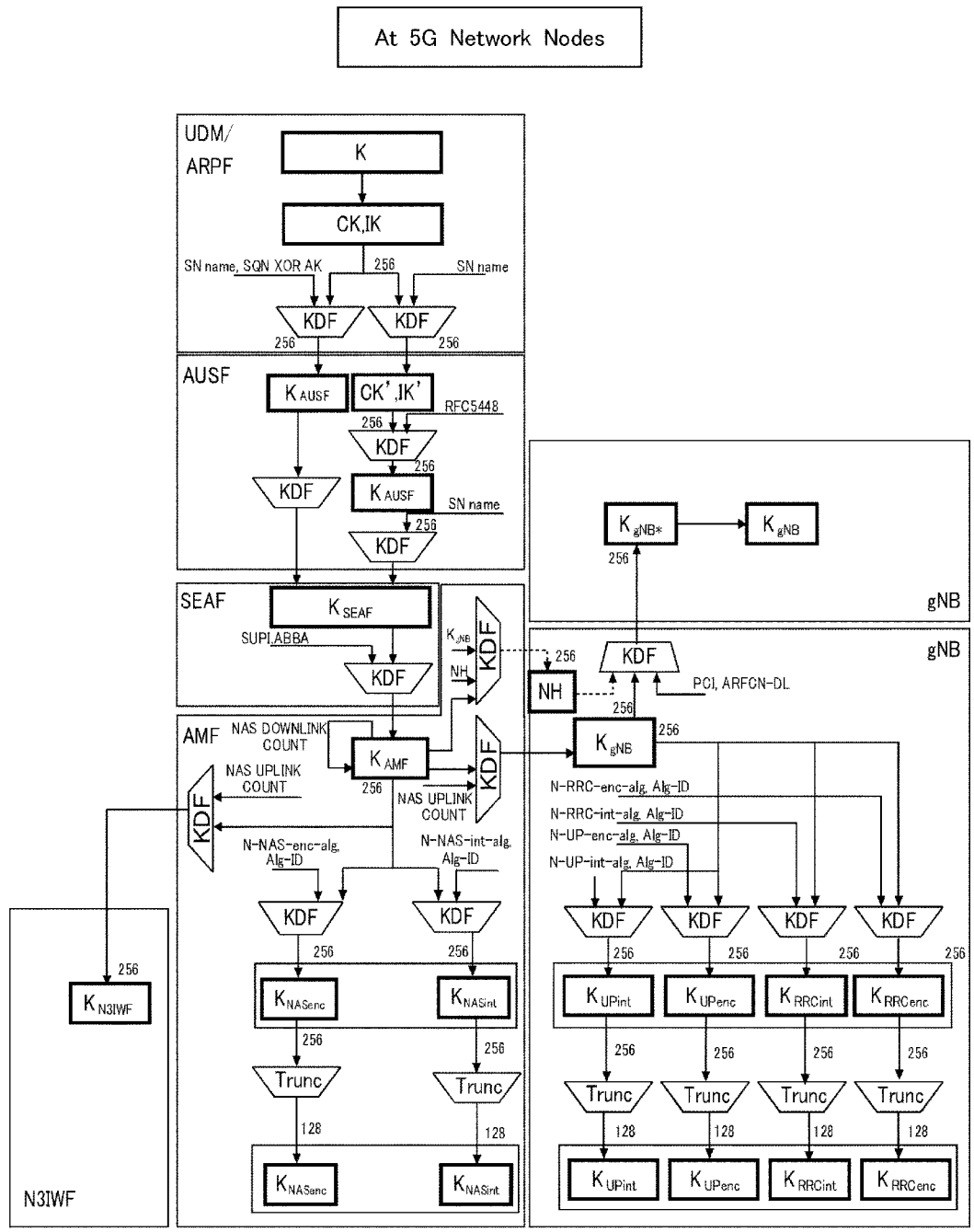
FIG. 1B is a block diagram illustrating the application of key derivation functions according to the related art.

As per the KDF usage scenario in the 5GS disclosed in NPL3, the same KDF (e.g. HMAC SHA-256) is used in multiple entities of the 5GS for various security key generations as shown in FIGS. 1A and 1B.

Figure 2:
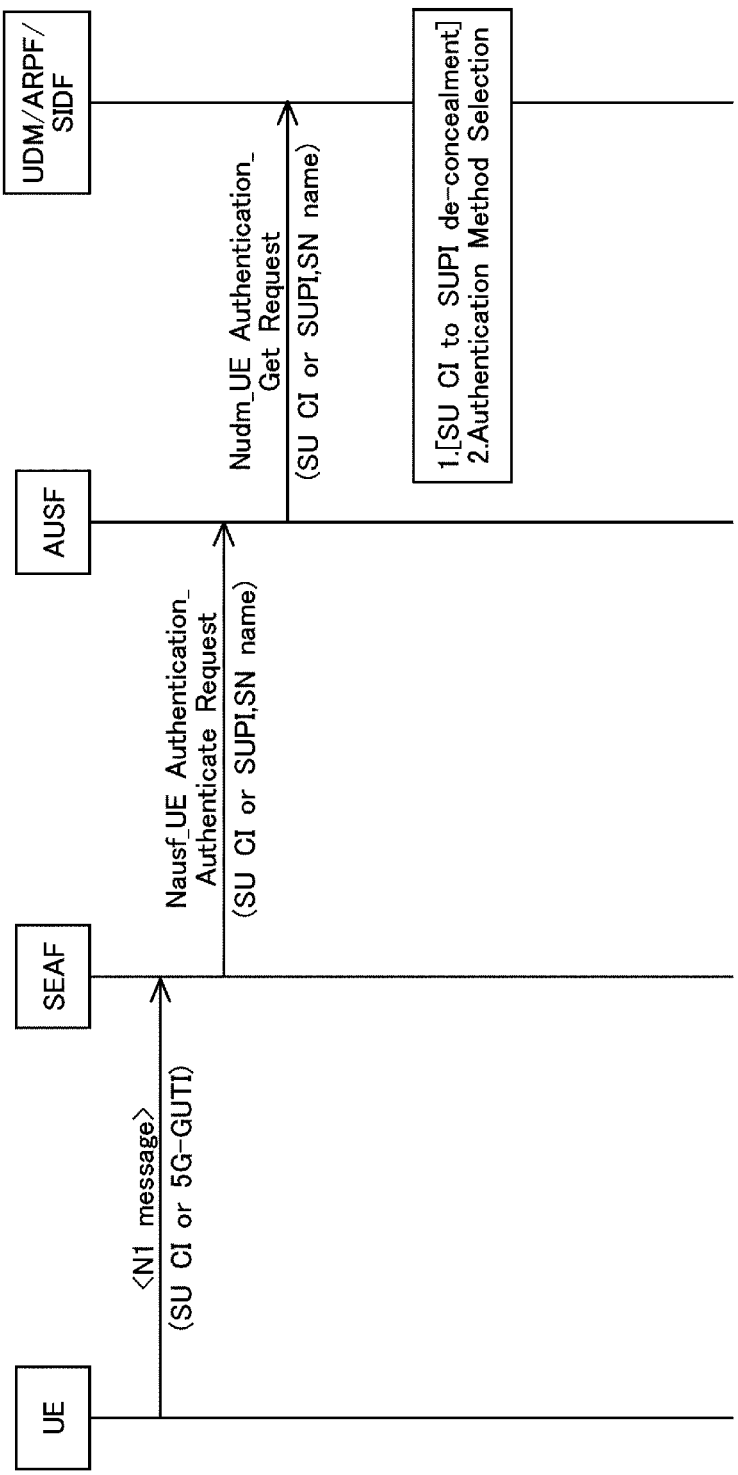
FIG. 2 is a sequence chart illustrating initiation of an authentication procedure known in the related art.

The primary authentication methods in the 5GS (NPL3) are now described with reference to FIG. 2. The FIG. 2 depicts the initiation of the authentication procedure. As can be seen, selection of an authentication method in the 5GS clearly shows the lack of UE KDF capabilities or other network function/entity KDF capabilities transmission between the UE and the core network.

Figure 3:
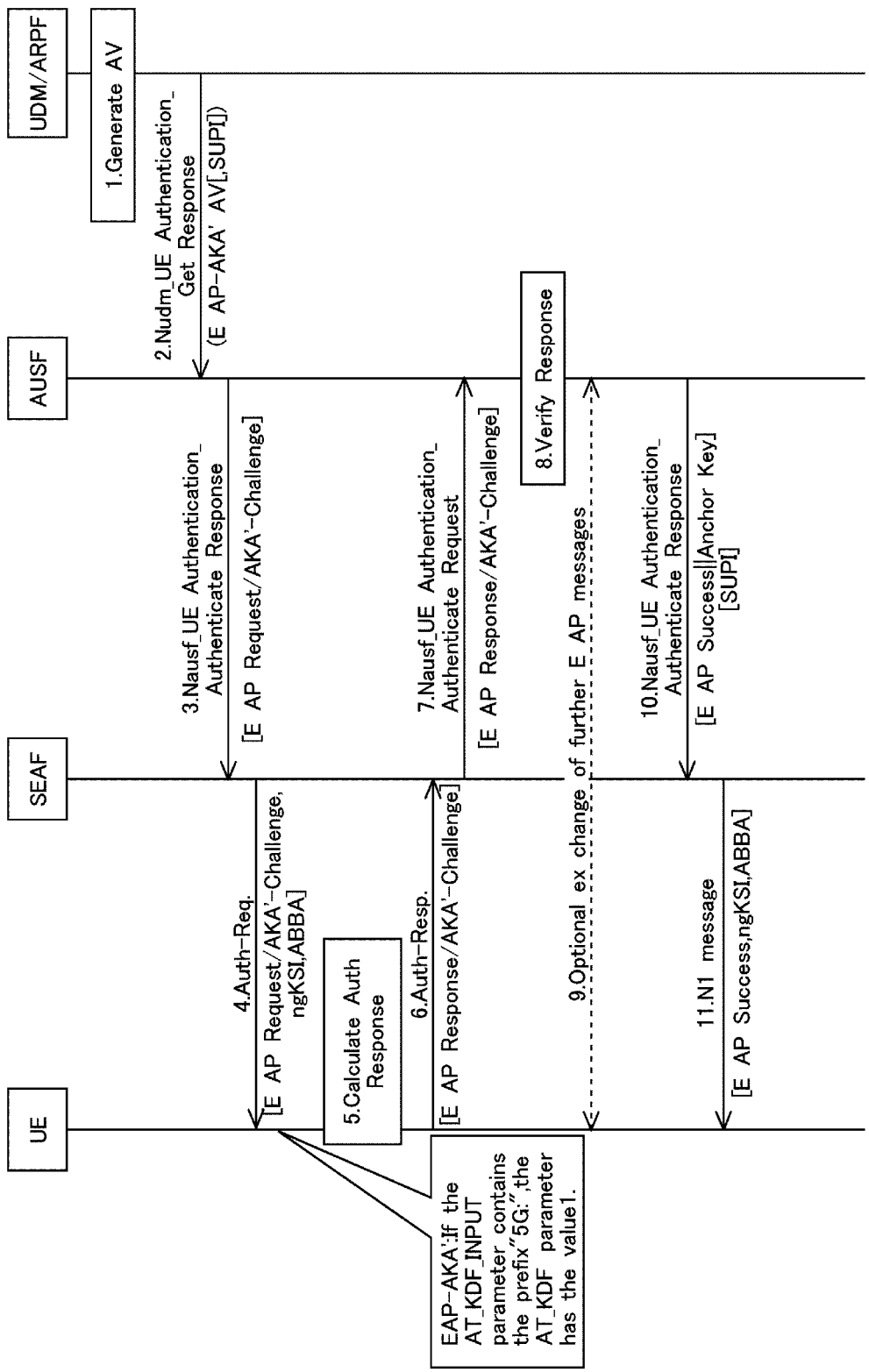
FIG. 3 is a sequence chart illustrating an authentication procedure for EAP AKA' known in the related art.

The authentication procedure for EAP-AKA' as per NPL3 is shown in FIG. 3. FIG. 3 shows the EAP-AKA' message flow. NPL3 specifies that if the AT_KDF_INPUT parameter contains the prefix "5G:", the AT_KDF parameter has the value 1. This further confirms the lack of KDF selection during EAP-AKA' for the existing 5GS.

The authentication procedure for 5G AKA is described as follows:

The 5G AKA message flow as presented in figure clarifies that the existing 5G AKA supports neither UE initiated or network initiated KDF negotiation mechanism.

Therefore the present disclosure captures various proposed KDF negotiation procedures that can be adapted with any authentication method used for the 5G system and any next generation networks.

Figure 4:
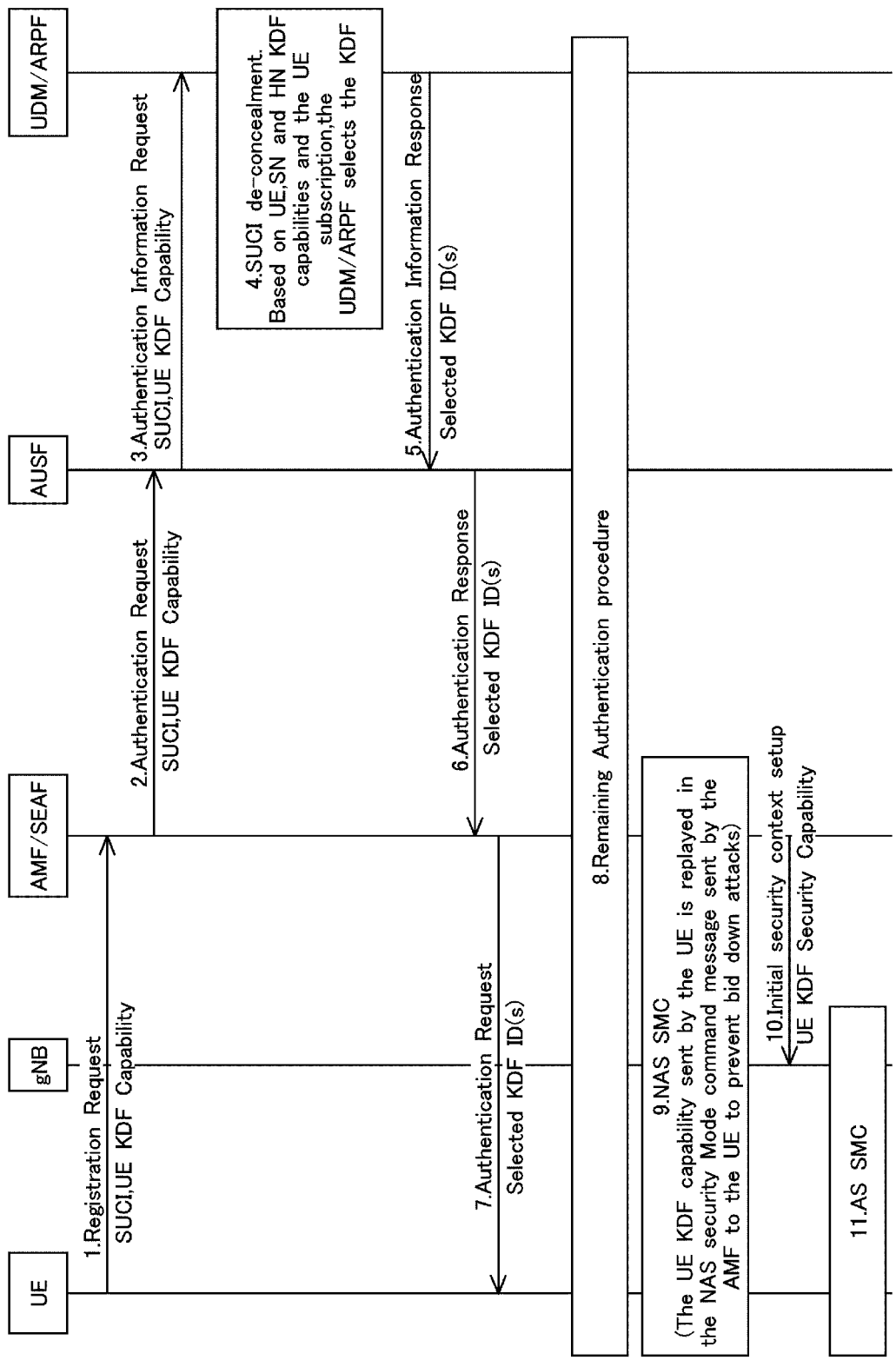
FIG. 4 is sequence chart illustrating a UE initiated KDF negotiation procedure for common KDF negotiation involving a trusted AMF.

According to an embodiment of the present disclosure as shown in FIG. 4, the UE initiated KDF negotiation procedure for common KDF negotiation involving a trusted AMF is described.

1. The UE can send its identity information (UE ID) such as SUCI, IMSI or GPSI and the UE KDF capabilities in the registration request message to the AMF/SEAF.

The UE KDF capabilities parameter contains information on the KDFs supported by the UE/USIM. It can also include information on the UE's preference over the KDF selection in terms of priority. The UE KDF capabilities parameter can either hold the supported KDF identifiers or release specific information to denote a set of KDFs supported with that release.

2. The AMF/SEAF can initiate the authentication by including the received UE ID and UE KDF capabilities in the authentication request message and send the authentication request message to the AUSF. The AMF/SEAF can locally store the UE KDF capabilities.

3. The AUSF can send the received UE ID and UE KDF capabilities in the authentication information request message to the UDM/ARPF.

4. If the SUCI is received in the authentication information request message, the SIDF (offered by the UDM or located elsewhere) can de-conceal the SUCI to retrieve the SUPI. The UDM/ARPF selects, based on its own network KDF capabilities and the received UE KDF capabilities and UE subscription, the mutually available, the most suitable KDF and/or the KDF with the highest priority.

The UDM/ARPF uses the selected KDF for the CK/IK or CK/IK' or any key derivation or authenticator vector generation.

The selected KDF parameter can either include single KDF identification information (KDF ID) or a list/set of KDF IDs with the selected KDF ranked with the highest priority indicator.

The network selected KDF can be used for all key derivation involved in the 5GS.

5. The UDM/ARPF then sends the network selected KDF in the authentication information response message to the AUSF.

6. The AUSF sends the received network selected KDF information to the AMF/SEAF in the authentication response message. The AUSF locally stores the network selected KDF for its use.

7. The AMF/SEAF sends the received network selected KDF information to the UE in the authentication request message. The AMF/SEAF locally stores the network selected KDF for its use.

The UE/USIM verifies if the received network selected KDF is in accordance with the UE KDF capability. If the UE supports the received network selected KDF, then the UE uses the received network selected KDF to derive all 5GS related security keys.

8. The remaining authentication procedure is performed.

If the UE finds any discrepancy with the network selected KDF and the UE KDF capability, the UE can either send the KDF error message to the network in any subsequent NAS message or renegotiate with the 5G core network by sending the received network selected KDF information and UE KDF capabilities with the KDF reselection indicator with the related cause value.

9. Following a successful authentication procedure, as a proof for bidding down prevention, the AMF/SEAF can replay the UE KDF capability in the NAS security mode command (SMC) message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF.

10. Following a successful NAS SMC procedure, the AMF/SEAF can send an initial AS security context setup message to the gNB along with the UE KDF capability.

11. The gNB can send the AS security mode command message to the UE along with the UE KDF capability. The UE can verify the correctness of the received UE KDF capability. If the verification is successful, the UE can send a "KDF negotiation success indication" in the AS security mode complete message back to the gNB. If the verification step fails, the UE can send the "KDF negotiation failure indication" in the AS security mode complete message back to the gNB.

A person skilled in the art would appreciate that the core network selection of a common KDF for the 5GS has no implication on SEAF location/implementation (standalone/co-located with an AMF).

Figure 5:
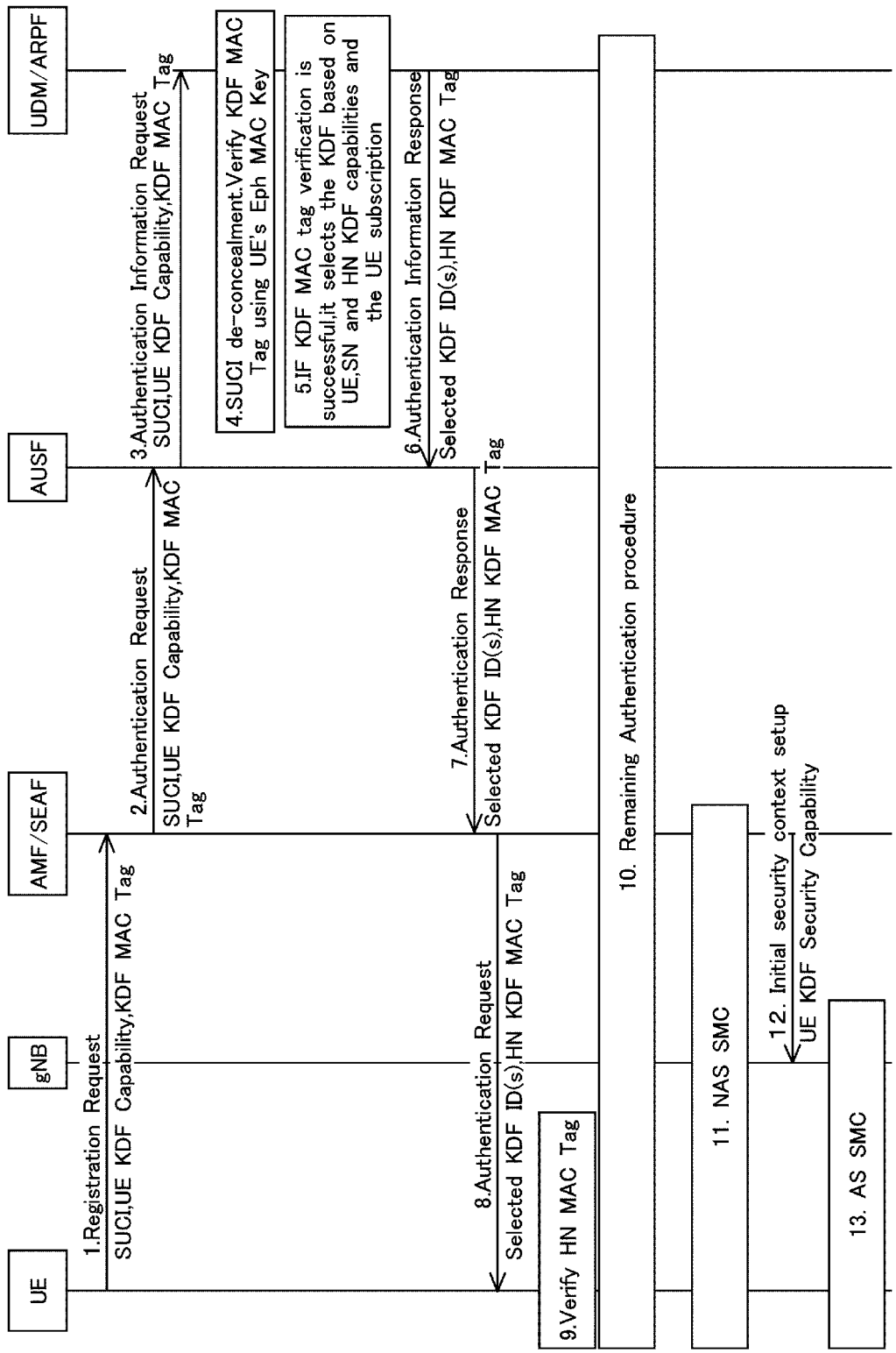
FIG. 5 is sequence chart illustrating a UE initiated KDF negotiation procedure for common KDF negotiation involving a less trusted AMF.

According to an embodiment of the present disclosure as shown in FIG. 5, the UE initiated KDF negotiation procedure for common KDF negotiation involving a less trusted AMF is described.

1. The UE can send its identity information (UE ID) such as SUCI, IMSI or GPSI, the UE KDF capabilities and the KDF MAC in the registration request message to the AMF/SEAF.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

A person skilled in the art would appreciate that a KDF MAC tag contains the message authentication code (MAC) or digest or hash of the UE KDF capabilities. The KDF MAC can be generated by the UE using a keyed hash or salted hash. The KDF MAC or KDF MAC tag is used for integrity protection of the UE KDF capabilities against bidding down attacks in case of less trusted AMFs and less trusted serving network deployments.

It is to be noted that the KDF MAC tag can be generated at the sender side and verified at the receiver side as follows. The KDF MAC tag generation and verification discussed throughout this specification using the ECIDES security context or any asymmetric security context can be shown in FIG. 6. In variant 1, the sender and the receiver can either be the UE or the network function or entity accordingly.

2. The AMF/SEAF can initiate the authentication by including the received UE ID, UE KDF capabilities and KDF MAC tag in the authentication request message and send the authentication request message to the AUSF. The AMF/SEAF can locally store the UE KDF capabilities.

3. The AUSF can send the received UE ID, KDF capabilities and KDF MAC tag in the authentication information request message to the UDM/ARPF.

4. If the SUCI is received in the authentication information request message, the SIDF (offered by the UDM or located elsewhere) can de-conceal the SUCI to retrieve the SUPI. The UDM/ARPF can verify the KDF MAC tag by retrieving the security context (UE's ephemeral MAC key) related to the SUPI from UDM/ARPF/UDSF or any repository.

5. If the KDF MAC tag verification at the UDM/ARPF is successful, the UDM/ARPF selects, based on its own network KDF capabilities and the received UE KDF capabilities and UE subscription, the mutually available and the most suitable KDF and/or the KDF with the highest priority.

If the KDF MAC tag verification fails at the UDM/ARPF, a failure notification is sent to the UE along with the authentication request or authentication failure message with the related KDF error cause value.

The UDM/ARPF uses the selected KDF for the CK/IK or CK/IK' or any key derivation or authenticator vector generation.

The selected KDF parameter can either include a single KDF identification information (KDF ID) or a list/set of KDF IDs with the selected KDF ranked with the highest priority indicator.

The network selected KDF can be used for all key derivation involved in the 5GS.

Figure 6:
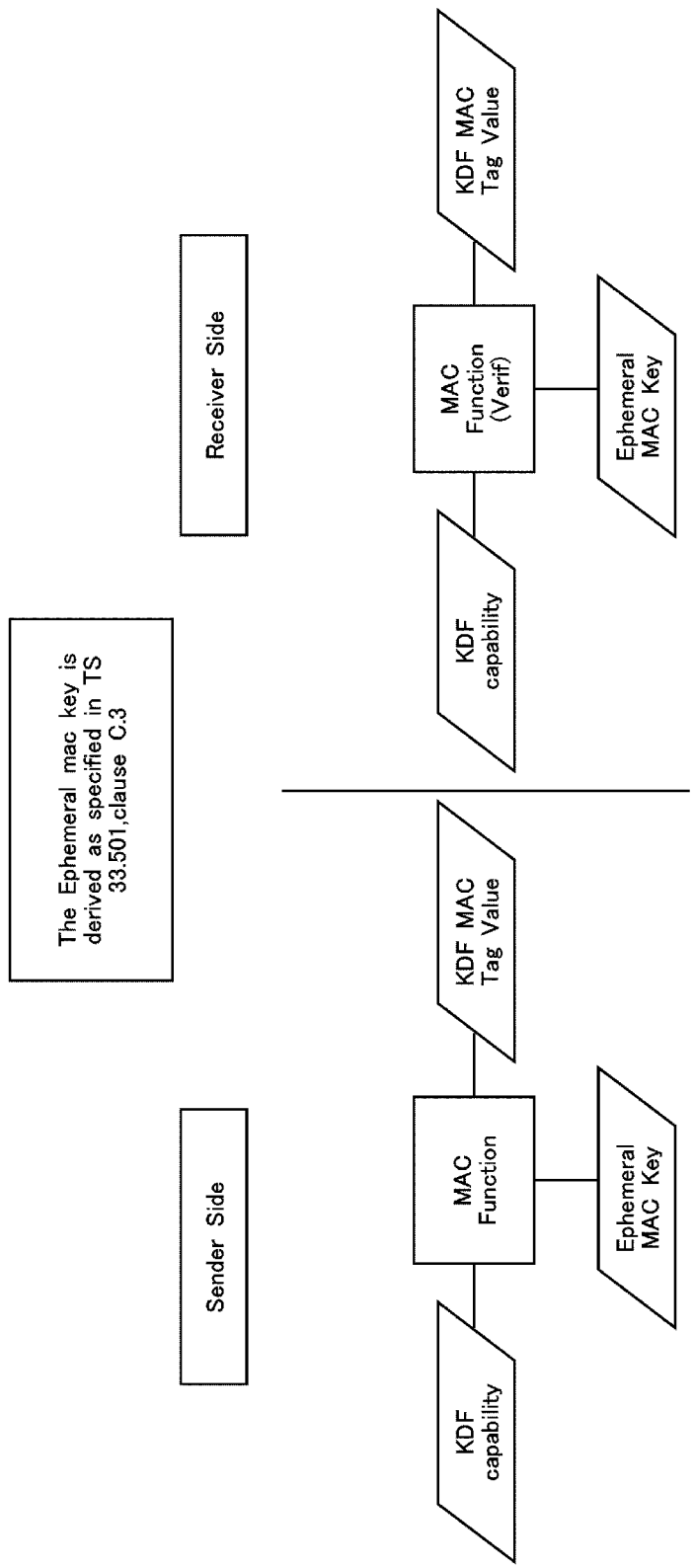
FIG. 6 is a block diagram illustrating KDF MAC tag generation and verification procedures.

6. The UDM/ARPF then sends the network selected KDF in the authentication information response message to the AUSF along with the KDF MAC tag for the network selected KDF ID(s) to prevent KDF bidding down attacks. The KDF MAC tag can be derived as shown in FIG. 6 or using any keyed/salted hash. The AUSF locally stores the network selected KDF for its use.

7. The AUSF sends the received network selected KDF information along with its KDF MAC tag to the AMF/SEAF in the authentication response message. The AMF/SEAF locally stores the network selected KDF for its use.

8. The AMF/SEAF sends the received network selected KDF information along with its KDF MAC tag to the UE in the authentication request message.

9. The UE/USIM verifies KDF MAC tag as shown in FIG. 6. If the verification is successful, UE/USIM further verifies if the received network selected KDF is in accordance with the UE KDF capability. If the UE supports the received network selected KDF, then the UE uses the received network selected KDF to derive all 5GS related security keys.

10. The remaining authentication procedure is performed.

If the UE detects any discrepancy with the network selected KDF and UE KDF capability, the UE can either send the KDF error message to the network in any subsequent NAS message or renegotiate with the 5G core network by sending the received network selected KDF information and UE KDF capabilities with the KDF reselection indicator with the related cause value.

If the KDF MAC tag verification fails at the UE, the UE sends the UE KDF negotiation failure notification to the network.

11. Following a successful authentication procedure, the AMF/SEAF can replay the UE KDF capability in the NAS security mode command message as a token of confirmation that the indicated KDF is used for NAS protection related key generation.

The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF.

12. Following a successful NAS SMC procedure, the AMF/SEAF can send an initial AS security context setup message to the gNB along with the UE KDF capability.

13. The gNB can send the AS security mode command message to the UE along with the UE KDF capability as a token of confirmation that the indicated KDF is used for AS protection related key generation. The UE can verify the correctness of the received UE KDF capability. If the verification is successful, the UE can send a "KDF negotiation success indication" in the AS security mode complete message back to the gNB. If the verification step fails, the UE can send the "KDF negotiation failure indication" in the AS security mode complete message back to the gNB.

A person skilled in the art would appreciate that the core network selection of common KDF for the 5GS has no implication on SEAF location/implementation (standalone/co-located with an AMF).

Figure 7:
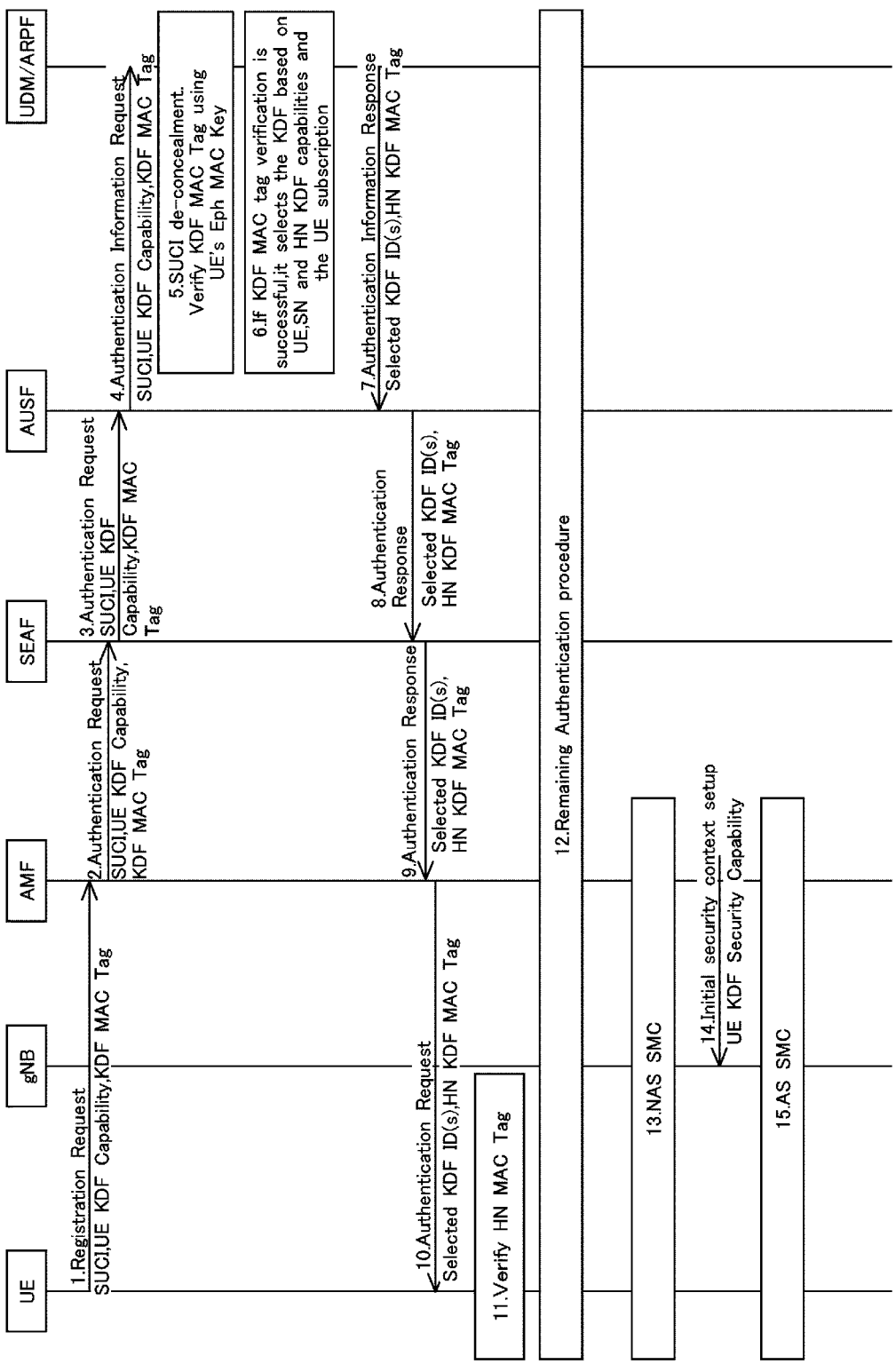
FIG. 7 is a sequence chart illustrating a UE initiated KDF negotiation procedure for common KDF negotiation involving a less trusted AMF with a standalone SEAF.

According to an embodiment of the present disclosure as shown in FIG. 7, the UE initiated the KDF negotiation procedure for common KDF negotiation involving a less trusted AMF with a standalone SEAF is described.

1. The UE can send its identity information (UE ID) such as SUCI, IMSI or GPSI, the UE KDF capabilities and the KDF MAC in the registration request message to the AMF.

The UE KDF capabilities parameter contains information on the KDFs supported by the UE/USIM. It can also include information on the UE's preference over the KDF selection in terms of priority. The UE KDF capability parameter can either hold the supported KDF identifiers or release specific information to denote a set of KDFs supported with that release.

The KDF MAC or KDF MAC tag contains the message authentication code or digest or hash of the UE KDF capabilities. The KDF MAC can be generated using a keyed hash or salted hash. The KDF MAC or KDF MAC tag is optionally used for integrity protection of the UE KDF capabilities against bidding down attacks in case of less trusted AMFs and less trusted serving network deployments.

Figure 8:
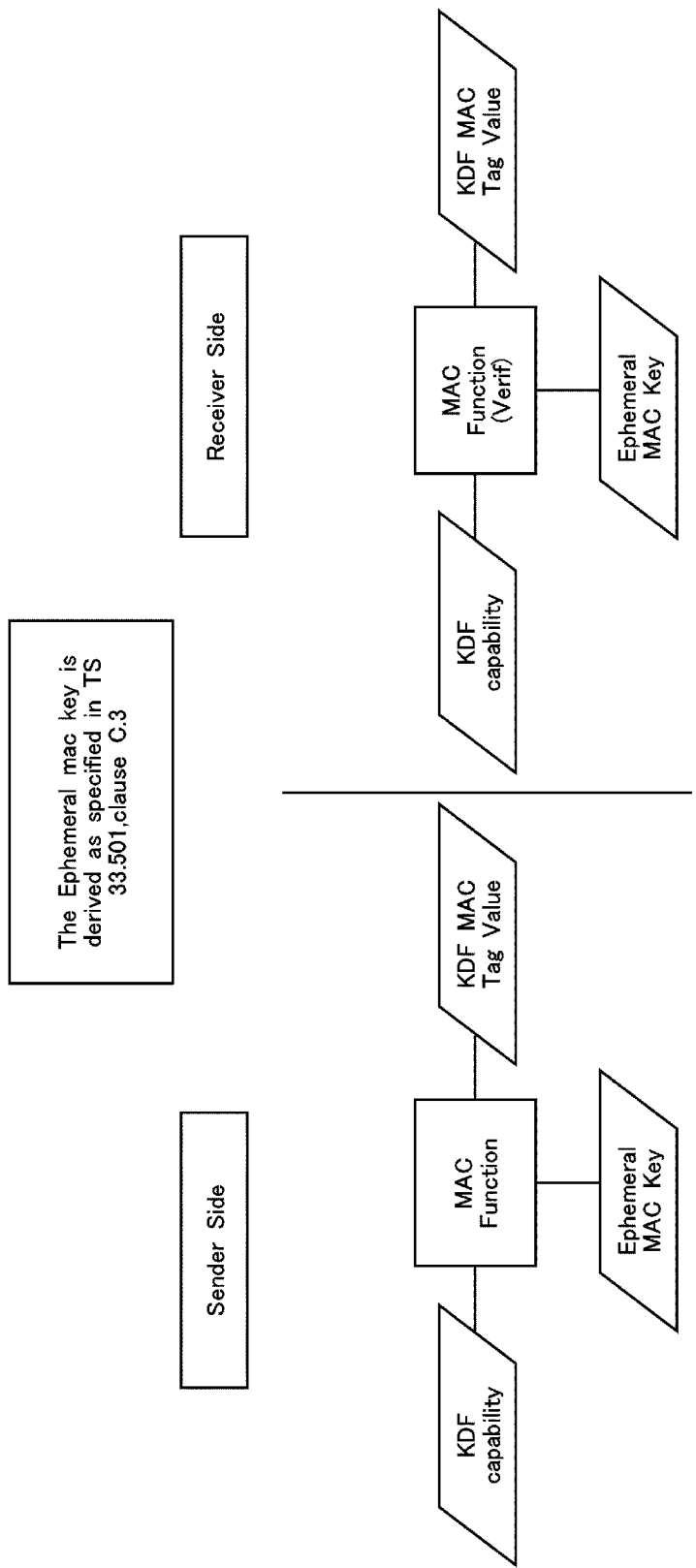
FIG. 8 is a block diagram illustrating a KDF MAC tag generation procedure.

The KDF MAC tag can be generated at the sender side and verified at the receiver side as follows. The KDF MAC tag generation and verification discussed throughout this specification using the ECIDES security context or any asymmetric security context can be as shown in FIG. 8.

2. The AMF can send the authentication request message to the SEAF including the received UE ID, KDF capabilities and KDF MAC tag. The AMF can locally store the UE KDF capabilities.

3. The SEAF can initiate the authentication by including the received UE ID, KDF capabilities and KDF MAC tag in the authentication request message and send the authentication request message to the AUSF. The SEAF can locally store the UE KDF capabilities.

4. The AUSF can send the received UE ID, KDF capabilities and KDF MAC tag in the authentication information request message to the UDM/ARPF.

5. If the SUCI is received in the authentication information request message, the SIDF (offered by the UDM or located elsewhere) can de-conceal the SUCI to retrieve the SUPI. The UDM/ARPF can verify the KDF MAC tag by retrieving the security context (UE's ephemeral MAC key) related to the SUPI.

6. If the KDF MAC tag verification at the UDM/ARPF is successful, further the UDM/ARPF selects, based on its own network KDF capabilities and the received UE KDF capabilities and UE subscription, the mutually available and the most suitable KDF and/or the KDF with the highest priority.

If the KDF MAC tag verification fails at the UDM/ARPF, a failure notification is sent to the UE along with the authentication request or authentication failure message with the related KDF error cause value.

The UDM/ARPF uses the selected KDF for the CK/IK or CK/IK' or any key derivation or authenticator vector generation.

The selected KDF parameter can either include single KDF identification information (KDF ID) or a list/set of KDF IDs with the selected KDF ranked with the highest priority indicator.

The network selected KDF can be used for all key derivation involved in the 5GS.

7. The UDM/ARPF then sends the network selected KDF in the authentication information response message to the AUSF along with the KDF MAC tag of the network selected KDF ID(s) to prevent KDF bidding down attacks. The KDF MAC tag can be derived as shown in FIG. 8 or using any keyed/salted hash.

8. The AUSF sends the received network selected KDF information along with its KDF MAC tag to the SEAF in the authentication response message. The AUSF locally stores the network selected KDF for its use.

9. The SEAF can forward the received authentication response message to the AMF. The SEAF locally stores the network selected KDF for its use.

10. The AMF sends the received network selected KDF information along with its KDF MAC tag to the UE in the authentication request message. The AMF can locally store the network selected KDF for its use.

11. The UE/USIM verifies KDF MAC tag. If the verification is successful, the UE further verifies if the received network selected KDF is in accordance with the UE KDF capability. If the UE supports the received network selected KDF, then the UE uses the received network selected KDF to derive all 5GS related security keys.

12. The remaining authentication procedure is performed.

If the UE finds any discrepancy with the network selected KDF and UE KDF capability, the UE can either send the KDF error message to the network in any subsequent NAS message or renegotiate with the 5G core network by sending the received network selected KDF information and UE KDF capabilities with the KDF reselection indicator with the related cause value.

If the KDF MAC tag verification fails at the UE, the UE sends the UE KDF negotiation failure notification to the network.

13. Following a successful authentication procedure, the AMF can replay the UE KDF capability in the NAS security mode command message as a token of confirmation that the indicated KDF is used for NAS protection related key generation.

The UE can verify the correctness of the received UE KDF capability. If the verification is successful, the UE can send a "KDF negotiation success indication" in the NAS security mode complete message back to the AMF. If the verification step fails, the UE can send the "KDF negotiation failure indication" in the NAS security mode complete message back to the AMF.

14. Following a successful NAS SMC procedure, the AMF/SEAF can send an initial AS security context setup message to the gNB along with the UE KDF capability.

15. The gNB can send the AS security mode command message to the UE along with the UE KDF capability as a token of confirmation that the indicated KDF is used for AS protection related key generation.

The UE can verify the correctness of the received UE KDF capability. If the verification is successful, the UE can send a "KDF negotiation success indication" in the AS security mode complete message back to the gNB. If the verification fails, the UE can send the "KDF negotiation failure indication" in the AS security mode complete message back to the gNB.

Here, a person skilled in the art would appreciate that if the SEAF may or may not be co-located with the AMF. The core network selection of a common KDF has no implication on SEAF location.

Figure 9:
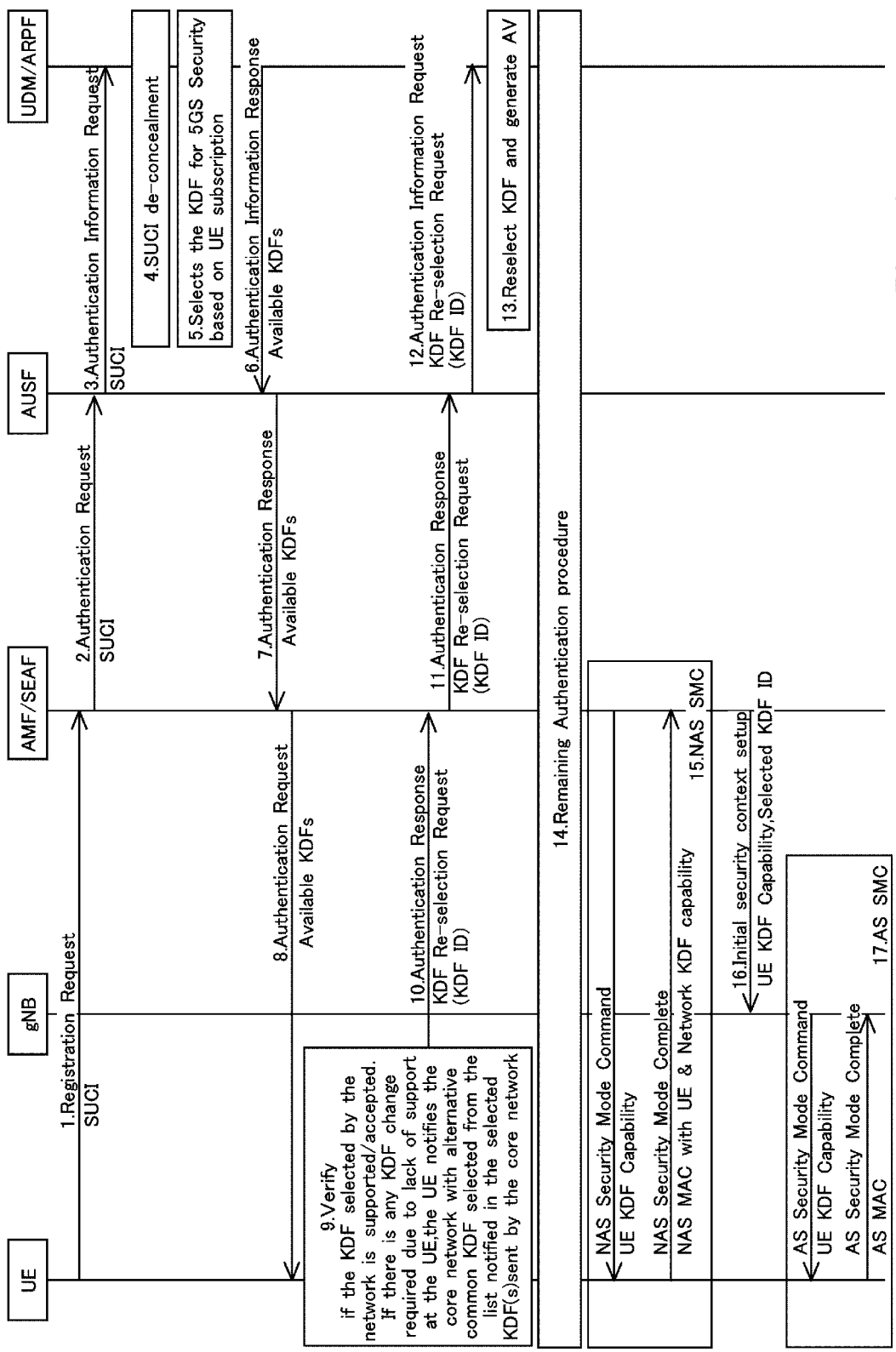
FIG. 9 is a sequence chart illustrating a network initiated KDF negotiation procedure for common KDF negotiation involving a trusted AMF.

According to an embodiment of the present disclosure as shown in FIG. 9, the network initiated KDF negotiation procedure for common KDF negotiation involving a trusted AMF is described.

The UE KDF capability containing the UE supported KDF information is sent to the network in the KDF reselection request when the network selected KDF is not supported/accepted by the UE.

1. The UE can send its identity information (UE ID) such as SUCI, IMSI or GPSI in the registration request message to the AMF/SEAF.

2. The AMF/SEAF can initiate the authentication by including the received UE ID in the authentication request message and send the authentication request message to the AUSF.

3. The AUSF can send the received UE ID in the authentication information request message to the UDM/ARPF.

4. If the SUCI is received in the authentication information request message, the SIDF (offered by the UDM or located elsewhere) can de-conceal the SUCI to retrieve the SUPI.

5. The UDM/ARPF selects, based on its own network KDF capabilities and UE subscription, the most suitable KDF and/or the KDF with the highest priority.

The network KDF capabilities parameter contains information on the KDFs supported by the 5G core network or 5GS. It can also include information on the network's preference over the KDF selection in terms of priority. The network KDF capabilities parameter can either hold the supported KDF identifiers or release specific information to denote a set of KDFs supported with that release.

The UDM/ARPF uses the selected KDF for the CK/IK or CK/IK' or any key derivation or authenticator vector generation.

The selected KDF parameter can either include single KDF identification information (KDF ID) or a list/set of KDF IDs with the selected KDF ranked with the highest priority indicator.

The network selected KDF can be used for all key derivation involved in the 5GS.

6. The UDM/ARPF then sends the network selected KDF(s) notified as the highest priority in the available KDF parameter in the authentication information response message to the AUSF.

The available KDF sent by the core network contains a list of KDFs with the selected KDF set to the highest priority.

The KDF can be selected by the core network based on its own capabilities and UE subscription.

7. The AUSF sends the received network selected KDF information (available KDF) to the AMF/SEAF in the authentication response message. The AUSF locally stores the network selected KDF information.

8. The AMF/SEAF sends the received network selected KDF information (available KDF) to the UE in the authentication request message. The AMF/SEAF locally stores the network selected KDF information.

9. The UE/USIM verifies if the received network selected KDF (available KDF) is in accordance with the UE KDF capability. If the UE supports the network selected KDF, then the UE uses the received network selected KDF to derive all 5GS related security keys.

If the UE finds any discrepancy with the network selected KDF among the available KDF and UE KDF capability, the UE can either send the KDF error message to the network in any subsequent NAS message or renegotiate with the 5G core network by sending the received network selected KDF information and UE KDF capabilities with the KDF re-selection indicator with the related cause value.

10. The UE can send its preferred KDF(s) according to its own KDF capabilities and network KDF capabilities inferred from the available KDF using the KDF re-selection request in the authentication response message to the AMF/SEAF. This message can also contain the UE ID.

11. The authentication response message can be forwarded by the AMF to the AUSF.

12. Then the AUSF can send the authentication information request message to the UDM/ARPF along with the KDF re-selection request.

13. The UDM/ARPF verifies the re-selection request and the cause value and, if it is genuine, the UDM/ARPF selects the KDF indicated by the UE as its preference and re-derives CK/IK or CK'/IK' and other key materials using the newly selected KDF. The UDM/ARPF sends the authentication response message to the AUSF along with the KDF ID selected as a token of acknowledgement to the UE along with the AV in the authentication information response message. Then the AUSF sends the received selected KDF ID, RAND and AUTN to the AMF/SEAF. The AMF then sends the received selected KDF ID, RAND and AUTN to the UE. The UE uses the received KDF ID for all subsequent key derivation.

14. The remaining authentication procedure is performed in the existing system.

15. Following a successful authentication procedure, as a proof for bidding down prevention, the AMF/SEAF can replay the UE KDF capability in the NAS security mode command message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF.

16. Following a successful NAS security, the AMF/SEAF can send an initial AS security context setup message to the gNB along with the UE KDF capability.

17. The gNB can send the AS security mode command message to the UE along with the UE KDF capability. The UE can verify the correctness of the received UE KDF capability. If the verification is successful, the UE can send a "KDF negotiation success indication" in the AS security mode complete message back to the gNB. If the verification fails, the UE can send the "KDF negotiation failure indication" in the AS security mode complete message back to the gNB.

Here, a person skilled in the art would appreciate that if the SEAF is co-located with the AMF, then the AMF may or may not use the same KDF as the SEAF.

Figure 10:
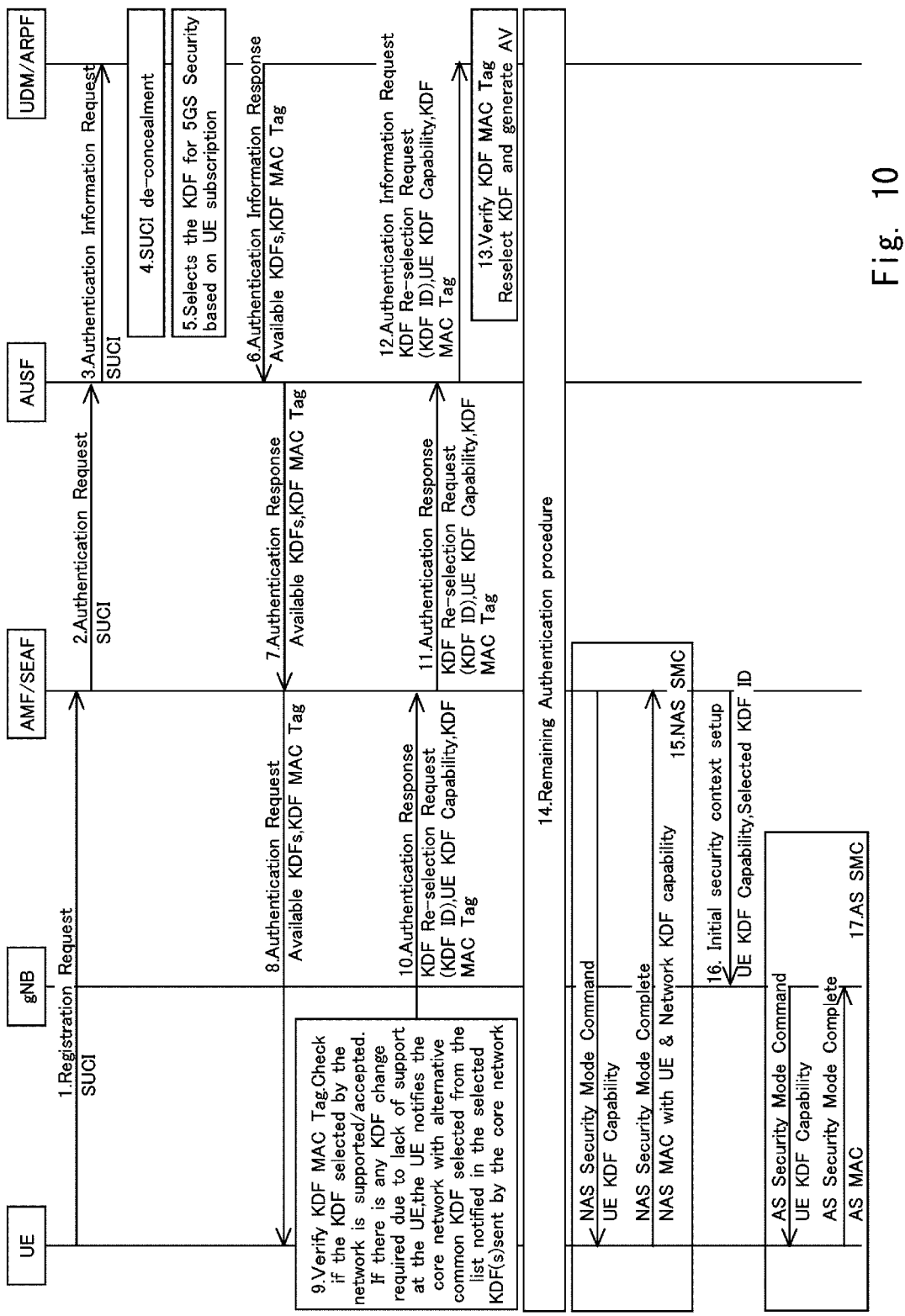
FIG. 10 is a sequence chart illustrating a network initiated KDF negotiation procedure for common KDF negotiation involving a less trusted AMF.

According to an embodiment of the present disclosure as shown in FIG. 10, the network initiated KDF negotiation procedure for common KDF negotiation involving a less trusted AMF is described.

1. The UE can send its identity information (UE ID) such as SUCI, IMSI or GPSI in the registration request message to the AMF/SEAF.

2. The AMF/SEAF can initiate the authentication by including the received UE ID in the authentication request message and send the authentication request message to the AUSF.

3. The AUSF can send the received UE ID in the authentication information request message to the UDM/ARPF.

4. If the SUCI is received in the authentication information request message, the SIDF (offered by the UDM or located elsewhere) can de-conceal the SUCI to retrieve the SUPI.

5. The UDM/ARPF selects, based on its own network KDF capabilities and UE subscription, the most suitable KDF and/or the KDF with the highest priority.

The network KDF capabilities parameter contains information on the KDFs supported by the 5G core network or 5GS. It can also include information on the network's preference over the KDF selection in terms of priority. The KDF capability can either hold the supported KDF identifiers or release specific information to denote a set of KDFs supported with that release.

The UDM/ARPF uses the selected KDF for the CK/IK or CK/IK' or any key derivation or authenticator vector generation.

The selected KDF parameter can either include single KDF identification information (KDF ID) or a list/set of KDF IDs with the selected KDF ranked with the highest priority indicator.

The network selected KDF can be used for all key derivation involved in the 5GS.

6. The UDM/ARPF then sends the network selected KDF notified as highest priority in the available KDF parameter along with KDF MAC tag in the authentication information response message to the AUSF.

The available KDF sent by the core network contains a list of KDFs with the selected KDF set to highest priority.

The KDF can be selected by the core network based on its own capabilities and UE subscription.

The KDF MAC or KDF MAC tag contains the message authentication code or digest or hash of the network KDF capabilities/available KDFs at the network side with highest priority indicated to the selected KDF. The KDF MAC can be generated using a keyed hash or salted hash. The KDF MAC or KDF MAC tag is used for integrity protection of the network KDF capabilities against bidding down attacks in case of less trusted AMFs and less trusted serving network deployments.

7. The AUSF sends the received network selected KDF information (available KDF) and the corresponding KDF MAC tag to the AMF/SEAF in the authentication response message. The AUSF optionally stores the network selected KDF(s).

8. The AMF/SEAF sends the received network selected KDF information (available KDF) and the corresponding KDF MAC tag to the UE in the authentication request message. The AMF/SEAF optionally stores the network selected KDF(s).

9. The UE/USIM verifies the network sent KDF MAC tag. If the verification is successful, the UE further verifies if the received network selected KDF (available KDF) is in accordance with the UE KDF capability. If the UE supports the network selected KDF, then the UE uses the received network selected KDF to derive all 5GS related security keys.

If the KDF MAC tag verification fails at the UE, the UE sends the UE KDF negotiation failure notification to the network.

If the UE finds any discrepancy with the network selected KDF among the available KDF and UE KDF capability, the UE can either send the KDF error message to the network in any subsequent NAS message or renegotiate with the 5G core network by sending the received network selected KDF information, UE KDF capabilities with the KDF re-selection indicator with the related cause value, and the KDF MAC tag value.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

The KDF MAC or KDF MAC tag contains the message authentication code or digest or hash of the UE KDF capabilities. The KDF MAC can be generated using a keyed hash or salted hash. The KDF MAC or KDF MAC tag is used for integrity protection of the UE KDF capabilities against bidding down attacks in case of less trusted AMFs and less trusted serving network deployments.

The KDF MAC tag can also be generated over all the KDF related information sent in a message to ensure integrity protection of the KDF information against bidding down attacks.

10. The UE can send its preferred KDF according to its own KDF capabilities and network KDF capabilities inferred from the available KDF using the KDF re-selection request in the authentication response message to the AMF/SEAF along with the UE KDF capability and KDF MAC tag. This message can also contain the UE ID.

11. The authentication response message can be forwarded by the AMF to the AUSF.

12. Then the AUSF can send the authentication information request message to the UDM/ARPF along with the KDF re-selection request.

13. The UDM/ARPF verifies the KDF MAC tag and the re-selection request and the cause value and, if it is genuine, the UDM/APRF selects the KDF indicated by the UE as its preference and re-derives CK/IK or CK'/IK' and other key materials using the newly selected KDF. The UDM/ARPF sends the authentication response message to the AUSF along with the KDF ID selected as a token of acknowledgement to the UE along with the AV in the authentication information response message. Then the AUSF sends the received selected KDF ID, RAND and AUTN to the AMF/SEAF. The AMF then sends the received selected KDF ID, RAND and AUTN to the UE. The UE uses the received KDF ID for all subsequent key derivation.

14. The remaining authentication procedure is performed in the existing system.

15. Following a successful authentication procedure, as a proof for bidding down prevention, the AMF/SEAF can replay the UE KDF capability in the NAS security mode command message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF.

16. Following a successful NAS security, the AMF/SEAF can send an initial AS security context setup message to the gNB along with the UE KDF capability.

17. The gNB can send the AS security mode command message to the UE along with the UE KDF capability. The UE can verify the correctness of the received UE KDF capability. If the verification is successful, the UE can send a "KDF negotiation success indication" in the AS security mode complete message back to the gNB. If the verification fails, the UE can send the "KDF negotiation failure indication" in the AS security mode complete message back to the gNB.

A person skilled in the art would appreciate that if the SEAF is co-located with the AMF, then the AMF may or may not use the same KDF as the SEAF. The UE KDF capability containing the UE supported KDF information is sent to the network in the KDF reselection request when the network selected KDF is not supported/accepted by the UE.

Figure 11:
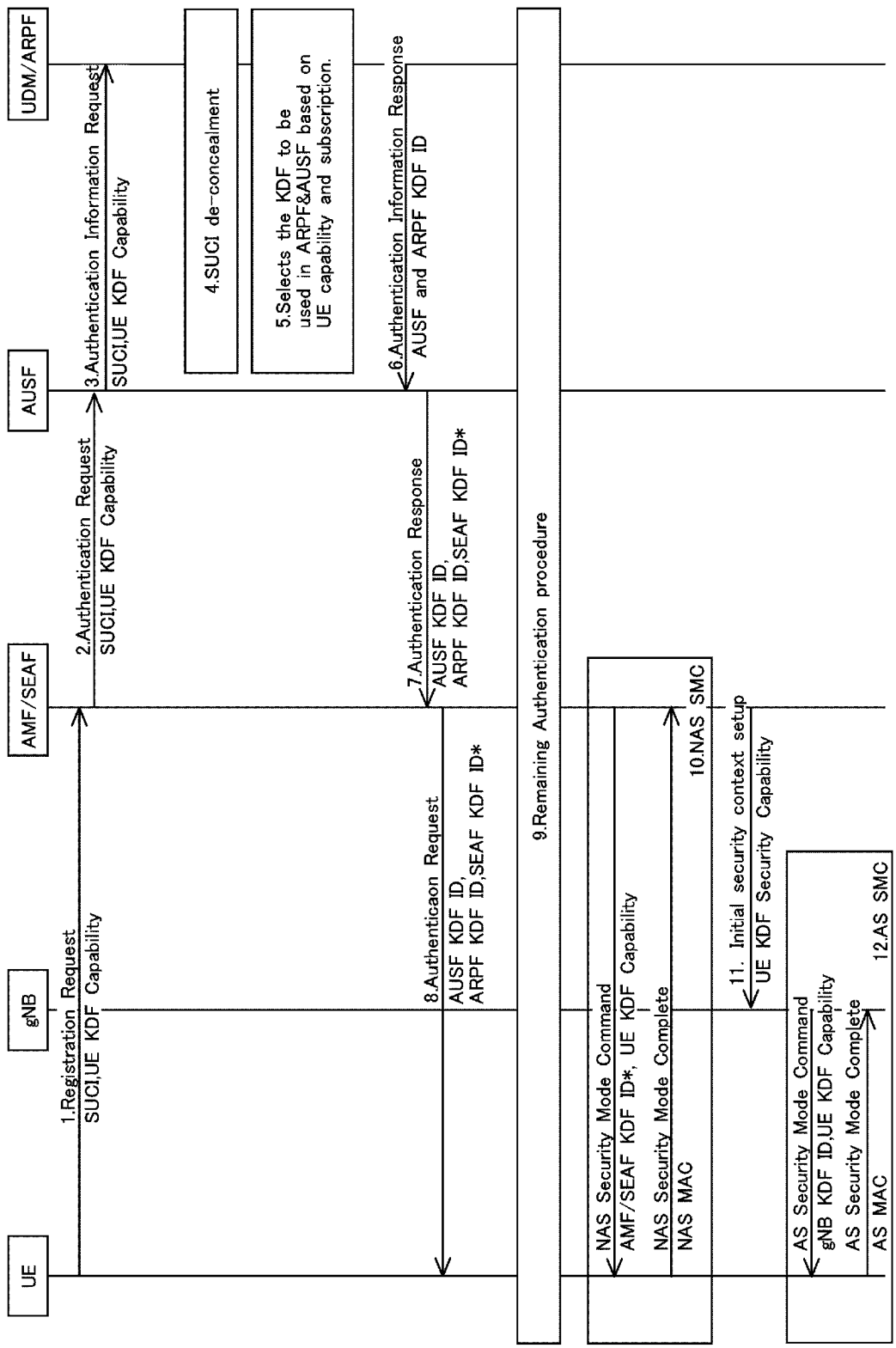
FIG. 11 is a sequence chart illustrating a UE initiated KDF negotiation procedure for flexible KDF negotiation involving a trusted AMF.

According to an embodiment of the present disclosure as shown in FIG. 11, the UE initiated KDF negotiation procedure for flexible KDF negotiation involving a trusted AMF is described.

1. The UE can send its identity information (UE ID) such as SUCI, IMSI or GPSI and the UE KDF capabilities in the registration request message to the AMF/SEAF.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

2. The AMF/SEAF can initiate the authentication by including the received UE ID and KDF capabilities in the authentication request message and send the authentication request message to the AUSF. The AMF/SEAF can locally store the UE KDF capabilities.

3. The AUSF can send the received UE ID and KDF capabilities in the authentication information request message to the UDM/ARPF.

4. If the SUCI is received in the authentication information request message, the SIDF (offered by the UDM or located elsewhere) can de-conceal the SUCI to retrieve the SUPI.

5. The UDM/ARPF selects, based on its own home network KDF capabilities, serving network KDF capabilities (serving network information along with the SN ID pre-configured in the home network using SLAs) and the received UE KDF capabilities and UE subscription, the KDFs to be used at serving network entities (AMF/SEAF) and home network entities (AUSF, UDM/ARPF) such as SEAF KDF ID, AUSF KDF ID and UDM/ARPF KDF ID. The KDFs selected by the network should be the KDF with the reasonably highest priority in all the UE and the corresponding network functions.

The UDM/ARPF uses the selected UDM/ARPF KDF for the CK/IK or CK'/IK' or any key derivation or authenticator vector generation.

The selected KDF parameter can be the UDM/ARPF KDF identification information (KDF ID), AUSF KDF ID and SEAF KDF ID.

The network selected KDF can be used for all key derivation involved in the 5GS.

6. The UDM/ARPF then sends the network selected UDM/ARPF KDF ID, AUSF KDF ID and SEAF KDF ID in the authentication information response message to the AUSF along with the UE identification information.

7. The AUSF sends the received network selected KDF information (UDM/ARPF KDF ID, AUSF KDF ID and SEAF KDF ID) to the AMF/SEAF in the authentication response message. The AUSF locally stores the AUSF KDF ID and the UE Identification information.

8. The AMF/SEAF sends the received network selected KDF information (UDM/ARPF KDF ID, AUSF KDF ID and SEAF KDF ID) to the UE in the authentication request message. The AMF/SEAF locally stores the SEAF KDF ID and the UE identification information if received.

The UE/USIM verifies if the received network selected KDFs (UDM/ARPF KDF ID, AUSF KDF ID and SEAF KDF ID) are in accordance with the UE KDF capability. If the UE supports the received network selected KDFs, then the UE derives all 5GS related security keys (CK/IK or CK'/IK', master key, anchor key, NAS keys, AS keys etc) using the KDFs pointed by the received UDM/ARPF KDF ID, AUSF KDF ID and SEAF KDF ID.

If the UE finds any discrepancy with the network selected KDF and UE KDF capability, the UE can either send the KDF error message to the network in any subsequent NAS message or renegotiate with the 5G core network by sending the received network selected KDF information and UE KDF capabilities with the KDF reselection indicator with the related cause value.

9. The remaining authentication procedure is performed.

10. Following a successful authentication procedure, as a proof for bidding down prevention, the AMF/SEAF can replay the UE KDF capability along the KDF selected by the AMF for generating NAS keys in the NAS security mode command message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF. The UE can use the AMF KDF ID indicated by the AMF for derivation of NAS keys.

11. Following a successful NAS security, the AMF/SEAF can send an initial AS security context setup message to the gNB along with the UE KDF capability.

12. The gNB can send the AS security mode command message to the UE along with the UE KDF capability and the gNB KDF ID for generating the AS security keys. The UE can verify the correctness of the received UE KDF capability. If the verification is successful, the UE can send a "KDF negotiation success indication" in the AS security mode complete message back to the gNB. If the verification fails, the UE can send the "KDF negotiation failure indication" in the AS security mode complete message back to the gNB. The UE can use the gNB KDF ID indicated by the gNB for derivation of AS keys.

A person skilled in the art would appreciate that if the SEAF is co-located with the AMF, then the AMF may or may not use the same KDF as the SEAF.

Figure 12:
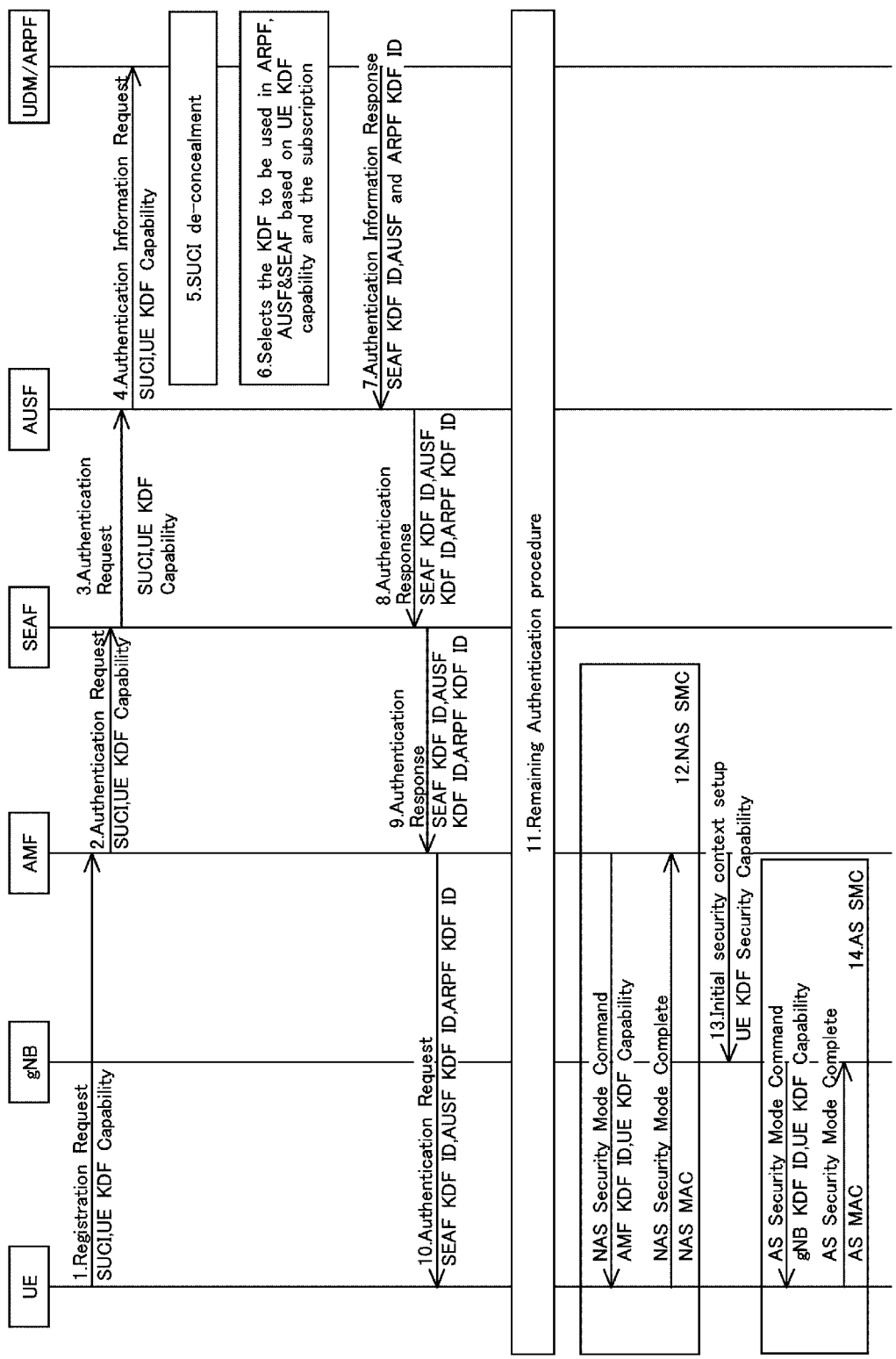
FIG. 12 is a sequence chart illustrating a UE initiated KDF negotiation procedure for a flexible KDF negotiation involving a trusted AMF with a standalone SEAF.

According to an embodiment of the present disclosure as shown in FIG. 12, the UE initiated the KDF negotiation procedure for flexible KDF negotiation involving a trusted AMF is described.

1. The UE can send its identity information (UE ID) such as SUCI, IMSI or GPSI and the UE KDF capabilities in the registration request message to the AMF.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

2. The AMF can send the authentication request message to the SEAF including the received UE ID and KDF capabilities. The AMF can locally store the UE KDF capabilities.

3. The SEAF can initiate the authentication by including the received UE ID and KDF capabilities in the authentication request message and send the authentication request message to the AUSF. The SEAF can locally store the UE KDF capabilities.

4. The AUSF can send the received UE ID and KDF capabilities in the authentication information request message to the UDM/ARPF.

5. If the SUCI is received in the authentication information request message, the SIDF (offered by the UDM or located elsewhere) can de-conceal the SUCI to retrieve the SUPI.

6. The UDM/ARPF selects, based on its own home network KDF capabilities, serving network KDF capabilities (serving network information along with the SN ID pre-configured in the home network using SLAs) and the received UE KDF capabilities and UE subscription, the KDFs to be used at serving network entities (AMF/SEAF) and home network entities (AUSF, UDM/ARPF) such as SEAF KDF ID, AUSF KDF ID and UDM/ARPF KDF ID. The KDFs selected by the network should be the KDF with the reasonable highest priority in all the UE and the corresponding network functions.

The UDM/ARPF uses the selected UDM/ARPF KDF for the CK/IK or CK'/IK' or any key derivation or authenticator vector generation.

The selected KDF parameter can be the UDM/ARPF KDF identification information (KDF ID), AUSF KDF ID and SEAF KDF ID.

The network selected KDF can be used for all key derivation involved in the 5GS.

7. The UDM/ARPF then sends the network selected UDM/ARPF KDF ID, AUSF KDF ID and SEAF KDF ID in the authentication information response message to the AUSF along with the UE identification information.

8. The AUSF sends the received network selected KDF information (UDM/ARPF KDF ID, AUSF KDF ID and SEAF KDF ID) to the SEAF in the authentication response message. The AUSF locally stores the AUSF KDF ID and the UE Identification information.

9. The SEAF sends the received network selected KDF information (UDM/ARPF KDF ID, AUSF KDF ID and SEAF KDF ID) to the AMF in the authentication request message. The SEAF locally stores the SEAF KDF ID and the UE identification information if received.

10. The AMF sends the received network selected KDF information (UDM/ARPF KDF ID, AUSF KDF ID and SEAF KDF ID) to the UE in the authentication request message.

The UE/USIM verifies if the received network selected KDFs (UDM/ARPF KDF ID, AUSF KDF ID and SEAF KDF ID) are in accordance with the UE KDF capability. If the UE supports the received network selected KDFs, then the UE derives all 5GS related security keys (CK/IK or CK'/IK', master key, anchor key, NAS keys, AS keys etc.) using the KDFs pointed by the received UDM/ARPF KDF ID, AUSF KDF ID and SEAF KDF ID.

11. The remaining authentication procedure is performed.

If the UE finds any discrepancy with the network selected KDF and UE KDF capability, the UE can either send the KDF error message to the network in any subsequent NAS message or renegotiate with the 5G core network by sending the received network selected KDF information and UE KDF capabilities with the KDF reselection indicator with the related cause value.

12. Following a successful authentication procedure, as a proof for bidding down prevention, the AMF/SEAF can replay the UE KDF capability along the KDF selected by the AMF for generating NAS keys in the NAS security mode command message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF. The UE can use the AMF KDF ID indicated by the AMF for derivation of NAS keys.

13. Following a successful NAS security, the AMF/SEAF can send an initial AS security context setup message to the gNB along with the UE KDF capability.

14. The gNB can send the AS security mode command message to the UE along with the UE KDF capability and the gNB KDF ID for generating the AS security keys. The UE can verify the correctness of the received UE KDF capability. If the verification is successful, the UE can send a "KDF negotiation success indication" in the AS security mode complete message back to the gNB. If the verification fails, the UE can send the "KDF negotiation failure indication" in the AS security mode complete message back to the gNB. The UE can use the gNB KDF ID indicated by the gNB for derivation of AS keys.

A person skilled in the art would appreciate that, if the SEAF is a standalone NF/NE, it can be a home network NF/NE.

Figure 13:
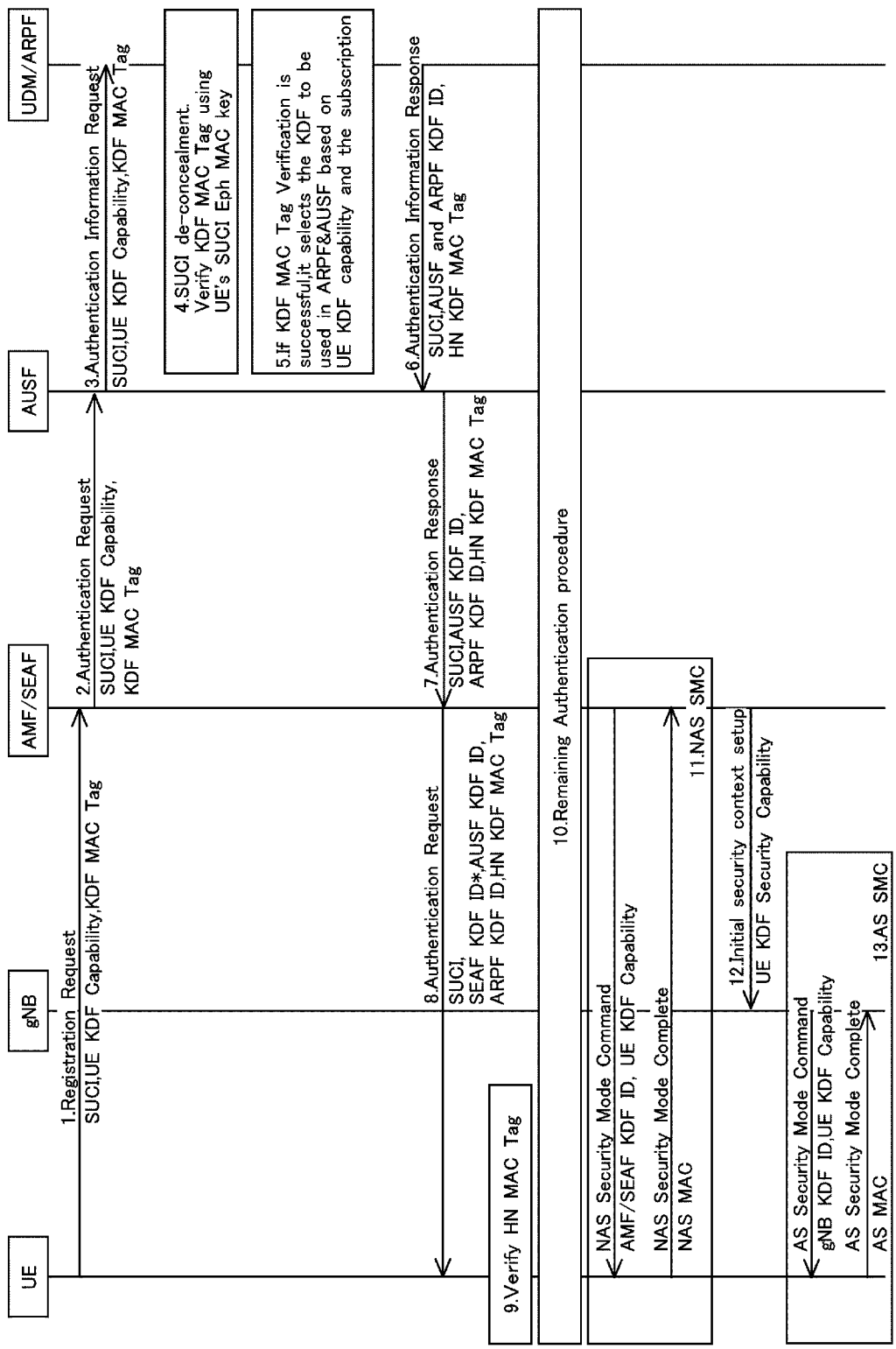
FIG. 13 is a sequence chart illustrating a UE initiated KDF negotiation procedure for flexible KDF negotiation involving a less trusted AMF.

According to an embodiment of the present disclosure as shown in FIG. 13, the UE initiated KDF negotiation procedure for flexible KDF negotiation involving a less trusted AMF is described.

1. The UE can send its identity information (UE ID) such as SUCI, IMSI or GPSI, the UE KDF capabilities and KDF MAC tag in the registration request message to the AMF/SEAF.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

2. The AMF/SEAF can initiate the authentication by including the received UE ID, KDF capabilities and corresponding KDF MAC tag in the authentication request message and send the authentication request message to the AUSF. The AMF/SEAF can locally store the UE KDF capabilities.

3. The AUSF can send the received UE ID, KDF capabilities and corresponding KDF MAC tag in the authentication information request message to the UDM/ARPF.

4. If the SUCI is received in the authentication information request message, the SIDF (offered by the UDM or located elsewhere) can de-conceal the SUCI to retrieve the SUPI. The UDM/ARPF can verify the KDF MAC tag by retrieving the security context (UE's ephemeral MAC key) related to the SUPI.

5. If the KDF MAC verification is successful, the UDM/ARPF selects, based on its own home network KDF capabilities, serving network KDF capabilities (serving network information along with the SN ID pre-configured in the home network using SLAs) and the received UE KDF capabilities and UE subscription, the KDFs to be used at serving network entities (AMF/SEAF) and home network entities (AUSF, UDM/ARPF) such as SEAF KDF ID, AUSF KDF ID and UDM/ARPF KDF ID. The KDFs selected by the network should be the KDF with the reasonable highest priority in all the UE and the corresponding network functions.

The UDM/ARPF uses the selected UDM/ARPF KDF for the CK/IK or CK'/IK' or any key derivation or authenticator vector generation.

The selected KDF parameter can be the UDM/ARPF KDF identification information (KDF ID), AUSF KDF ID and SEAF KDF ID.

The network selected KDF can be used for all key derivation involved in the 5GS.

6. The UDM/ARPF then sends the network selected UDM/ARPF KDF ID, AUSF KDF ID and SEAF KDF ID in the authentication information response message to the AUSF along with the UE identification information and the home network generated KDF MAC tag of the network selected KDF ID(s) to prevent KDF bidding down attacks. The KDF MAC tag can derived as shown in FIG. 6 or using any keyed/salted hash.

7. The AUSF sends the received network selected KDF information (UDM/ARPF KDF ID, AUSF KDF ID and SEAF KDF ID) and the corresponding KDF MAC tag to the AMF/SEAF in the authentication response message. The AUSF locally stores the AUSF KDF ID and the UE Identification information.

8. The AMF/SEAF sends the received network selected KDF information (UDM/ARPF KDF ID, AUSF KDF ID and SEAF KDF ID) and the corresponding KDF MAC tag to the UE in the authentication request message. The AMF/SEAF locally stores the SEAF KDF ID and the UE identification information if received.

9. The UE/USIM verifies the received KDF MAC tag. If the verification is successful, the UE further verifies the received network selected KDFs (UDM/ARPF KDF ID, AUSF KDF ID and SEAF KDF ID) is in accordance with the UE KDF capability. If the UE supports the received network selected KDFs, then the UE derives all 5GS related security keys (CK/IK or CK'/IK', master key, anchor key, NAS keys, AS keys etc) using the KDFs pointed by the received UDM/ARPF KDF ID, AUSF KDF ID and SEAF KDF ID.

10. The remaining authentication procedure is performed.

If the UE finds any discrepancy with the network selected KDF and UE KDF capability, the UE can either send the KDF error message to the network in any subsequent NAS message or renegotiate with the 5G core network by sending the received network selected KDF information and UE KDF capabilities with the KDF reselection indicator with the related cause value.

If the home network generated KDF MAC tag verification fails at the UE, the UE sends the UE KDF negotiation failure notification to the network.

11. Following a successful authentication procedure, as a proof for bidding down prevention, the AMF/SEAF can replay the UE KDF capability along the KDF selected by the AMF for generating NAS keys in the NAS security mode command message. The UE can verify the correctness of the received UE KDF capability. If the verification is successful, the UE can send a "KDF negotiation success indication" in the NAS security mode complete message back to the AMF. If the verification fails the UE can send the "KDF negotiation failure indication" in the NAS security mode complete message back to the AMF. The UE can use the AMF KDF ID indicated by the AMF for derivation of NAS keys.

12. Following a successful NAS security, the AMF/SEAF can send an initial AS security context setup message to the gNB along with the UE KDF capability.

13. The gNB can send the AS security mode command message to the UE along with the UE KDF capability and the gNB KDF ID for generating the AS security keys. The UE can verify the correctness of the received UE KDF capability. If the verification is successful, the UE can send a "KDF negotiation success indication" in the AS security mode complete message back to the gNB. If the verification fails, the UE can send the "KDF negotiation failure indication" in the AS security mode complete message back to the gNB. The UE can use the gNB KDF ID indicated by the gNB for derivation of AS keys.

A person skilled in the art would appreciate that if the SEAF is co-located with the AMF, then the AMF may or may not use the same KDF as the SEAF.

Figure 14:
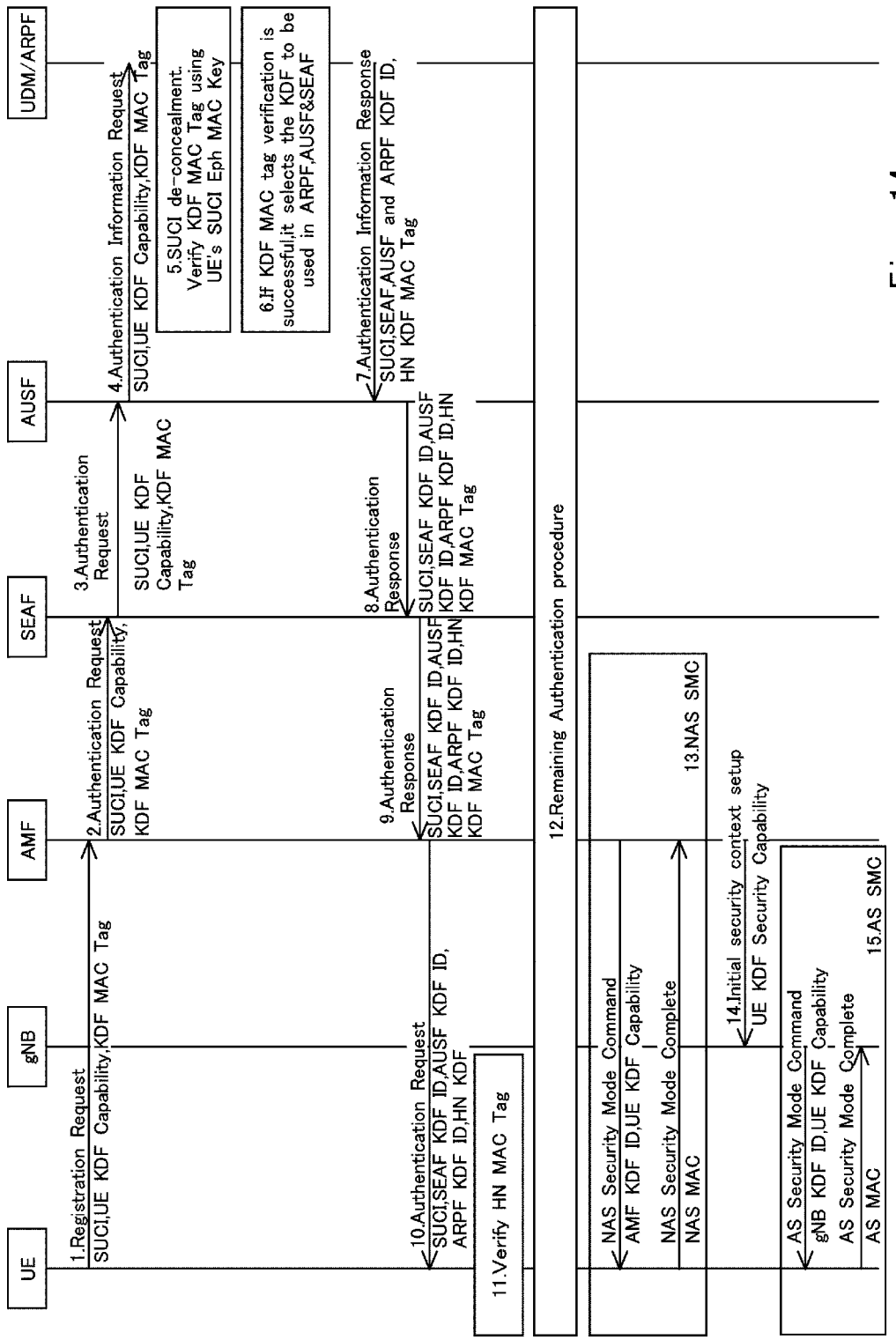
FIG. 14 is a sequence chart illustrating a UE initiated KDF negotiation procedure for flexible KDF negotiation involving a less trusted AMF with a standalone SEAF.

According to an embodiment of the present disclosure as shown in FIG. 14, the UE initiated KDF negotiation procedure for flexible KDF negotiation involving a less trusted AMF with a standalone SEAF is described.

1. The UE can send its identity information (UE ID) such as SUCI, IMSI or GPSI, the UE KDF capabilities and KDF MAC tag in the registration request message to the AMF.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

2. The AMF can send the authentication request message to the SEAF including the received UE ID, KDF capabilities and the KDF MAC tag. The AMF can locally store the UE KDF capabilities.

3. The SEAF can initiate the authentication by including the received UE ID, KDF capabilities and corresponding KDF MAC tag in the authentication request message and send the authentication request message to the AUSF. The SEAF can locally store the UE KDF capabilities.

4. The AUSF can send the received UE ID, KDF capabilities and corresponding KDF MAC tag in the authentication information request message to the UDM/ARPF.

5. If the SUCI is received in the authentication information request message, the SIDF (offered by the UDM or located elsewhere) can de-conceal the SUCI to retrieve the SUPI. The UDM/ARPF can verify the KDF MAC tag by retrieving the security context (UE's ephemeral MAC key) related to the SUPI.

6. If the KDF MAC verification is successful, the UDM/ARPF selects, based on its own home network KDF capabilities, serving network KDF capabilities (serving network information along with the SN ID pre-configured in the home network using SLAs) and the received UE KDF capabilities and UE subscription, the KDFs to be used at serving network entities (AMF/SEAF) and home network entities (AUSF, UDM/ARPF) such as SEAF KDF ID, AUSF KDF ID and UDM/ARPF KDF ID. The KDFs selected by the network should be the KDF with the reasonable highest priority in all the UE and the corresponding network functions.

The UDM/ARPF uses the selected UDM/ARPF KDF for the CK/IK or CK/IK' or any key derivation or authenticator vector generation.

The selected KDF parameter can be the UDM/ARPF KDF identification information (KDF ID), AUSF KDF ID and SEAF KDF ID.

The network selected KDF can be used for all key derivation involved in the 5GS.

7. The UDM/ARPF then sends the network selected UDM/ARPF KDF ID, AUSF KDF ID and SEAF KDF ID in the authentication information response message to the AUSF along with the UE identification information and the home network generated KDF MAC tag of the network selected KDF ID(s) to prevent KDF bidding down attacks.

8. The AUSF sends the received network selected KDF information (UDM/ARPF KDF ID, AUSF KDF ID and SEAF KDF ID) and the corresponding KDF MAC tag to the SEAF in the authentication response message. The AUSF locally stores the AUSF KDF ID and the UE Identification information.

9. The SEAF sends the received network selected KDF information (UDM/ARPF KDF ID, AUSF KDF ID and SEAF KDF ID) and the corresponding KDF MAC tag to the AMF in the authentication request message. The SEAF locally stores the SEAF KDF ID and the UE identification information if received.

10. The AMF sends the received network selected KDF information (UDM/ARPF KDF ID, AUSF KDF ID and SEAF KDF ID) to the UE in the authentication request message.

The UE/USIM verifies the received KDF MAC tag. If the verification is successful, the UE further verifies the received network selected KDFs (UDM/ARPF KDF ID, AUSF KDF ID and SEAF KDF ID) is in accordance with the UE KDF capability. If the UE supports the received network selected KDFs, then the UE derives all 5GS related security keys (CK/IK or CK'/IK', master key, anchor key, NAS keys, AS keys etc) using the KDFs pointed by the received UDM/ARPF KDF ID, AUSF KDF ID and SEAF KDF ID.

12. The remaining authentication procedure is performed.

If the UE finds any discrepancy with the network selected KDF and UE KDF capability, the UE can either send the KDF error message to the network in any subsequent NAS message or renegotiate with the 5G core network by sending the received network selected KDF information and UE KDF capabilities with the KDF reselection indicator with the related cause value.

If the home network generated KDF MAC tag verification fails at the UE, the UE sends the UE KDF negotiation failure notification to the network.

13. Following a successful authentication procedure, as a proof for bidding down prevention, the AMF/SEAF can replay the UE KDF capability along the KDF selected by the AMF for generating NAS keys in the NAS security mode command message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF. The UE can use the AMF KDF ID indicated by the AMF for derivation of NAS keys.

14. Following a successful NAS security, the AMF/SEAF can send an initial AS security context setup message to the gNB along with the UE KDF capability.

15. The gNB can send the AS security mode command message to the UE along with the UE KDF capability and the gNB KDF ID for generating the AS security keys. The UE can verify the correctness of the received UE KDF capability. If the verification is successful, the UE can send a "KDF negotiation success indication" in the AS security mode complete message back to the gNB. If the verification fails, the UE can send the "KDF negotiation failure indication" in the AS security mode complete message back to the gNB. The UE can use the gNB KDF ID indicated by the gNB for derivation of AS keys.

A person skilled in the art would appreciate that if the SEAF is co-located with the AMF, then the AMF may or may not use the same KDF as the SEAF.

Figure 15:
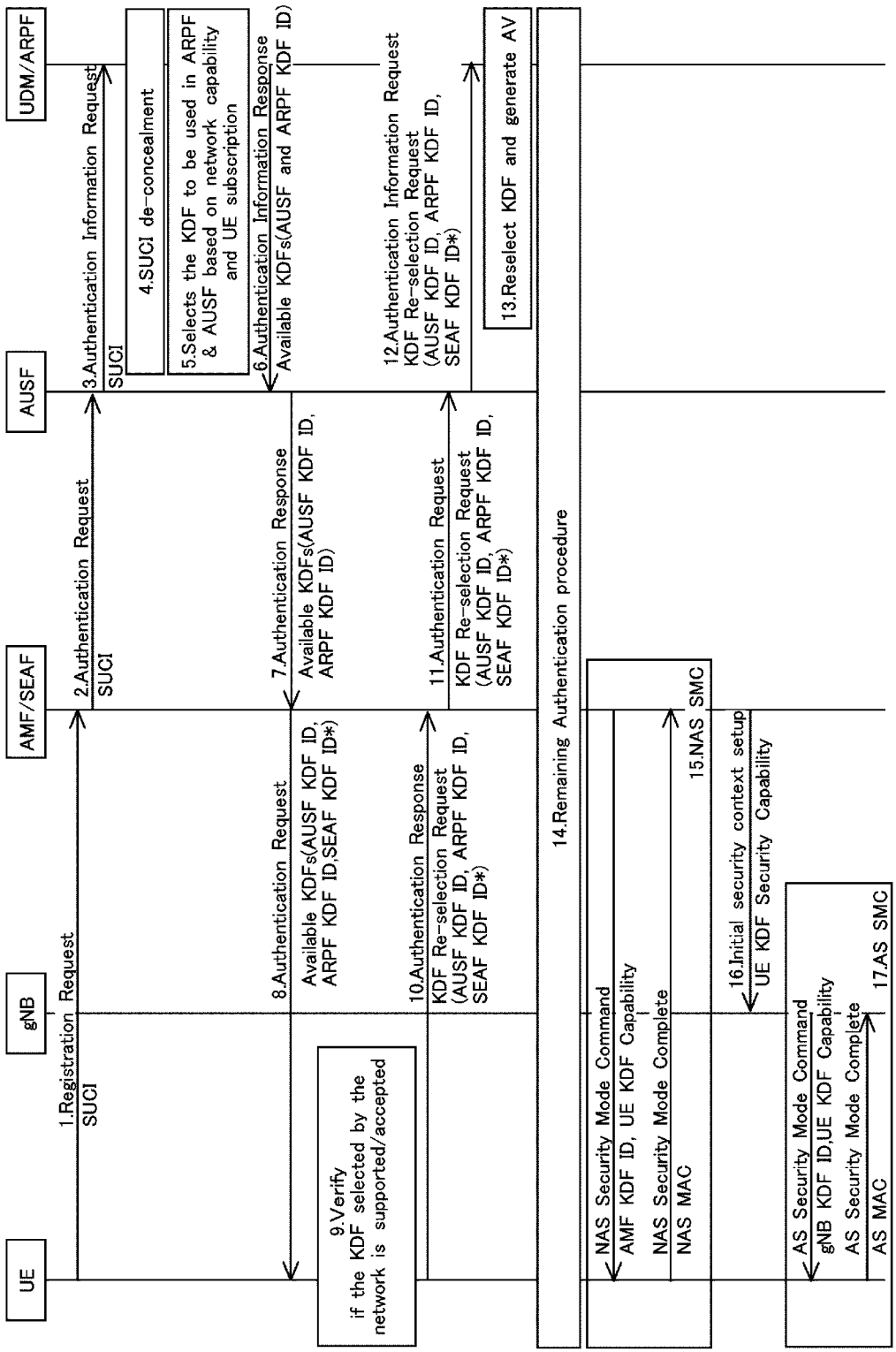
FIG. 15 is a sequence chart illustrating a network initiated KDF negotiation procedure for flexible KDF negotiation involving a trusted AMF.

According to an embodiment of the present disclosure as shown in FIG. 15, the network initiated KDF negotiation procedure for flexible KDF negotiation involving a trusted AMF.

1. The UE can send its identity information (UE ID) such as SUCI, IMSI or GPSI in the registration request message to the AMF/SEAF.

2. The AMF/SEAF can initiate the authentication by including the received UE ID in the authentication request message and send the authentication request message to the AUSF.

3. The AUSF can send the received UE ID in the authentication information request message to the UDM/ARPF.

4. If the SUCI is received in the authentication information request message, the SIDF (offered by the UDM or located elsewhere) can de-conceal the SUCI to retrieve the SUPI.

5. The UDM/ARPF selects, based on its own home network KDF capabilities, serving network KDF capabilities (serving network KDF capability information along with the SN ID pre-configured in the home network using SLAs) and the UE subscription, the KDFs to be used at serving network entities (AMF/SEAF) and home network entities (AUSF, UDM/ARPF) such as SEAF KDF ID, AUSF KDF ID and UDM/ARPF KDF ID. The KDFs selected by the network should be the KDF with the reasonable highest priority in the UE and the all corresponding 5GS network functions.

The UDM/ARPF uses the selected UDM/ARPF KDF for the CK/IK or CK/IK' or any key derivation or authenticator vector generation.

The selected/available KDF parameter contains the UDM/ARPF KDF identification information (KDF ID), AUSF KDF ID and SEAF KDF ID.

The network selected KDF can be used for all key derivation involved in the 5GS.

6. The UDM/ARPF then sends the network selected KDFs (available KDFs) such as UDM/ARPF KDF ID, AUSF KDF ID and SEAF KDF ID in the authentication information response message to the AUSF along with the UE identification information.

7. The AUSF sends the received network selected KDF information (available KDFs such as UDM/ARPF KDF ID, AUSF KDF ID and SEAF KDF ID) to the AMF/SEAF in the authentication response message. The AUSF locally stores the AUSF KDF ID and the UE Identification information.

8. The AMF/SEAF sends the received network selected KDF (available KDFs) information (UDM/ARPF KDF ID, AUSF KDF ID and SEAF KDF ID) to the UE in the authentication request message. The AMF/SEAF locally stores the SEAF KDF ID and the UE identification information if received.

9. The UE/USIM verifies if the received network selected KDFs (UDM/ARPF KDF ID, AUSF KDF ID and SEAF KDF ID) is in accordance with the UE KDF capability. If the UE supports the received network selected KDFs, then the UE derives all 5GS related security keys (CK/IK or CK'/IK', master key, anchor key, NAS keys, AS keys etc) using the KDFs pointed by the received UDM/ARPF KDF ID, AUSF KDF ID and SEAF KDF ID.

If the UE finds any discrepancy with the network selected KDF (available KDFs) and UE KDF capability, the UE can either send the KDF error message to the network in any subsequent NAS message or renegotiate with the 5G core network by sending the received network selected KDF information and UE KDF capabilities with the KDF reselection indicator with the related cause value.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

10. The UE can send its preferred KDF according to its own KDF capabilities and network KDF capabilities inferred from the available KDF using the KDF re-selection request in the authentication response message to the AMF/SEAF along with the UE KDF capability. This message can also contain the UE ID.

11. The authentication response message can be forwarded by the AMF to the AUSF.

12. Then the AUSF can send the authentication information request message to the UDM/ARPF along with the KDF re-selection request.

13. The UDM/ARPF selects the KDF indicated by the UE as its preference and re-derives CK/IK or CK'/IK' and other key materials using the newly selected KDF. The UDM/ARPF sends the authentication response message to the AUSF along with the KDF ID selected as a token of acknowledgement to the UE along with the AV in the authentication information response message. Then the AUSF sends the received selected KDF ID, RAND and AUTN to the AMF/SEAF. The AMF then sends the received selected KDF ID, RAND and AUTN to the UE. The UE uses the received KDF ID for all subsequent key derivation.

14. The remaining authentication procedure is performed.

15. Following a successful authentication procedure, as a proof for bidding down prevention, the AMF/SEAF can replay the UE KDF capability along the KDF selected by the AMF for generating NAS keys in the NAS security mode command message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF. The UE can use the AMF KDF ID indicated by the AMF for derivation of NAS keys.

16. Following a successful NAS security, the AMF/SEAF can send an initial AS security context setup message to the gNB along with the UE KDF capability.

17. The gNB can send the AS security mode command message to the UE along with the UE KDF capability and the gNB KDF ID for generating the AS security keys. The UE can verify the correctness of the received UE KDF capability. If the verification is successful, the UE can send a "KDF negotiation success indication" in the AS security mode complete message back to the gNB. If the verification fails, the UE can send the "KDF negotiation failure indication" in the AS security mode complete message back to the gNB. The UE can use the gNB KDF ID indicated by the gNB for derivation of AS keys.

A person skilled in the art would appreciate that if the SEAF is co-located with the AMF, then the AMF may or may not use the same KDF as the SEAF.

Figure 16:
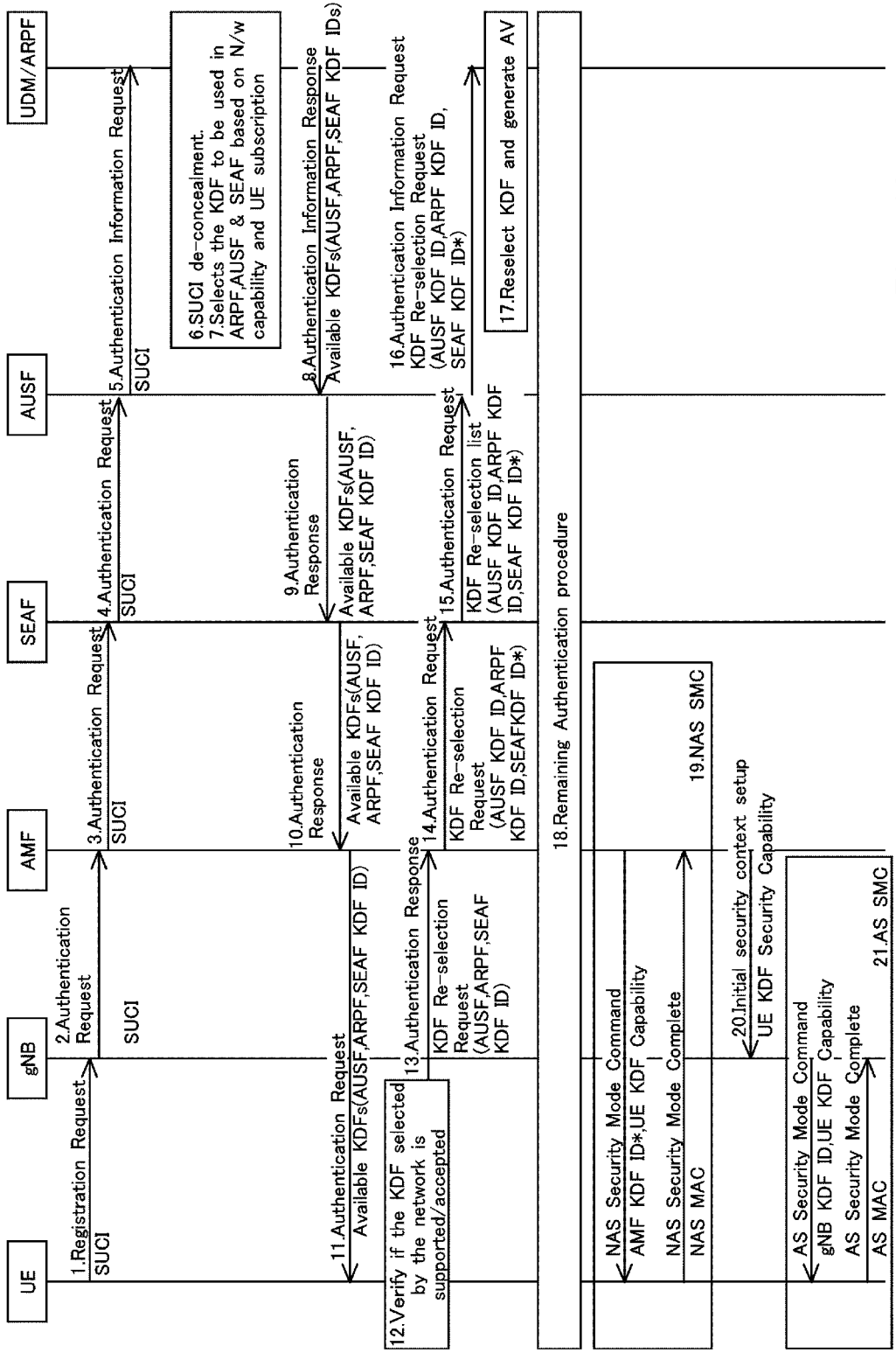
FIG. 16 is a sequence chart illustrating a network initiated KDF negotiation procedure for flexible KDF negotiation involving a trusted AMF with a standalone SEAF.

According to an embodiment of the present disclosure as shown in FIG. 16, the network initiated KDF negotiation procedure for flexible KDF negotiation involving a trusted AMF with a standalone SEAF is described.

1. The UE can send its identity information (UE ID) such as SUCI, IMSI or GPSI in the registration request message to the gNB.

2. The gNB can send the authentication request message including the received UE ID to the AMF.

3. The AMF can send the authentication request message including the received UE ID to the SEAF.

4. The SEAF can initiate the authentication by including the received UE ID in the authentication request message and send the authentication request message to the AUSF.

5. The AUSF can send the received UE ID in the authentication information request message to the UDM/ARPF.

6. If the SUCI is received in the authentication information request message, the SIDF (offered by the UDM or located elsewhere) can de-conceal the SUCI to retrieve the SUPI.

7. The UDM/ARPF selects, based on its own home network KDF capabilities, serving network KDF capabilities (serving network information along with the SN ID pre-configured in the home network using SLAs) and the UE subscription, the KDFs to be used at serving network entities (AMF/SEAF) and home network entities (AUSF, UDM/ARPF) such as SEAF KDF ID, AUSF KDF ID and UDM/ARPF KDF ID. The KDFs selected by the network should be the KDF with the reasonable highest priority in the UE and the all corresponding 5GS network functions.

The UDM/ARPF uses the selected UDM/ARPF KDF for the CK/IK or CK'/IK' or any key derivation or authenticator vector generation.

The selected/available KDF parameter contains the UDM/ARPF KDF identification information (KDF ID), AUSF KDF ID and SEAF KDF ID.

The network selected KDF can be used for all key derivation involved in the 5GS.

8. The UDM/ARPF then sends the network selected KDFs (available KDFs) such as UDM/ARPF KDF ID, AUSF KDF ID and SEAF KDF ID in the authentication information response message to the AUSF along with the UE identification information.

9. The AUSF sends the received network selected KDF information (available KDFs such as UDM/ARPF KDF ID, AUSF KDF ID and SEAF KDF ID) to the SEAF in the authentication response message. The AUSF locally stores the AUSF KDF ID and the UE Identification information.

10. The SEAF sends the received network selected KDF (available KDFs) information (UDM/ARPF KDF ID, AUSF KDF ID and SEAF KDF ID) to the AMF in the authentication request message. The SEAF locally stores the SEAF KDF ID and the UE identification information if received.

11. The AMF sends the received network selected KDF (available KDFs) information (UDM/ARPF KDF ID, AUSF KDF ID and SEAF KDF ID) to the UE in the authentication request message.

12. The UE/USIM verifies if the received network selected KDFs (UDM/ARPF KDF ID, AUSF KDF ID and SEAF KDF ID) is in accordance with the UE KDF capability. If the UE supports the received network selected KDFs, then the UE derives all 5GS related security keys (CK/IK or CK'/IK', master key, anchor key, NAS keys, AS keys etc) using the KDFs pointed by the received UDM/ARPF KDF ID, AUSF KDF ID and SEAF KDF ID.

If the UE finds any discrepancy with the network selected KDF (available KDFs) and UE KDF capability, the UE can either send the KDF error message to the network in any subsequent NAS message or renegotiate with the 5G core network by sending the received network selected KDF information and UE KDF capabilities with the KDF reselection indicator with the related cause value.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

13. The UE can send its preferred KDF according to its own KDF capabilities and network KDF capabilities inferred from the available KDF using the KDF re-selection request in the authentication response message to the AMF along with the UE KDF capability. This message can also contain the UE ID.

14. The authentication response message can be forwarded by the AMF to the SEAF.

15. The authentication response message can be forwarded by the SEAF to the AUSF.

16. Then the AUSF can send the authentication information request message to the UDM/ARPF along with the KDF re-selection request.

17. The UDM/ARPF selects the KDF indicated by the UE as its preference and re-derives CK/IK or CK'/IK' and other key materials using the newly selected KDF. The UDM/ARPF sends the authentication response message to the AUSF along with the KDF ID selected as a token of acknowledgement to the UE along with the AV in the authentication information response message. Then the AUSF sends the received selected KDF ID, RAND and AUTN to the SEAF. The SEAF sends the received selected KDF ID, RAND and AUTN to the AMF. The AMF then sends the received selected KDF ID, RAND and AUTN to the UE. The UE uses the received KDF ID for all subsequent key derivation.

18. The remaining authentication procedure is performed.

19. Following a successful authentication procedure, as a proof for bidding down prevention, the AMF/SEAF can replay the UE KDF capability along the KDF selected by the AMF for generating NAS keys in the NAS security mode command message. The UE can verify the correctness of the received UE KDF capability. If the verification is successful, the UE can send a "KDF negotiation success indication" in the NAS security mode complete message back to the AMF. If the verification fails the UE can send the "KDF negotiation failure indication" in the NAS security mode complete message back to the AMF. The UE can use the AMF KDF ID indicated by the AMF for derivation of NAS keys.

20. Following a successful NAS security, the AMF/SEAF can send an initial AS security context setup message to the gNB along with the UE KDF capability.

21. The gNB can send the AS security mode command message to the UE along with the UE KDF capability and the gNB KDF ID for generating the AS security keys. The UE can verify the correctness of the received UE KDF capability. If the verification is successful, the UE can send a "KDF negotiation success indication" in the AS security mode complete message back to the gNB. If the verification fails, the UE can send the "KDF negotiation failure indication" in the AS security mode complete message back to the gNB. The UE can use the gNB KDF ID indicated by the gNB for derivation of AS keys.

A person skilled in the art would appreciate that if the SEAF is co-located with the AMF, then the AMF may or may not use the same KDF as the SEAF.

Figure 17:
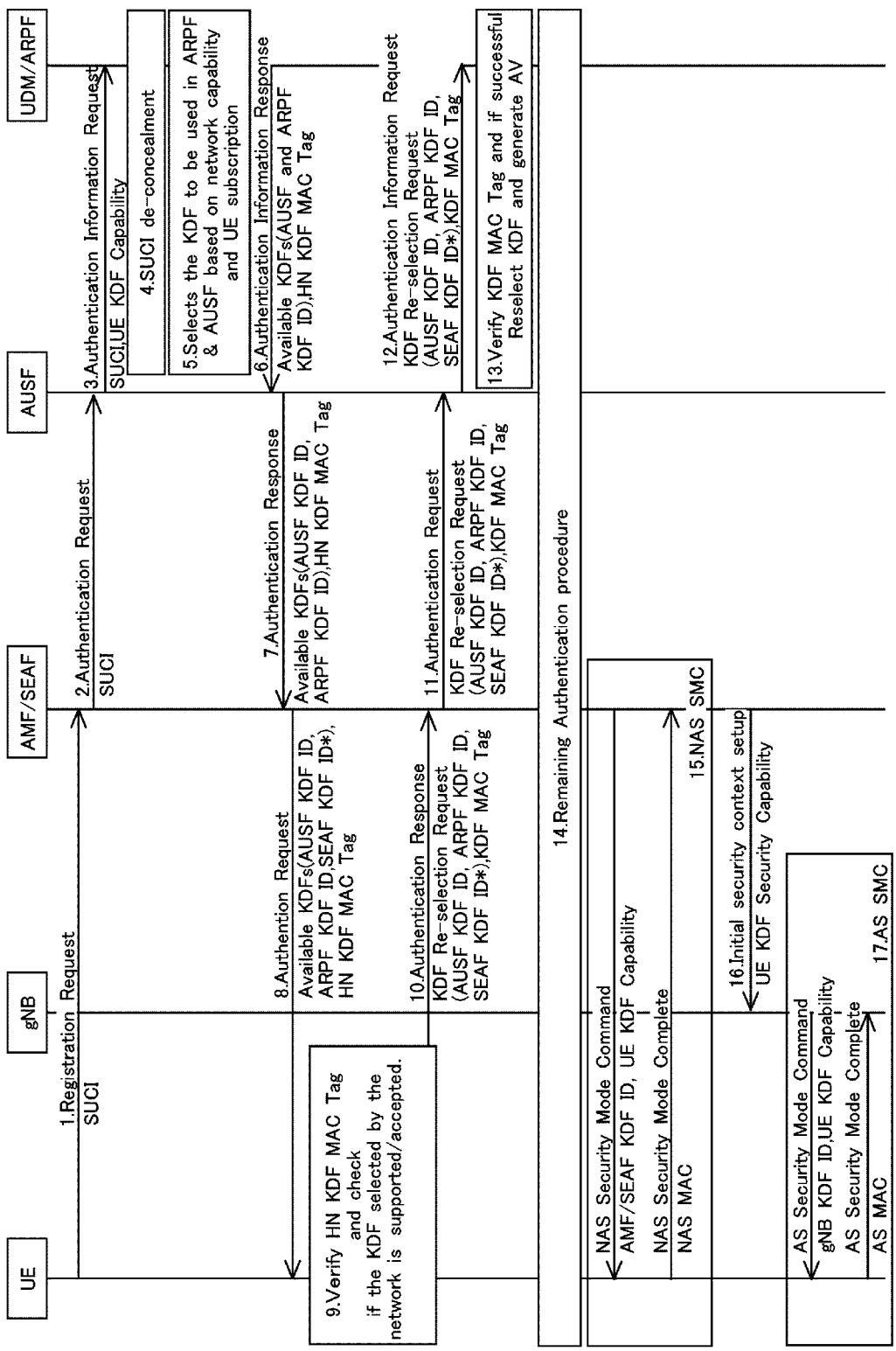
FIG. 17 is a sequence chart illustrating a network initiated KDF negotiation procedure for flexible KDF negotiation involving a less trusted AMF.

According to an embodiment of the present disclosure as shown in FIG. 17, the network initiated KDF negotiation procedure for flexible KDF negotiation involving a less trusted AMF.

1. The UE can send its identity information (UE ID) such as SUCI, IMSI or GPSI in the registration request message to the AMF/SEAF.

2. The AMF/SEAF can initiate the authentication by including the received UE ID in the authentication request message and send the authentication request message to the AUSF.

3. The AUSF can send the received UE ID in the authentication information request message to the UDM/ARPF.

4. If the SUCI is received in the authentication information request message, the SIDF (offered by the UDM or located elsewhere) can de-conceal the SUCI to retrieve the SUPI.

5. The UDM/ARPF selects, based on its own home network KDF capabilities, serving network KDF capabilities (serving network information along with the SN ID pre-configured in the home network using SLAs) and the UE subscription, the KDFs to be used at serving network entities (AMF/SEAF) and home network entities (AUSF, UDM/ARPF) such as SEAF KDF ID, AUSF KDF ID and UDM/ARPF KDF ID. The KDFs selected by the network should be the KDF with the reasonable highest priority in the UE and the all corresponding 5GS network functions.

The UDM/ARPF uses the selected UDM/ARPF KDF for the CK/IK or CK/IK' or any key derivation or authenticator vector generation.

The selected/available KDF parameter contains the UDM/ARPF KDF identification information (KDF ID), AUSF KDF ID and SEAF KDF ID.

The network selected KDF can be used for all key derivation involved in the 5GS.

6. The UDM/ARPF then sends the network selected KDFs (available KDFs) such as UDM/ARPF KDF ID, AUSF KDF ID and SEAF KDF ID in the authentication information response message to the AUSF along with the UE identification information and the home network generated KDF MAC tag of the network selected KDF ID(s) such as UDM/ARPF KDF identification information (KDF ID), AUSF KDF ID and SEAF KDF ID to prevent KDF bidding down attacks. The KDF MAC tag can derived as shown in FIG. 6 or using any keyed/salted hash.

7. The AUSF sends the received network selected KDF information (available KDFs such as UDM/ARPF KDF ID, AUSF KDF ID and SEAF KDF ID) and its corresponding KDF MAC tag to the AMF/SEAF in the authentication response message. The AUSF locally stores the AUSF KDF ID and the UE Identification information.

8. The AMF/SEAF sends the received network selected KDF (available KDFs) information (UDM/ARPF KDF ID, AUSF KDF ID and SEAF KDF ID) and its corresponding KDF MAC tag to the AMF/SEAF to the UE in the authentication request message. The AMF/SEAF locally stores the SEAF KDF ID and the UE identification information if received.

9. The UE/USIM verifies the received KDF MAC tag. If the verification is successful, the UE further verifies if the received network selected KDFs (UDM/ARPF KDF ID, AUSF KDF ID and SEAF KDF ID) is in accordance with the UE KDF capability. If the UE supports the received network selected KDFs, then the UE derives all 5GS related security keys (CK/IK or CK'/IK', master key, anchor key, NAS keys, AS keys etc) using the KDFs pointed by the received UDM/ARPF KDF ID, AUSF KDF ID and SEAF KDF ID.

If the UE finds any discrepancy with the network selected KDF (available KDFs) and UE KDF capability, the UE can either send the KDF error message to the network in any subsequent NAS message or renegotiate with the 5G core network by sending the received network selected KDF information and UE KDF capabilities with the KDF reselection indicator with the related cause value and the KDF MAC tag value.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

The KDF MAC or KDF MAC tag contains the message authentication code or digest or hash of the UE KDF capabilities. The KDF MAC can be generated using a keyed hash or salted hash. The KDF MAC or KDF MAC tag is used for integrity protection of the UE KDF capabilities against bidding down attacks in case of less trusted AMFs and less trusted serving network deployments.

The KDF MAC tag can also be generated over all the KDF related information sent in a message to ensure integrity protection of the KDF information against bidding down attacks.

10. The UE can send its preferred KDF according to its own KDF capabilities and network KDF capabilities inferred from the available KDF using the KDF re-selection request in the authentication response message to the AMF/SEAF along with the UE KDF capability and KDF MAC tag. This message can also contain the UE ID.

11. The authentication response message can be forwarded by the AMF to the AUSF.

12. Then the AUSF can send the authentication information request message to the UDM/ARPF along with the KDF re-selection request.

13. The UDM/ARPF verifies the KDF MAC tag and the re-selection request and the cause value and, if it is genuine, the UDM/ARPF selects the KDF indicated by the UE as its preference and re-derives CK/IK or CK'/IK' and other key materials using the newly selected KDF. The UDM/ARPF sends the authentication response message to the AUSF along with the KDF ID selected as a token of acknowledgement to the UE along with the AV in the authentication information response message. Then the AUSF sends the received selected KDF ID, RAND and AUTN to the AMF/SEAF. The AMF then sends the received selected KDF ID, RAND and AUTN to the UE. The UE uses the received KDF ID for all subsequent key derivation.

If the home network generated KDF MAC tag verification fails at the UE, the UE sends the UE KDF negotiation failure notification to the network in the subsequent NAS message.

14. The remaining authentication procedure is performed.

15. Following a successful authentication procedure, as a proof for bidding down prevention, the AMF/SEAF can replay the UE KDF capability along the KDF selected by the AMF for generating NAS keys in the NAS security mode command message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF. The UE can use the AMF KDF ID indicated by the AMF for derivation of NAS keys.

16. Following a successful NAS security, the AMF/SEAF can send an initial AS security context setup message to the gNB along with the UE KDF capability.

17. The gNB can send the AS security mode command message to the UE along with the UE KDF capability and the gNB KDF ID for generating the AS security keys. The UE can verify the correctness of the received UE KDF capability. If the verification is successful, the UE can send a "KDF negotiation success indication" in the AS security mode complete message back to the gNB. If the verification fails, the UE can send the "KDF negotiation failure indication" in the AS security mode complete message back to the gNB. The UE can use the gNB KDF ID indicated by the gNB for derivation of AS keys.

Figure 18:
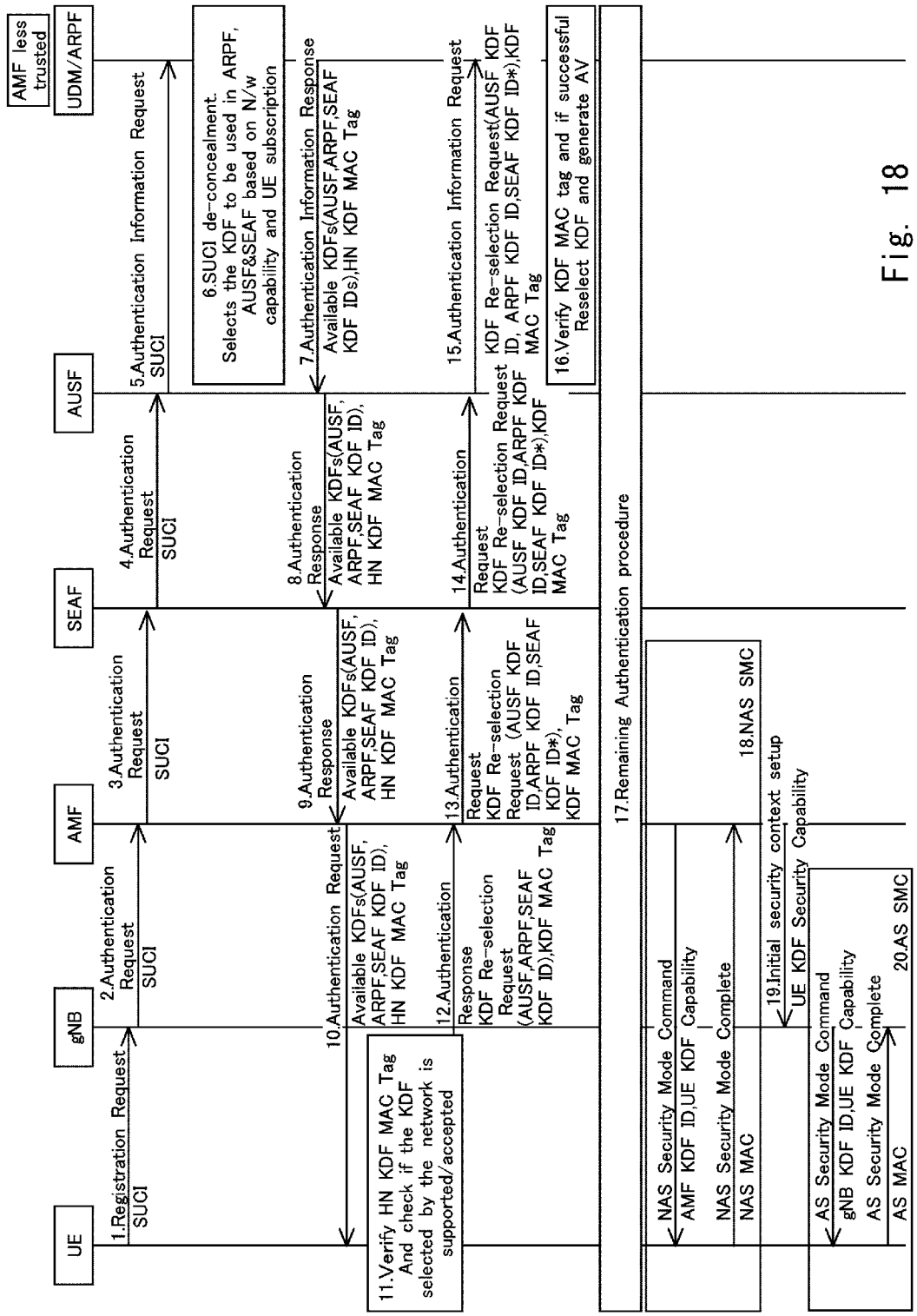
FIG. 18 is a sequence chart illustrating a network initiated KDF negotiation procedure for flexible KDF negotiation involving a less trusted AMF with a standalone SEAF.

According to an embodiment of the present disclosure as shown in FIG. 18, the network initiated KDF negotiation procedure for flexible KDF negotiation involving a less trusted AMF with a standalone SEAF.

A person skilled in the art would appreciate that if the SEAF is co-located with AMF, then AMF may or may not use the same KDF as the SEAF.

1. The UE can send its identity information (UE ID) such as SUCI, IMSI or GPSI in the registration request message to the gNB.

2. The gNB can send the authentication request message including the received UE ID to the AMF.

3. The AMF can send the authentication request message including the received UE ID to the SEAF.

4. The SEAF can initiate the authentication by including the received UE ID in the authentication request message and send the authentication request message to the AUSF.

5. The AUSF can send the received UE ID in the authentication information request message to the UDM/ARPF.

6. If the SUCI is received in the authentication information request message, the SIDF (offered by the UDM or located elsewhere) can de-conceal the SUCI to retrieve the SUPI. The UDM/ARPF selects, based on its own home network KDF capabilities, serving network KDF capabilities (serving network information along with the SN ID pre-configured in the home network using SLAs) and the UE subscription, the KDFs to be used at serving network entities (AMF/SEAF) and home network entities (AUSF, UDM/ARPF) such as SEAF KDF ID, AUSF KDF ID and UDM/ARPF KDF ID. The KDFs selected by the network should be the KDF with the reasonable highest priority in the UE and the all corresponding 5GS network functions.

The UDM/ARPF uses the selected UDM/ARPF KDF for the CK/IK or CK'/IK' or any key derivation or authenticator vector generation.

The selected/available KDF parameter contains the UDM/ARPF KDF identification information (KDF ID), AUSF KDF ID and SEAF KDF ID.

The network selected KDF can be used for all key derivation involved in the 5GS.

7. The UDM/ARPF then sends the network selected KDFs (available KDFs) such as UDM/ARPF KDF ID, AUSF KDF ID and SEAF KDF ID in the authentication information response message to the AUSF along with the UE identification information and the home network generated KDF MAC tag of the network selected KDF ID(s) such as UDM/ARPF KDF identification information (KDF ID), AUSF KDF ID and SEAF KDF ID to prevent KDF bidding down attacks.

8. The AUSF sends the received network selected KDF information (available KDFs such as UDM/ARPF KDF ID, AUSF KDF ID and SEAF KDF ID) and its corresponding KDF MAC tag to the SEAF in the authentication response message. The AUSF locally stores the AUSF KDF ID and the UE Identification information.

9. The SEAF sends the received network selected KDF (available KDFs) information (UDM/ARPF KDF ID, AUSF KDF ID and SEAF KDF ID) and its corresponding KDF MAC tag to the AMF in the authentication request message. The SEAF locally stores the SEAF KDF ID and the UE identification information if received.

10. The AMF sends the received network selected KDF (available KDFs) information (UDM/ARPF KDF ID, AUSF KDF ID and SEAF KDF ID) and the home network computed KDF MAC tag to the UE in the authentication request message.

11. The UE/USIM verifies the received KDF MAC tag. If the verification is successful, the UE further verifies if the received network selected KDFs (UDM/ARPF KDF ID, AUSF KDF ID and SEAF KDF ID) is in accordance with the UE KDF capability. If the UE supports the received network selected KDFs, then the UE derives all 5GS related security keys (CK/IK or CK'/IK', master key, anchor key, NAS keys, AS keys etc) using the KDFs pointed by the received UDM/ARPF KDF ID, AUSF KDF ID and SEAF KDF ID.

If the UE finds any discrepancy with the network selected KDF (available KDFs) and UE KDF capability, the UE can either send the KDF error message to the network in any subsequent NAS message or renegotiate with the 5G core network by sending the received network selected KDF information and UE KDF capabilities with the KDF reselection indicator with the related cause value.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

The KDF MAC or KDF MAC tag contains the message authentication code or digest or hash of the UE KDF capabilities. The KDF MAC can be generated using a keyed hash or salted hash. The KDF MAC or KDF MAC tag is used for integrity protection of the UE KDF capabilities against bidding down attacks in case of less trusted AMFs and less trusted serving network deployments.

The KDF MAC tag can also be generated over all the KDF related information sent in a message to ensure integrity protection of the KDF information against bidding down attacks.

12. The UE can send its preferred KDF according to its own KDF capabilities and network KDF capabilities inferred from the available KDF using the KDF re-selection request in the authentication response message to the AMF along with the UE KDF capability and KDF MAC tag. This message can also contain the UE ID.

13. The authentication response message can be forwarded by the AMF to the SEAF.

14. The authentication response message can be forwarded by the SEAF to the AUSF.

15. Then the AUSF can send the authentication information request message to the UDM/ARPF along with the KDF re-selection request.

16. The UDM/ARPF verifies the KDF MAC tag and the re-selection request and the cause value and, if it is genuine, the UDM/ARPF selects the KDF indicated by the UE as its preference and re-derives CK/IK or CK'/IK' and other key materials using the newly selected KDF. The UDM/ARPF sends the authentication response message to the AUSF along with the KDF ID selected as a token of acknowledgement to the UE along with the AV in the authentication information response message. Then the AUSF sends the received selected KDF ID, RAND and AUTN to the SEAF. The SEAF sends the received selected KDF ID, RAND and AUTN to the AMF. The AMF then sends the received selected KDF ID, RAND and AUTN to the UE. The UE uses the received KDF ID for all subsequent key derivation.

If the home network generated KDF MAC tag verification fails at the UE, the UE sends the UE KDF negotiation failure notification to the network in the subsequent NAS message.

17. The remaining authentication procedure is performed.

18. Following a successful authentication procedure, as a proof for bidding down prevention, the AMF/SEAF can replay the UE KDF capability along the KDF selected by the AMF for generating NAS keys in the NAS security mode command message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF. The UE can use the AMF KDF ID indicated by the AMF for derivation of NAS keys.

19. Following a successful NAS security, the AMF/SEAF can send an initial AS security context setup message to the gNB along with the UE KDF capability.

20. The gNB can send the AS security mode command message to the UE along with the UE KDF capability and the gNB KDF ID for generating the AS security keys. The UE can verify the correctness of the received UE KDF capability. If the verification is successful, the UE can send a "KDF negotiation success indication" in the AS security mode complete message back to the gNB. If the verification fails, the UE can send the "KDF negotiation failure indication" in the AS security mode complete message back to the gNB. The UE can use the gNB KDF ID indicated by the gNB for derivation of AS keys.

Figure 19:
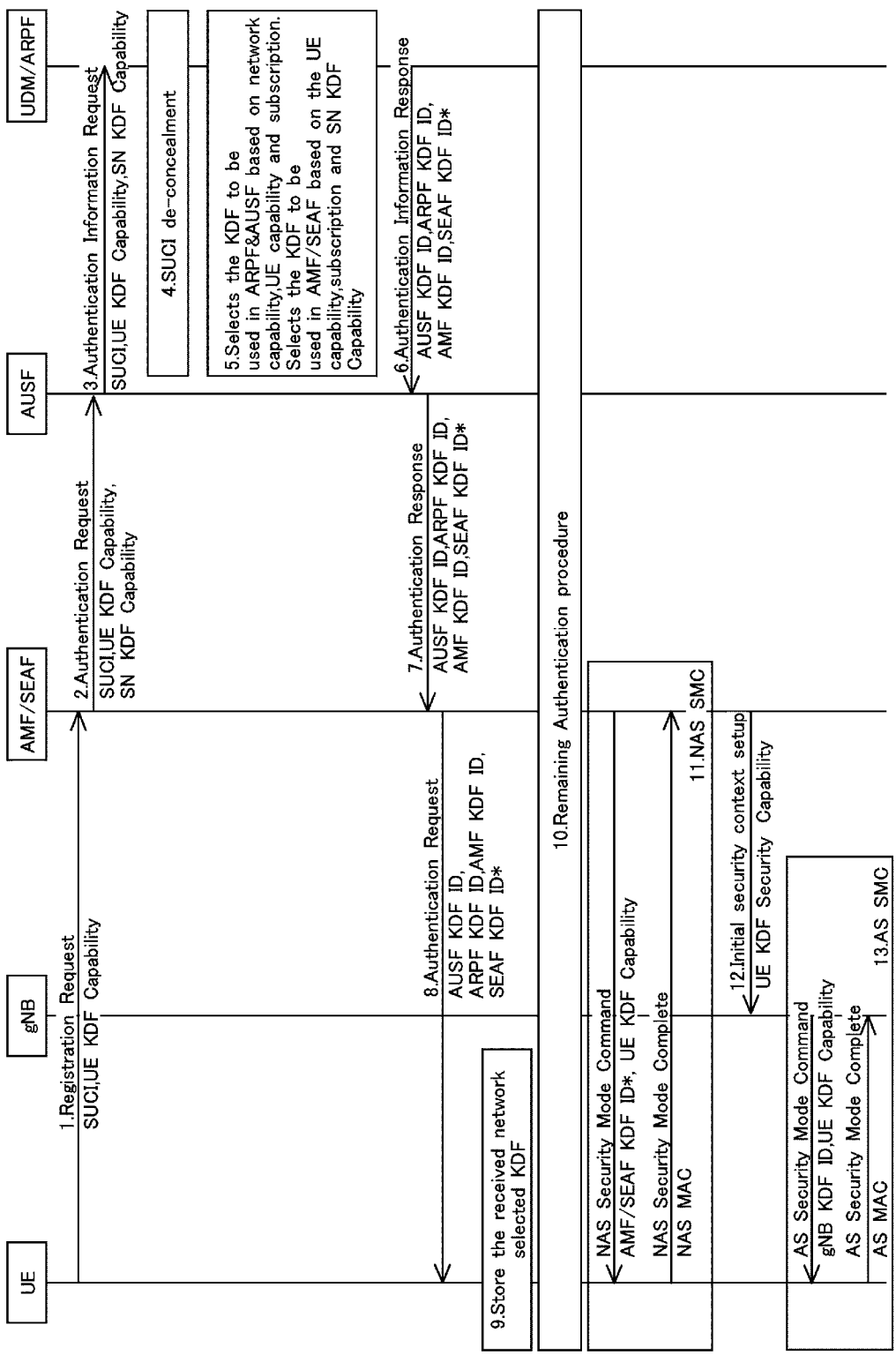
FIG. 19 is a sequence chart illustrating a UE initiated KDF negotiation procedure for flexible KDF negotiation with a trusted AMF (with home control).

According to an embodiment of the present disclosure as shown in FIG. 19, UE initiated KDF negotiation procedure for flexible KDF negotiation with trusted AMF (with home control) is described.

A person skilled in the art would appreciate that if the SEAF is co-located with the AMF, then the AMF may or may not use the same KDF as the SEAF. Further, the serving network function/entity can store the KDF notified from the home network along with UE identification information for further key derivation. Alternatively, After KDF negotiation, every network function/entity can store the KDF selected/notified by the UDM/ARPF along with corresponding UE identification information.

1. The UE can send it's identity information (UE ID) such as SUCI, IMSI or GPSI and the UE KDF capabilities in the registration request message to the AMF/SEAF.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

2. The AMF/SEAF can initiate the authentication by including the received UE ID, UE KDF capabilities and its own serving network (SN)/AMF KDF capabilities (AMF/SEAF KDF ID (s)) in the authentication request message and send the authentication request message to the AUSF. The AMF/SEAF can locally store the UE KDF capabilities.

3. The AUSF can send the received UE ID, UE KDF capabilities, the SN KDF capabilities and the AUSF KDF capabilities in the authentication information request message to the UDM/ARPF.

4. If the SUCI is received in the authentication information request message, the SIDF (offered by the UDM or located elsewhere) can de-conceal the SUCI to retrieve the SUPI.

5. The UDM/ARPF selects the UDM/ARPF KDF ID based on its own home network KDF capabilities, UE KDF capabilities and UE subscription information. Further, the UDM/ARPF selects the AUSF KDF ID based on the received AUSF KDF capabilities, UE KDF capabilities and subscription information. Furthermore, the UDM/ARPF selects, based on the serving network KDF capabilities (AMF/SEAF), UE KDF capabilities and UE subscription, the KDFs to be used at serving network entities/functions (AMF/SEAF) such as AM/SEAF KDF ID. The KDFs selected by the network (KDF related to UDM/ARPF KDF ID, AUSF KDF ID, and SEAF KDF ID/AMF KDF ID) should be the KDF with the reasonable highest priority in all the UE and the corresponding network functions.

The UDM/ARPF uses the selected UDM/ARPF KDF for the CK/IK or CK/IK' or any key derivation or authenticator vector generation.

The selected KDF parameter can be the UDM/ARPF KDF identification information (KDF ID), AUSF KDF ID and SEAF KDF ID.

The network selected KDF can be used for all key derivation involved in the 5GS.

6. The UDM/ARPF then sends the network selected UDM/ARPF KDF ID, AUSF KDF ID and SEAF KDF ID in the authentication information response message to the AUSF along with the UE identification information.

7. The AUSF sends the received network selected KDF information (UDM/ARPF KDF ID, AUSF KDF ID and SEAF KDF ID) to the AMF/SEAF in the authentication response message. The AUSF locally stores the AUSF KDF ID and the UE Identification information.

8. The AMF/SEAF sends the received network selected KDF information (UDM/ARPF KDF ID, AUSF KDF ID and SEAF KDF ID) to the UE in the authentication request message. The AMF/SEAF locally stores the SEAF KDF ID and the UE identification information if received.

9. The UE/USIM stores the received network selected KDFs.

The UE/USIM verifies if the received network selected KDFs (UDM/ARPF KDF ID, AUSF KDF ID and SEAF KDF ID) is in accordance with the UE KDF capability. If the UE supports the received network selected KDFs, then the UE derives all 5GS related security keys (CK/IK or CK'/IK', master key, anchor key, NAS keys, AS keys etc) using the KDFs pointed by the received UDM/ARPF KDF ID, AUSF KDF ID and SEAF KDF ID.

10. The remaining authentication procedure is performed.

If the UE finds any discrepancy with the network selected KDF and UE KDF capability, the UE can either send the KDF error message to the network in any subsequent NAS message or renegotiate with the 5G core network by sending the received network selected KDF information and UE KDF capabilities with the KDF reselection indicator with the related cause value.

11. Following a successful authentication procedure, as a proof for bidding down prevention, the AMF/SEAF can replay the UE KDF capability along the AMF KDF capability and KDF selected by the AMF for generating NAS keys in the NAS security mode command message. The UE can verify the correctness of the received UE KDF capability. If the verification is successful, the UE can send a "KDF negotiation success indication" in the NAS security mode complete message back to the AMF. If the verification fails the UE can send the "KDF negotiation failure indication" in the NAS security mode complete message back to the AMF. The UE can use the AMF KDF ID indicated by the AMF for derivation of NAS keys.

12. Following a successful NAS security, the AMF/SEAF can send an initial AS security context setup message to the gNB along with the UE KDF capability.

13. The gNB can send the AS security mode command message to the UE along with the UE KDF capability, gNB KDF capability and the selected gNB KDF ID for generating the AS security keys. The UE can verify the correctness of the received UE KDF capability. If the verification is successful, the UE can send a "KDF negotiation success indication" in the AS security mode complete message back to the gNB. If the verification fails the UE can send the "KDF negotiation failure indication" in the AS security mode complete message back to the gNB. The UE can use the gNB KDF ID indicated by the gNB for derivation of AS keys.

Figure 20:
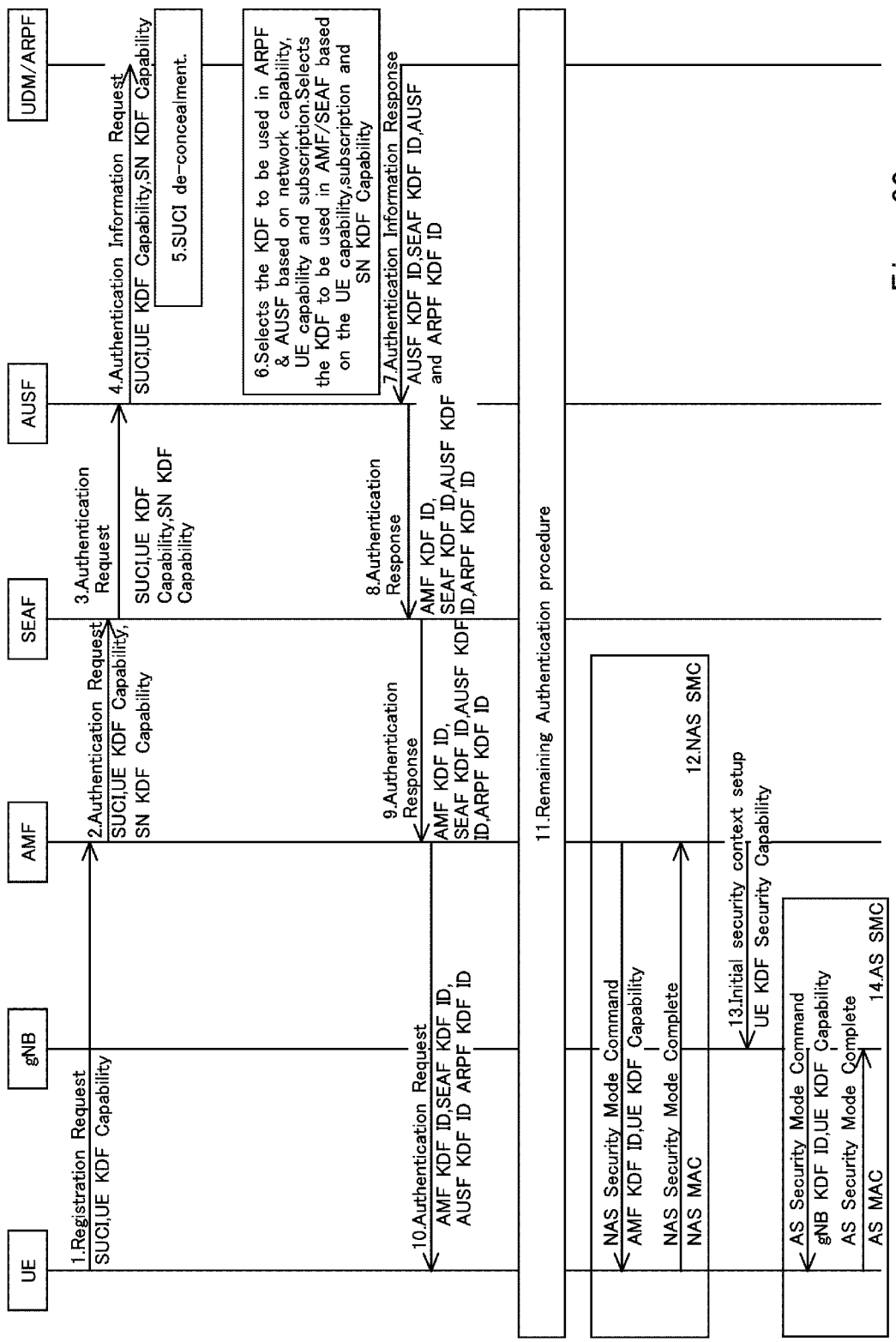
FIG. 20 is a sequence chart illustrating a UE initiated KDF negotiation procedure for flexible KDF negotiation with a trusted AMF and a standalone SEAF (with home control).

According to an embodiment of the present disclosure as shown in FIG. 20, the UE initiated KDF negotiation procedure for flexible KDF negotiation with a trusted AMF and a standalone SEAF (with home control).

A person skilled in the art would appreciate that if the SEAF is a standalone NF/NE, it can be a home network NF/NE. The UDM/ARPF can select the KDF for SEAF along with ARPF and AUSF KDF selection.

1. The UE can send its identity information (UE ID) such as SUCI, IMSI or GPSI and the UE KDF capabilities in the registration request message to the AMF.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

2. The AMF can send the authentication request message to the SEAF including the received UE ID and UE KDF capabilities along with the optional serving network (SN)/AMF KDF capabilities (AMF KDF capabilities). The AMF can locally store the UE KDF capabilities.

3. The SEAF can initiate the authentication by including the received UE ID, UE KDF capabilities and its own KDF capabilities (SEAF KDF ID (s)) in the authentication request message and send the authentication request message to the AUSF. The SEAF can locally store the UE KDF capabilities.

4. The AUSF can send the received UE ID, UE KDF capabilities, the SN KDF capabilities, SEAF KDF capabilities and the AUSF KDF capabilities in the authentication information request message to the UDM/ARPF.

5. If the SUCI is received in the authentication information request message, the SIDF (offered by the UDM or located elsewhere) can de-conceal the SUCI to retrieve the SUPI.

6. The UDM/ARPF selects the UDM/ARPF KDF ID based on its own home network KDF capabilities, UE KDF capabilities and UE subscription information. Further, the UDM/ARPF selects the AUSF KDF ID based on the received AUSF KDF capabilities, UE KDF capabilities and subscription information. Furthermore, the UDM/ARPF selects, based on the serving network KDF capabilities (AMF) and SEAF KDF capabilities, UE KDF capabilities and UE subscription, the KDFs to be used at serving network entities/functions (AMF) and SEAF such as AMF KDF ID and SEAF KDF ID. The KDFs selected by the network (KDF related to UDM/ARPF KDF ID, AUSF KDF ID, SEAF KDF ID, and OPTIONAL AMF KDF ID*) should be the KDF with the reasonable highest priority in all the UE and the corresponding network functions.

The UDM/ARPF uses the selected UDM/ARPF KDF for the CK/IK or CK/IK' or any key derivation or authenticator vector generation.

The selected KDF parameter can be the UDM/ARPF KDF identification information (KDF ID), AUSF KDF ID and SEAF KDF ID.

The network selected KDF can be used for all key derivation involved in the 5GS.

7. The UDM/ARPF then sends the network selected UDM/ARPF KDF ID, AUSF KDF ID, SEAF KDF ID, and optionally AMF KDF ID in the authentication information response message to the AUSF along with the UE identification information.

8. The AUSF sends the received network selected KDF information (UDM/ARPF KDF ID, AUSF KDF ID, SEAF KDF ID, and optionally AMF KDF ID) to the SEAF in the authentication response message. The AUSF locally stores the AUSF KDF ID and the UE Identification information.

9. The SEAF sends the received network selected KDF information (UDM/ARPF KDF ID, AUSF KDF ID, SEAF KDF ID, and optionally AMF KDF ID) to the AMF in the authentication request message. The SEAF locally stores the SEAF KDF ID and the UE identification information.

10. The AMF sends the received network selected KDF information (UDM/ARPF KDF ID, AUSF KDF ID, SEAF KDF ID, and optionally AMF KDF ID) to the UE in the authentication request message. The AMF locally stores the AMF KDF ID if received along with the UE identification information.

The UE/USIM verifies if the received network selected KDFs (UDM/ARPF KDF ID, AUSF KDF ID and AMF KDF ID*/SEAF KDF ID) is in accordance with the UE KDF capability. If the UE supports the received network selected KDFs, then the UE derives all 5GS related security keys (CK/IK or CK'/IK', master key, anchor key, NAS keys, AS keys etc) using the KDFs pointed by the received UDM/ARPF KDF ID, AUSF KDF ID and SEAF KDF ID.

11. The remaining authentication procedure is performed.

If the UE finds any discrepancy with the network selected KDF and UE KDF capability, the UE can either send the KDF error message to the network in any subsequent NAS message or renegotiate with the 5G core network by sending the received network selected KDF information and UE KDF capabilities with the KDF reselection indicator with the related cause value.

12. Following a successful authentication procedure, as a proof for bidding down prevention, the AMF/SEAF can replay the UE KDF capability along the AMF KDF capability and KDF selected by the AMF for generating NAS keys in the NAS security mode command message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF. The UE can use the AMF KDF ID indicated by the AMF for derivation of NAS keys.

13. Following a successful NAS security, the AMF/SEAF can send an initial AS security context setup message to the gNB along with the UE KDF capability.

14. The gNB can send the AS security mode command message to the UE along with the UE KDF capability, gNB KDF capability and the selected gNB KDF ID for generating the AS security keys. The UE can verify the correctness of the received UE KDF capability. If the verification is successful, the UE can send a "KDF negotiation success indication" in the AS security mode complete message back to the gNB. If the verification fails, the UE can send the "KDF negotiation failure indication" in the AS security mode complete message back to the gNB. The UE can use the gNB KDF ID indicated by the gNB for derivation of AS keys.

Figure 21:
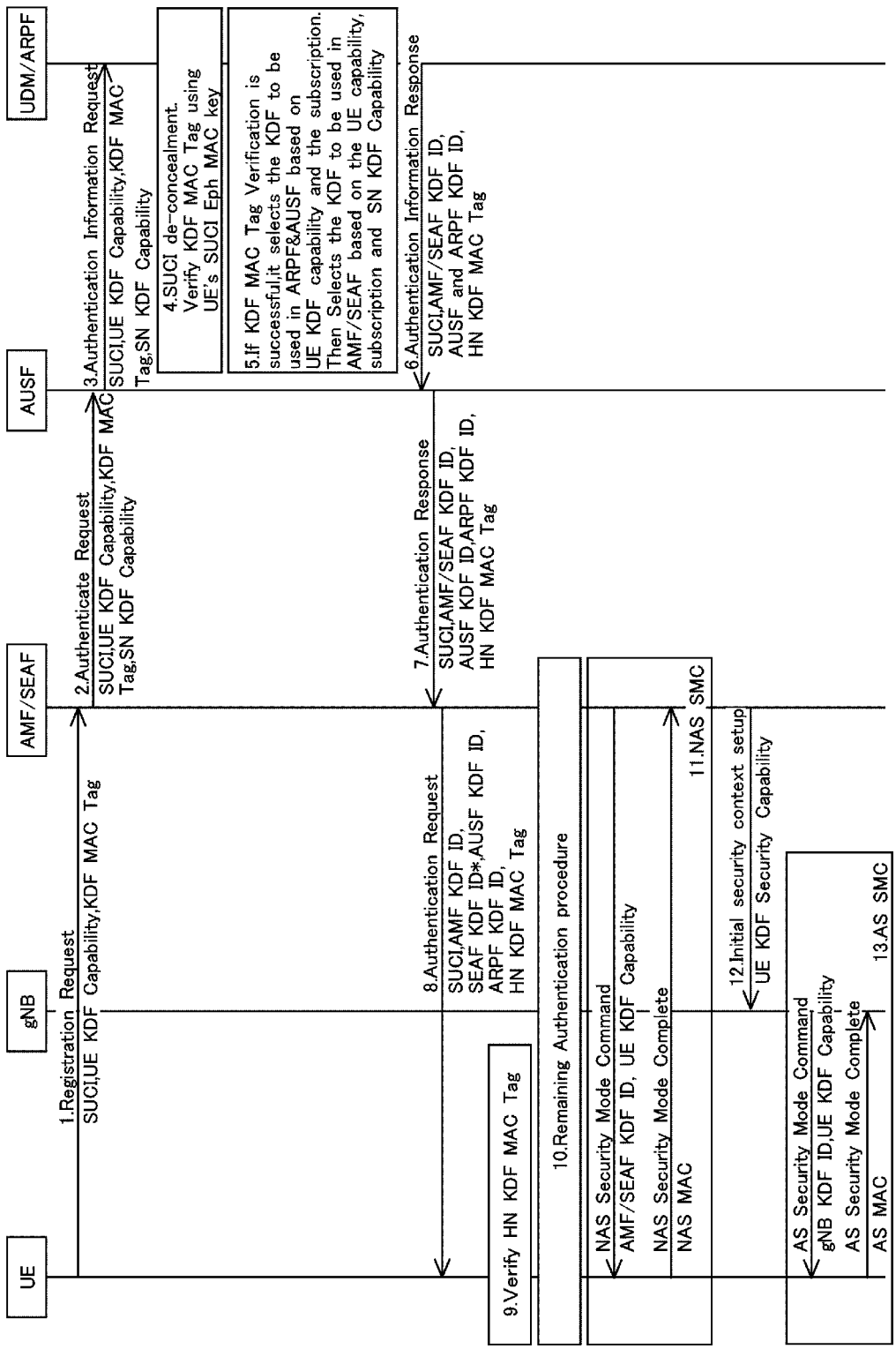
FIG. 21 is a sequence chart illustrating a UE initiated KDF negotiation procedure for flexible KDF negotiation with a less trusted AMF (with home control).

According to an embodiment of the present disclosure as shown in FIG. 21, the UE initiated KDF negotiation procedure for flexible KDF negotiation with a less trusted AMF (with home control) is described.

A person skilled in the art would appreciate that if the SEAF is co-located with the AMF, then the AMF may or may not use the same KDF as the SEAF.

1. The UE can send its identity information (UE ID) such as SUCI, IMSI or GPSI, the UE KDF capabilities and the corresponding KDF MAC tag in the registration request message to the AMF/SEAF.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

The KDF MAC or KDF MAC tag contains the message authentication code or digest or hash of the UE KDF capabilities. The KDF MAC can be generated by the UE using a keyed hash or salted hash. The KDF MAC or KDF MAC tag is used for integrity protection of the UE KDF capabilities against bidding down attacks in case of less trusted AMFs and less trusted serving network deployments.

2. The AMF/SEAF can initiate the authentication by including the received UE ID, UE KDF capabilities, KDF MAC tag and its own serving network (SN) KDF capabilities (AMF/SEAF KDF ID (s)) in the authentication request message and send the authentication request message to the AUSF. The AMF/SEAF can locally store the UE KDF capabilities.

3. The AUSF can send the received UE ID, UE KDF capabilities, the KDF MAC tag, the SN KDF capabilities and the AUSF KDF capabilities in the authentication information request message to the UDM/ARPF.

4. If the SUCI is received in the authentication information request message, the SIDF (offered by the UDM or located elsewhere) can de-conceal the SUCI to retrieve the SUPI. The UDM/ARPF can verify the received KDF MAC tag by retrieving the security context (UE's ephemeral MAC key) related to the SUPI.

5. If the KDF MAC tag verification at the UDM/ARPF is successful, the UDM/ARPF selects the UDM/ARPF KDF ID based on based on its own home network KDF capabilities, UE KDF capabilities and UE subscription information. Further, the UDM/ARPF selects the AUSF KDF ID based on the received AUSF KDF capabilities, UE KDF capabilities and subscription information. Furthermore, the UDM/ARPF selects, based on the serving network KDF capabilities (AMF/SEAF), UE KDF capabilities and UE subscription, the KDFs to be used at serving network entities/functions (AMF/SEAF) such as AM/SEAF KDF ID. The KDFs selected by the network (KDF related to UDM/ARPF KDF ID, AUSF KDF ID, and SEAF KDF ID/AMF KDF ID) should be the KDF with the reasonable highest priority in all the UE and the corresponding network functions.

The UDM/ARPF uses the selected UDM/ARPF KDF for the CK/IK or CK/IK' or any key derivation or authenticator vector generation.

The selected KDF parameter can be the UDM/ARPF KDF identification information (KDF ID), AUSF KDF ID and SEAF KDF ID.

The network selected KDF can be used for all key derivation involved in the 5GS.

6. The UDM/ARPF then sends the network selected UDM/ARPF KDF ID, AUSF KDF ID and SEAF KDF ID in the authentication information response message to the AUSF along with the UE identification information along with the received HN computed KDF MAC tag of the network selected KDF ID(s) to prevent KDF bidding down attacks. The KDF MAC tag can be derived as shown in FIG. 6 or using any keyed/salted hash.

7. The AUSF sends the received network selected KDF information (UDM/ARPF KDF ID, AUSF KDF ID and SEAF KDF ID) and the HN computed KDF MAC tag to the AMF/SEAF in the authentication response message. The AUSF locally stores the AUSF KDF ID and the UE Identification information.

8. The AMF/SEAF sends the received network selected KDF information (UDM/ARPF KDF ID, AUSF KDF ID and SEAF KDF ID) and the HN computed KDF MAC tag to the UE in the authentication request message. The AMF/SEAF locally stores the SEAF KDF ID and the UE identification information if received.

9. The UE/USIM verifies the received KDF MAC tag. If the verification is successful, the UE further verifies if the received network selected KDFs (UDM/ARPF KDF ID, AUSF KDF ID and SEAF KDF ID) is in accordance with the UE KDF capability. If the UE supports the received network selected KDFs, then the UE derives all 5GS related security keys (CK/IK or CK'/IK', master key, anchor key, NAS keys, AS keys etc) using the KDFs pointed by the received UDM/ARPF KDF ID, AUSF KDF ID and SEAF KDF ID.

The remaining authentication procedure is performed.

If the UE finds any discrepancy with the network selected KDF and UE KDF capability, the UE can either send the KDF error message to the network in any subsequent NAS message or renegotiate with the 5G core network by sending the received network selected KDF information and UE KDF capabilities with the KDF reselection indicator with the related cause value.

If the home network generated KDF MAC tag verification fails at the UE, the UE sends the UE KDF negotiation failure notification to the network in the subsequent NAS message.

11. Following a successful authentication procedure, as a proof for bidding down prevention, the AMF/SEAF can replay the UE KDF capability along the AMF KDF capability and KDF selected by the AMF for generating NAS keys in the NAS security mode command message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF. The UE can use the AMF KDF ID indicated by the AMF for derivation of NAS keys.

12. Following a successful NAS security, the AMF/SEAF can send an initial AS security context setup message to the gNB along with the UE KDF capability.

13. The gNB can send the AS security mode command message to the UE along with the UE KDF capability, gNB KDF capability and the selected gNB KDF ID for generating the AS security keys. The UE can verify the correctness of the received UE KDF capability. If the verification is successful, the UE can send a "KDF negotiation success indication" in the AS security mode complete message back to the gNB. If the verification fails, the UE can send the "KDF negotiation failure indication" in the AS security mode complete message back to the gNB. The UE can use the gNB KDF ID indicated by the gNB for derivation of AS keys.

Figure 22:
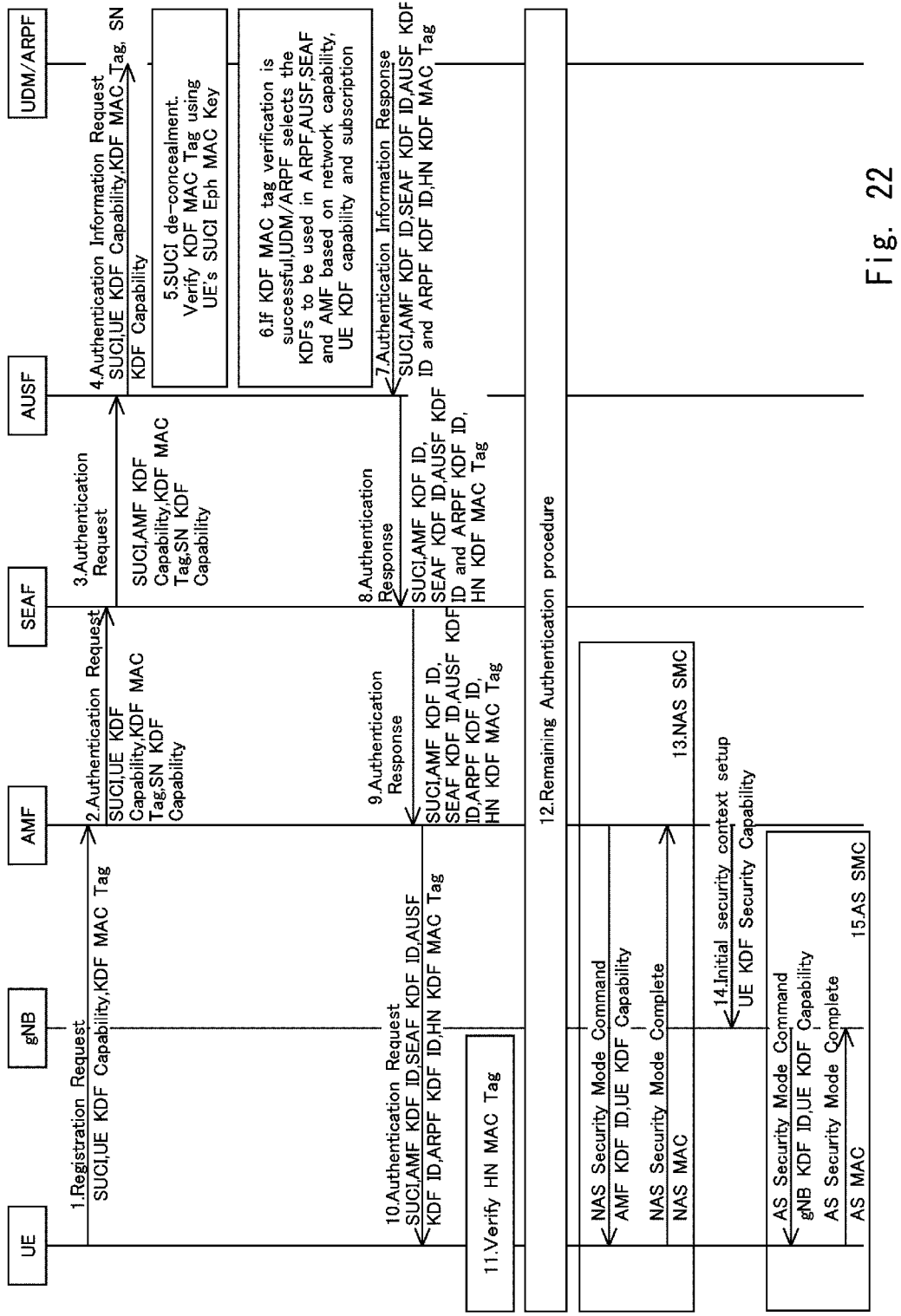
FIG. 22 is a sequence chart illustrating a UE initiated KDF negotiation procedure for flexible KDF negotiation with a less trusted AMF and a standalone SEAF (with home control).

According to an embodiment of the present disclosure as shown in FIG. 22, UE initiated KDF negotiation procedure for flexible KDF negotiation with a less trusted AMF and a standalone SEAF (with home control) is described.

A person skilled in the art would appreciate that if the SEAF has a standalone function, then the SEAF can have separate KDF selection.

1. The UE can send its identity information (UE ID) such as SUCI, IMSI or GPSI, the UE KDF capabilities and the corresponding KDF MAC tag in the registration request message to the AMF.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

The KDF MAC or KDF MAC tag contains the message authentication code or digest or hash of the UE KDF capabilities. The KDF MAC can be generated by the UE using a keyed hash or salted hash. The KDF MAC or KDF MAC tag is used for integrity protection of the UE KDF capabilities against bidding down attacks in case of less trusted AMFs and less trusted serving network deployments.

2. The AMF can send the authentication request message to the SEAF including the received UE ID, UE KDF capabilities and the corresponding KDF MAC tag along with the optional serving network (SN) KDF capabilities (AMF KDF capabilities). The AMF can locally store the UE KDF capabilities.

3. The SEAF can initiate the authentication by including the received UE ID, UE KDF capabilities, KDF MAC tag, the serving network (SN) KDF capabilities (AMF KDF ID and SEAF KDF ID(s)) in the authentication request message and send the authentication request message to the AUSF. The SEAF can locally store the UE KDF capabilities.

4. The AUSF can send the received UE ID, UE KDF capabilities, the KDF MAC tag, the SN KDF capabilities (AMF ID), SEAF ID and the AUSF KDF capabilities in the authentication information request message to the UDM/ARPF.

5. If the SUCI is received in the authentication information request message, the SIDF (offered by the UDM or located elsewhere) can de-conceal the SUCI to retrieve the SUPI. The UDM/ARPF can verify the received KDF MAC tag by retrieving the security context (UE's ephemeral MAC key) related to the SUPI.

6. If the KDF MAC tag verification at the UDM/ARPF is successful, the UDM/ARPF selects the UDM/ARPF KDF ID based on its own home network KDF capabilities, UE KDF capabilities and UE subscription information. Further, the UDM/ARPF selects the AUSF KDF ID based on the received AUSF KDF capabilities, UE KDF capabilities and subscription information. Furthermore, the UDM/APRF selects, based on the serving network KDF capabilities (AMF and SEAF), UE KDF capabilities and UE subscription, the KDFs to be used at serving network entities/functions (AMF and SEAF) such as AMF and SEAF KDF ID. The KDFs selected by the network (KDF related to UDM/ARPF KDF ID, AUSF KDF ID, SEAF KDF ID and AMF KDF ID) should be the KDF with the reasonable highest priority in all the UE and the corresponding network functions.

The UDM/ARPF uses the selected UDM/ARPF KDF for the CK/IK or CK/IK' or any key derivation or authenticator vector generation.

The selected KDF parameter can be the UDM/ARPF KDF identification information (KDF ID), AUSF KDF ID, SEAF KDF ID and optionally AMF KDF ID.

The network selected KDF can be used for all key derivation involved in the 5GS.

7. The UDM/ARPF then sends the network selected UDM/ARPF KDF ID, AUSF KDF ID, SEAF KDF ID and optimally AMF KDF ID in the authentication information response message to the AUSF along with the UE identification information along with the received HN computed KDF MAC tag of the network selected KDF ID(s) to prevent KDF bidding down attacks.

8. The AUSF sends the received network selected KDF information (UDM/ARPF KDF ID, AUSF KDF ID, SEAF KDF ID and optionally AMF KDF ID) and the HN computed KDF MAC tag to the SEAF in the authentication response message. The AUSF locally stores the AUSF KDF ID and the UE Identification information.

9. The SEAF sends the received network selected KDF information (UDM/ARPF KDF ID, AUSF KDF ID, SEAF KDF ID and AMF KDF ID) and the HN computed KDF MAC tag to the AMF in the authentication request message. The SEAF locally stores the SEAF KDF ID and the UE identification information if received.

10. The AMF sends the received network selected KDF information (UDM/ARPF KDF ID, AUSF KDF ID and SEAF KDF ID) and the HN computed KDF MAC tag to the UE in the authentication request message. The AMF locally stores the AMF KDF ID and the UE identification information if received.

11. The UE/USIM verifies the received KDF MAC tag. If the verification is successful, the UE further verifies if the received network selected KDFs (UDM/ARPF KDF ID, AUSF KDF ID and SEAF KDF ID) is in accordance with the UE KDF capability. If the UE supports the received network selected KDFs, then the UE derives all 5GS related security keys (CK/IK or CK'/IK', master key, anchor key, NAS keys, AS keys etc) using the KDFs pointed by the received UDM/ARPF KDF ID, AUSF KDF ID and SEAF KDF ID.

12. The remaining authentication procedure is performed.

If the UE finds any discrepancy with the network selected KDF and UE KDF capability, the UE can either send the KDF error message to the network in any subsequent NAS message or renegotiate with the 5G core network by sending the received network selected KDF information and UE KDF capabilities with the KDF reselection indicator with the related cause value.

If the home network generated KDF MAC tag verification fails at the UE, the UE sends the UE KDF negotiation failure notification to the network in the subsequent NAS message.

13. Following a successful authentication procedure, as a proof for bidding down prevention, the AMF can replay the UE KDF capability along the AMF KDF capability and KDF selected by the AMF for generating NAS keys in the NAS security mode command message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF. The UE can use the AMF KDF ID indicated by the AMF for derivation of NAS keys.

14. Following a successful NAS security, the AMF/SEAF can send an initial AS security context setup message to the gNB along with the UE KDF capability.

15. The gNB can send the AS security mode command message to the UE along with the UE KDF capability, gNB KDF capability and the selected gNB KDF ID for generating the AS security keys. The UE can verify the correctness of the received UE KDF capability. If the verification is successful, the UE can send a "KDF negotiation success indication" in the AS security mode complete message back to the gNB. If the verification fails the, UE can send the "KDF negotiation failure indication" in the AS security mode complete message back to the gNB. The UE can use the gNB KDF ID indicated by the gNB for derivation of AS keys.

Figure 23:
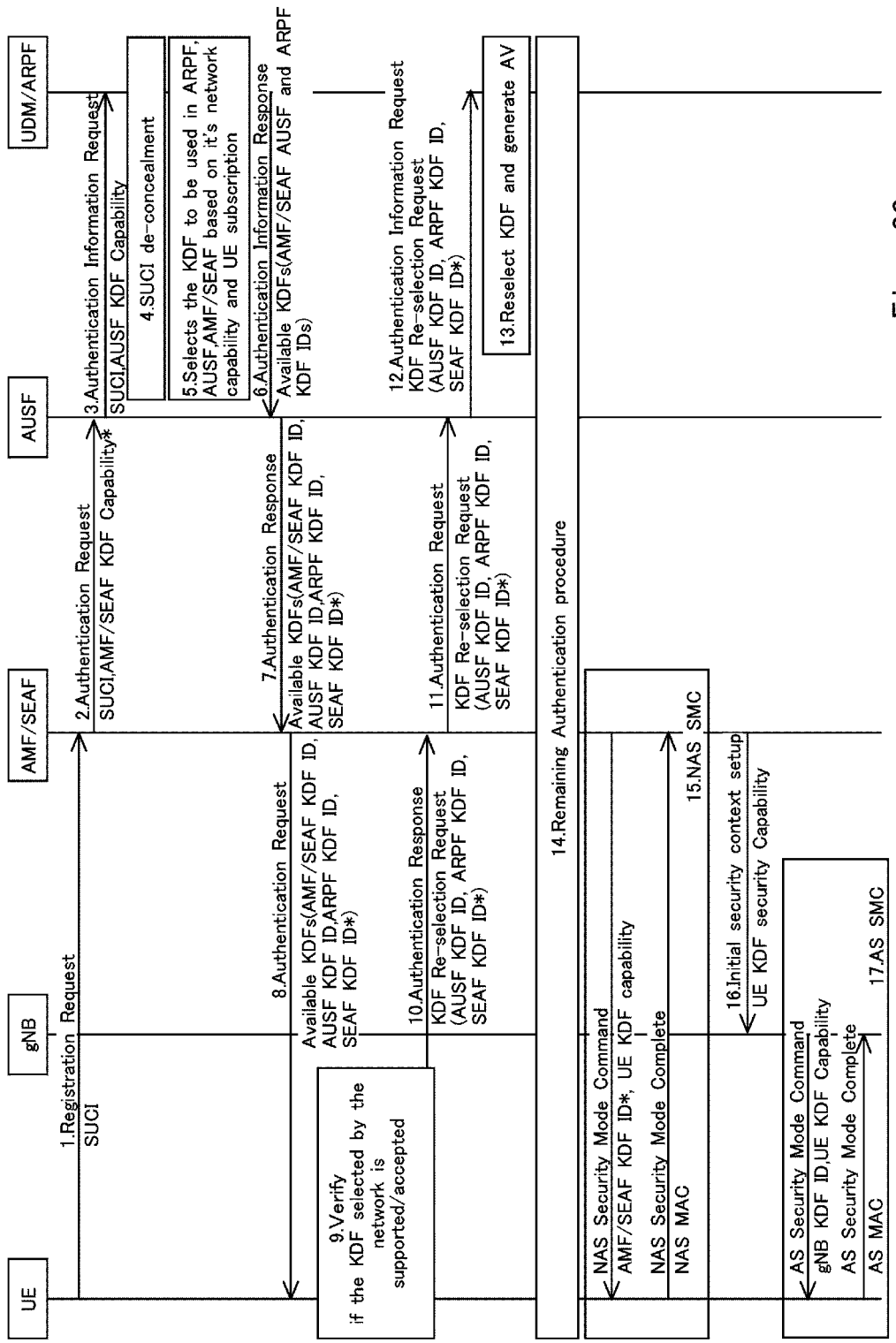
FIG. 23 is a sequence chart illustrating a network initiated KDF negotiation procedure for flexible KDF negotiation with a trusted AMF (with home control).

According to an embodiment of the present disclosure as shown in FIG. 23, the network initiated KDF negotiation procedure for flexible KDF negotiation with trusted AMF (with home control) is described.

A person skilled in the art would appreciate that if the SEAF is co-located with the AMF, then the AMF may or may not use the same KDF as the SEAF. The AUSF and AMF/SEAF verify the KDF selected by the UDM/ARPF (home network) is supported or accepted by them. If not, the AUSF and AMF/SEAF can send the network function KDF reselection request message in the authentication request again to the UDM/ARPF with the preferred KDF listed as the high priority in the NF KDF capability list.

1. The UE can send its identity information (UE ID) such as SUCI, IMSI or GPSI in the registration request message to the AMF/SEAF.

2. The AMF/SEAF can initiate the authentication by including the received UE ID and the AMF/SEAF (or serving network) KDF capability in the authentication request message and send the authentication request message to the AUSF.

3. The AUSF can send the received UE ID and AMF/SEAF (or serving network) KDF capability in the authentication information request message to the UDM/ARPF.

4. If the SUCI is received in the authentication information request message, the SIDF (offered by the UDM or located elsewhere) can de-conceal the SUCI to retrieve the SUPI.

5. The UDM/ARPF selects, based on its own home network KDF capabilities, serving network KDF capabilities and the UE subscription, the KDFs to be used at serving nodes (AMF/SEAF) and home network entities (AUSF, UDM/ARPF) such as SEAF KDF ID, AUSF KDF ID and UDM/ARPF KDF ID. The KDFs selected by the network should be the KDF with the reasonably highest priority in the UE and the all corresponding 5GS network functions.

The UDM/ARPF uses the selected UDM/ARPF KDF for the CK/IK or CK/IK' or any key derivation or authenticator vector generation.

The selected/available KDF parameter contains the UDM/ARPF KDF identification information (KDF ID), AUSF KDF ID and SEAF KDF ID.

The network selected KDF can be used for all key derivation involved in the 5GS.

6. The UDM/ARPF then sends the network selected KDFs (available KDFs) such as UDM/ARPF KDF ID, AUSF KDF ID and SEAF KDF ID in the authentication information response message to the AUSF along with the UE identification information.

7. The AUSF sends the received network selected KDF information (available KDFs such as UDM/ARPF KDF ID, AUSF KDF ID and SEAF KDF ID) to the AMF/SEAF in the authentication response message. The AUSF locally stores the AUSF KDF ID and the UE Identification information.

8. The AMF/SEAF sends the received network selected KDF (available KDFs) information (UDM/ARPF KDF ID, AUSF KDF ID and SEAF KDF ID) to the UE in the authentication request message. The AMF/SEAF locally stores the SEAF KDF ID and the UE identification information if received.

9. The UE/USIM verifies if the received network selected KDFs (UDM/ARPF KDF ID, AUSF KDF ID and SEAF KDF ID) is in accordance with the UE KDF capability. If the UE supports the received network selected KDFs, then the UE derives all 5GS related security keys (CK/IK or CK'/IK', master key, anchor key, NAS keys, AS keys etc) using the KDFs pointed by the received UDM/ARPF KDF ID, AUSF KDF ID and SEAF KDF ID.

If the UE finds any discrepancy with the network selected KDF (available KDFs) and UE KDF capability, the UE can either send the KDF error message to the network in any subsequent NAS message or renegotiate with the 5G core network by sending the received network selected KDF information and UE KDF capabilities with the KDF reselection indicator with the related cause value.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

10. The UE can send its preferred KDF according to its own KDF capabilities and network KDF capabilities inferred from the available KDF using the KDF re-selection request in the authentication response message to the AMF/SEAF along with the UE KDF capability. This message can also contain the UE ID.

11. The authentication response message can be forwarded by the AMF/SEAF to the AUSF.

12. Then the AUSF can send the authentication information request message to the UDM/ARPF along with the KDF re-selection request.

13. The UDM/ARPF selects the KDF indicated by the UE as its preference and re-derives CK/IK or CK'/IK' and other key materials using the newly selected KDF. The UDM/ARPF sends the authentication response message to the AUSF along with the KDF ID selected as a token of acknowledgement to the UE along with the AV in the authentication information response message. Then the AUSF sends the received selected KDF ID, RAND and AUTN to the AMF/SEAF. The AMF then sends the received selected KDF ID, RAND and AUTN to the UE. The UE uses the received KDF ID for all subsequent key derivation.

14. The remaining authentication procedure is performed.

15. Following a successful authentication procedure, as a proof for bidding down prevention, the AMF can replay the UE KDF capability along the KDF selected by the AMF for generating NAS keys in the NAS security mode command message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF. The UE can use the AMF KDF ID indicated by the AMF for derivation of NAS keys.

16. Following a successful NAS security, the AMF can send an initial AS security context setup message to the gNB along with the UE KDF capability.

17. The gNB can send the AS security mode command message to the UE along with the UE KDF capability and the gNB KDF ID for generating the AS security keys. The UE can verify the correctness of the received UE KDF capability. If the verification is successful, the UE can send a "KDF negotiation success indication" in the AS security mode complete message back to the gNB. If the verification fails, the UE can send the "KDF negotiation failure indication" in the AS security mode complete message back to the gNB. The UE can use the gNB KDF ID indicated by the gNB for derivation of AS keys.

Figure 24:
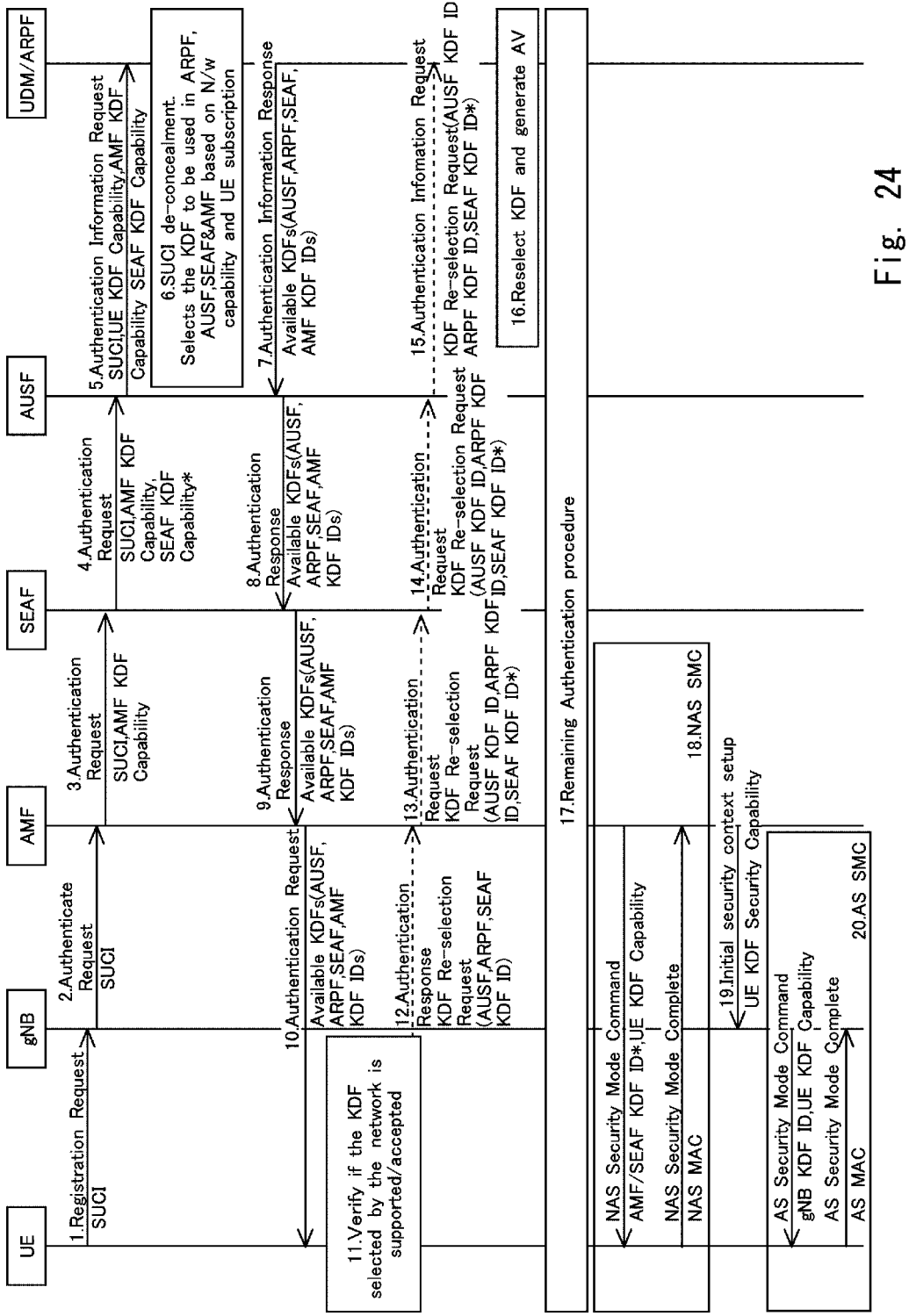
FIG. 24 is a sequence chart illustrating a network initiated KDF negotiation procedure for flexible KDF negotiation with a trusted AMF and a standalone SEAF (with home control).

According to an embodiment of the present disclosure as shown in FIG. 24, the network initiated KDF negotiation procedure for flexible KDF negotiation with a trusted AMF and a standalone SEAF (with home control) is described.

A person skilled in the art would appreciate that if the SEAF is co-located with the AMF, then the AMF may or may not use the same KDF as the SEAF. The AUSF, SEAF and AMF verify the KDF selected by the UDM/ARPF (home network) is supported or accepted by them. If not, the AUSF, SEAF and AMF can send the NF KDF reselection request message in the authentication request again to the UDM/ARPF with the preferred KDF listed as the high priority in the NF KDF capability list.

1. The UE can send its identity information (UE ID) such as SUCI, IMSI or GPSI in the registration request message to the gNB.

2. The gNB can send the authentication request message including the received UE ID to the AMF.

3. The AMF can send the authentication request message to the SEAF including the received UE ID and the AMF (or serving network) KDF capability.

4. The SEAF can initiate the authentication by including the received UE ID and the AMF (or serving network) KDF capability and it's SEAF KDF capability in the authentication request message and send the authentication request message to the AUSF.

5. The AUSF can send the received UE ID, AMF KDF capability and SEAF KDF capability in the authentication information request message to the UDM/ARPF.

6. If the SUCI is received in the authentication information request message, the SIDF (offered by the UDM or located elsewhere) can de-conceal the SUCI to retrieve the SUPI. The UDM/ARPF selects the KDFs to be used at the UDM/ARPF based on its own home network KDF capabilities and the UE subscription. Further, the UDM/ARPF selects the KDFs for the AMF and the SEAF, based on the received serving (AMF and SEAF) network's KDF capabilities and the UE subscription. The KDFs (specific to the SEAF KDF ID, AUSF KDF ID and UDM/ARPF KDF ID) selected by the network should be the KDF with the reasonable highest priority in the UE and the all corresponding 5GS network functions.

The UDM/ARPF uses the selected UDM/ARPF KDF for the CK/IK or CK/IK' or any key derivation or authenticator vector generation.

The selected/available KDF parameter contains the UDM/ARPF KDF identification information (KDF ID), AUSF KDF ID and SEAF KDF ID.

The network selected KDF can be used for all key derivation involved in the 5GS.

7. The UDM/ARPF then sends the network selected KDFs (available KDFs) such as UDM/ARPF KDF ID, AUSF KDF ID and SEAF KDF ID in the authentication information response message to the AUSF along with the UE identification information.

8. The AUSF sends the received network selected KDF information (available KDFs such as UDM/ARPF KDF ID, AUSF KDF ID and SEAF KDF ID) to the SEAF in the authentication response message. The AUSF locally stores the AUSF KDF ID and the UE Identification information.

9. The SEAF sends the received network selected KDF (available KDFs) information (UDM/ARPF KDF ID, AUSF KDF ID and SEAF KDF ID) to the AMF in the authentication request message. The SEAF locally stores the SEAF KDF ID and the UE identification information if received.

10. The AMF sends the received network selected KDF (available KDFs) information (UDM/ARPF KDF ID, AUSF KDF ID and SEAF KDF ID) to the UE in the authentication request message.

11. The UE/USIM verifies if the received network selected KDFs (UDM/ARPF KDF ID, AUSF KDF ID and SEAF KDF ID) is in accordance with the UE KDF capability. If the UE supports the received network selected KDFs, then the UE derives all 5GS related security keys (CK/IK or CK'/IK', master key, anchor key, NAS keys, AS keys etc.) using the KDFs pointed by the received UDM/ARPF KDF ID, AUSF KDF ID and SEAF KDF ID.

If the UE finds any discrepancy with the network selected KDF (available KDFs) and UE KDF capability, the UE can either send the KDF error message to the network in any subsequent NAS message or renegotiate with the 5G core network by sending the received network selected KDF information and UE KDF capabilities with the KDF reselection indicator with the related cause value.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

12. The UE can send its preferred KDF according to its own KDF capabilities and network KDF capabilities inferred from the available KDF using the KDF re-selection request in the authentication response message to the AMF along with the UE KDF capability. This message can also contain the UE ID.

13. The authentication response message can be forwarded by the AMF to the SEAF.

14. The authentication response message can be forwarded by the SEAF to the AUSF.

15. Then the AUSF can send the authentication information request message to the UDM/ARPF along with the KDF re-selection request.

16. The UDM/ARPF selects the KDF indicated by the UE as its preference and re-derives CK/IK or CK'/IK' and other key materials using the newly selected KDF. The UDM/ARPF sends the authentication response message to the AUSF along with the KDF ID selected as a token of acknowledgement to the UE along with the AV in the authentication information response message. Then the AUSF sends the received selected KDF ID, RAND and AUTN to the SEAF. The SEAF sends the received selected KDF ID, RAND and AUTN to the AMF. The AMF then sends the received selected KDF ID, RAND and AUTN to the UE. The UE uses the received KDF ID for all subsequent key derivation.

17. The remaining authentication procedure is performed.

18. Following a successful authentication procedure, as a proof for bidding down prevention, the AMF/SEAF can replay the UE KDF capability along the KDF selected by the AMF for generating NAS keys in the NAS security mode command message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF. The UE can use the AMF KDF ID indicated by the AMF for derivation of NAS keys.

19. Following a successful NAS security, the AMF/SEAF can send an initial AS security context setup message to the gNB along with the UE KDF capability.

20. The gNB can send the AS security mode command message to the UE along with the UE KDF capability and the gNB KDF ID for generating the AS security keys. The UE can verify the correctness of the received UE KDF capability. If the verification is successful, the UE can send a "KDF negotiation success indication" in the AS security mode complete message back to the gNB. If the verification fails, the UE can send the "KDF negotiation failure indication" in the AS security mode complete message back to the gNB. The UE can use the gNB KDF ID indicated by the gNB for derivation of AS keys.

Figure 25:
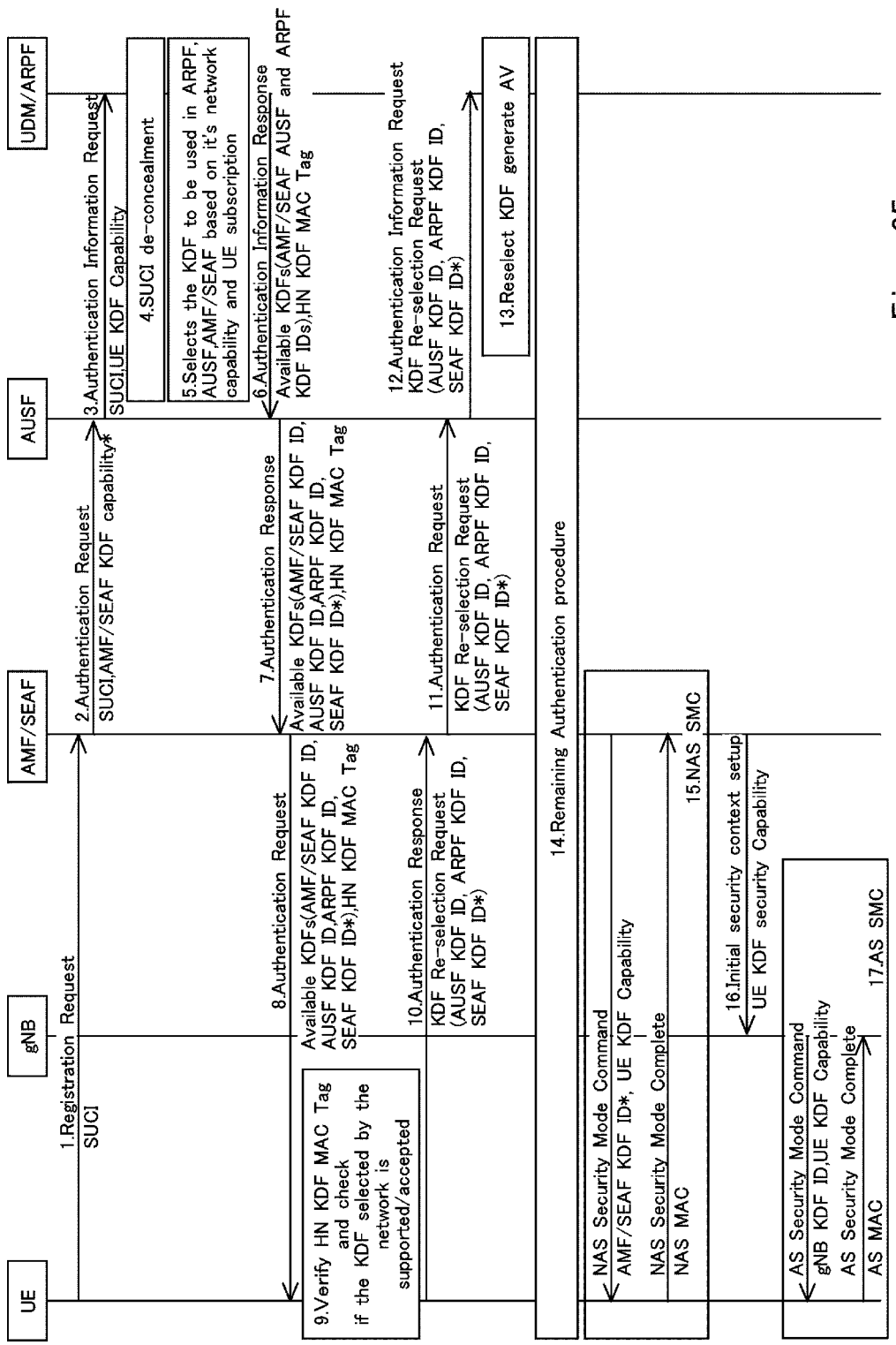
FIG. 25 is a sequence chart illustrating a network initiated KDF negotiation procedure for flexible KDF negotiation with a less trusted AMF (with home control).

According to an embodiment of the present disclosure as shown in FIG. 25, the network initiated KDF negotiation procedure for flexible KDF negotiation with a less trusted AMF (with home control) is described.

A person skilled in the art would appreciate that if the SEAF is co-located with the AMF, then the AMF may or may not use the same KDF as the SEAF. The AUSF and AMF/SEAF verify the KDF selected by the UDM/ARPF (home network) is supported or accepted by them. If not, the AUSF and the AMF/SEAF can send the NF KDF reselection request message in the authentication request again to the UDM/ARPF with the preferred KDF listed as the high priority in the NF KDF capability list.

1. The UE can send its identity information (UE ID) such as SUCI, IMSI or GPSI in the registration request message to the AMF/SEAF.

2. The AMF/SEAF can initiate the authentication by including the received UE ID and the AMF/SEAF (or serving network) KDF capability in the authentication request message and send the authentication request message to the AUSF.

3. The AUSF can send the received UE ID and the AMF/SEAF (or serving network) KDF capability and its own AUSF KDF capability in the authentication information request message to the UDM/ARPF.

4. If the SUCI is received in the authentication information request message, the SIDF (offered by the UDM or located elsewhere) can de-conceal the SUCI to retrieve the SUPI.

5. The UDM/ARPF selects the KDFs to be used at the UDM/ARPF based on its own home network KDF capabilities, and the UE subscription. Further, the UDM/ARPF selects the KDFs to be sued at the AUSF based on the received AUSF KDF capabilities and subscription information. Furthermore, the UDM.ARPF selects the KDFs to be used at the AMF/SEAF (serving AMF/SEAF) based on the received AMF KDF capability and SEAF KDF capability and UE subscription information. The KDFs (UDM/ARPF KDF, AUSF KDF, SEAF/AMF KDF) selected by the network should be the KDF with the reasonable highest priority in the UE and the all corresponding 5GS network functions.

The UDM/ARPF uses the selected UDM/ARPF KDF for the CK/IK or CK/IK' or any key derivation or authenticator vector generation.

The selected/available KDF parameter contains the UDM/ARPF KDF identification information (KDF ID), AUSF KDF ID and SEAF KDF ID.

The network selected KDF can be used for all key derivation involved in the 5GS.

6. The UDM/ARPF then sends the network selected KDFs (available KDFs) such as UDM/ARPF KDF ID, AUSF KDF ID and SEAF KDF ID in the authentication information response message to the AUSF along with the UE identification information and the home network generated KDF MAC tag of the network selected KDF ID(s) such as UDM/ARPF KDF identification information (KDF ID), AUSF KDF ID and SEAF KDF ID to prevent KDF bidding down attacks.

7. The AUSF sends the received network selected KDF information (available KDFs such as UDM/ARPF KDF ID, AUSF KDF ID and SEAF KDF ID) and it's corresponding KDF MAC tag to the AMF/SEAF in the authentication response message. The AUSF locally stores the AUSF KDF ID and the UE Identification information.

8. The AMF/SEAF sends the received network selected KDF (available KDFs) information (UDM/ARPF KDF ID, AUSF KDF ID and SEAF KDF ID) and its corresponding KDF MAC tag to the AMF/SEAF to the UE in the authentication request message. The AMF/SEAF locally stores the SEAF KDF ID and the UE identification information if received.

9. The UE/USIM verifies the received KDF MAC tag. If the verification is successful, the UE further verifies if the received network selected KDFs (UDM/ARPF KDF ID, AUSF KDF ID and SEAF KDF ID) is in accordance with the UE KDF capability. If the UE supports the received network selected KDFs, then the UE derives all 5GS related security keys (CK/IK or CK'/IK', master key, anchor key, NAS keys, AS keys etc.) using the KDFs pointed by the received UDM/ARPF KDF ID, AUSF KDF ID and SEAF KDF ID.

If the UE finds any discrepancy with the network selected KDF (available KDFs) and UE KDF capability, the UE can either send the KDF error message to the network in any subsequent NAS message or renegotiate with the 5G core network by sending the received network selected KDF information and UE KDF capabilities with the KDF reselection indicator with the related cause value.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

10. The UE can send its preferred KDF according to its own KDF capabilities and network KDF capabilities inferred from the available KDF using the KDF re-selection request in the authentication response message to the AMF/SEAF along with the UE KDF capability. This message can also contain the UE ID.

11. The authentication response message can be forwarded by the AMF/SEAF the AUSF.

12. Then the AUSF can send the authentication information request message to the UDM/ARPF along with the KDF re-selection request.

13. The UDM/ARPF selects the KDF indicated by the UE as its preference and re-derives CK/IK or CK'/IK' and other key materials using the newly selected KDF. The UDM/ARPF sends the authentication response message to the AUSF along with the KDF ID selected as a token of acknowledgement to the UE along with the AV in the authentication information response message. Then the AUSF sends the received selected KDF ID, RAND and AUTN to the AMF/SEAF. The AMF then sends the received selected KDF ID, RAND and AUTN to the UE. The UE uses the received KDF ID for all subsequent key derivation.

If the home network generated KDF MAC tag verification fails at the UE, the UE sends the UE KDF negotiation failure notification to the network in the subsequent NAS message.

14. The remaining authentication procedure is performed.

15. Following a successful authentication procedure, as a proof for bidding down prevention, the AMF/SEAF can replay the UE KDF capability along the KDF selected by the AMF for generating NAS keys in the NAS security mode command message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF. The UE can use the AMF KDF ID indicated by the AMF for derivation of NAS keys.

16. Following a successful NAS security, the AMF/SEAF can send an initial AS security context setup message to the gNB along with the UE KDF capability.

17. The gNB can send the AS security mode command message to the UE along with the UE KDF capability and the gNB KDF ID for generating the AS security keys. The UE can verify the correctness of the received UE KDF capability. If the verification is successful, the UE can send a "KDF negotiation success indication" in the AS security mode complete message back to the gNB. If the verification fails, the UE can send the "KDF negotiation failure indication" in the AS security mode complete message back to the gNB. The UE can use the gNB KDF ID indicated by the gNB for derivation of AS keys.

Figure 26:
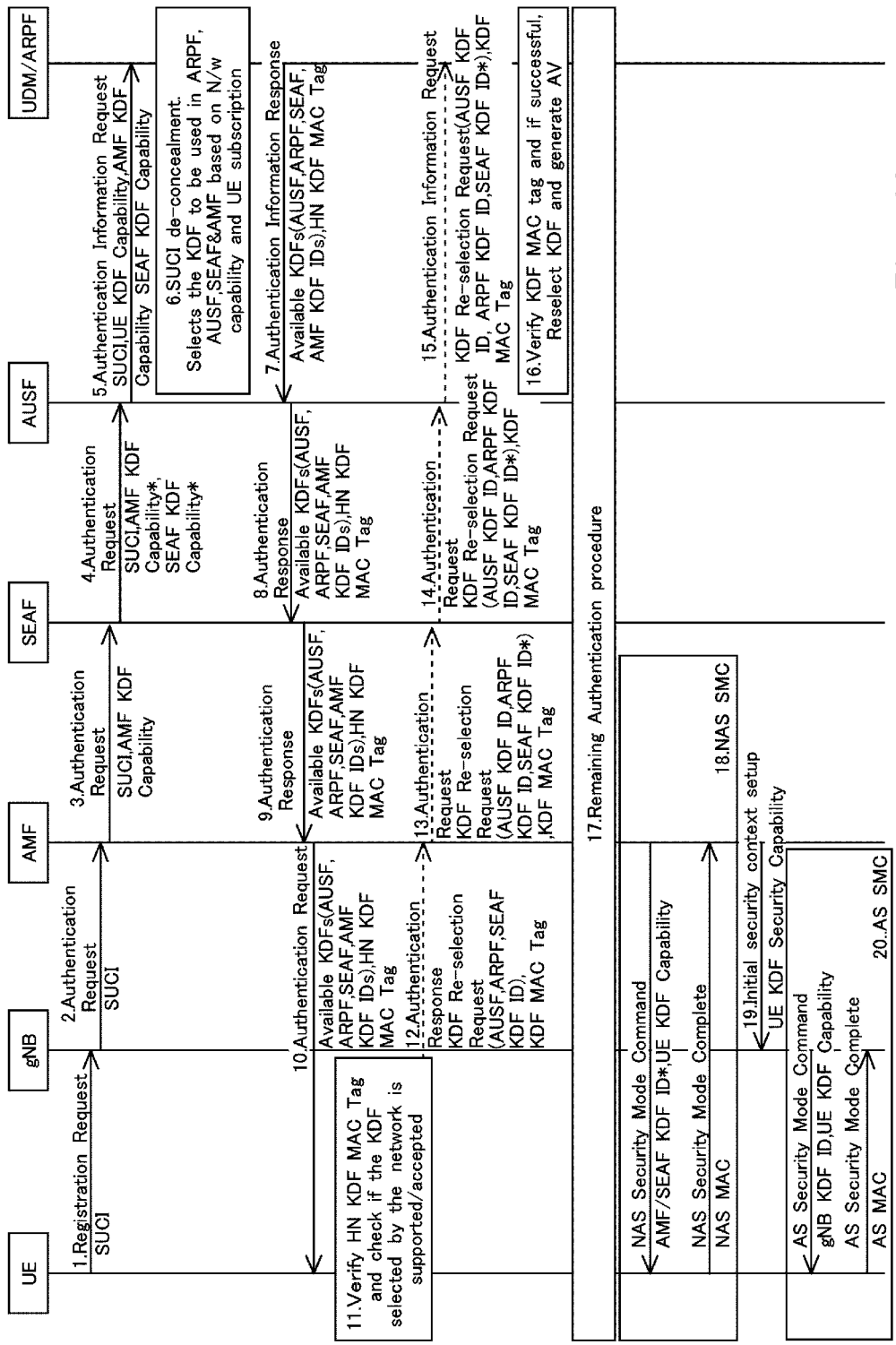
FIG. 26 is a sequence chart illustrating a network initiated KDF negotiation procedure for flexible KDF negotiation with a less trusted AMF and a standalone SEAF (with home control).

According to an embodiment of the present disclosure as shown in FIG. 26, the network initiated KDF negotiation procedure for flexible KDF negotiation with a less trusted AMF and a standalone SEAF (with home control) is described.

A person skilled in the art would appreciate that if the SEAF is co-located with the AMF, then the AMF may or may not use the same KDF as the SEAF. The AUSF, SEAF and AMF verify the KDF selected by the UDM/ARPF (home network) is supported or accepted by them. If not, the AUSF, SEAF and AMF can send the NF KDF reselection request message in the authentication request again to the UDM/ARPF with the preferred KDF listed as the high priority in the NF KDF capability list.

1. The UE can send its identity information (UE ID) such as SUCI, IMSI or GPSI in the registration request message to the gNB.

2. The gNB can send the authentication request message including the received UE ID to the AMF.

3. The AMF can send the authentication request message to the SEAF including the received UE ID and the AMF (or serving network) KDF capability.

4. The SEAF can initiate the authentication by including the received UE ID, AMF (or serving network) KDF capability and SEAF KDF capability in the authentication request message and send the authentication request message to the AUSF.

5. The AUSF can send the received UE ID and the AMF and SEAF (or serving network) KDF capability and its own AUSF KDF capability in the authentication information request message to the UDM/ARPF.

6. If the SUCI is received in the authentication information request message, the SIDF (offered by the UDM or located elsewhere) can de-conceal the SUCI to retrieve the SUPI. The UDM/ARPF selects the KDFs to be used at the UDM/ARPF based on its own home network KDF capabilities, and the UE subscription. Further, the UDM/ARPF selects the KDFs to be sued at the AUSF based on the received AUSF KDF capabilities and subscription information UDM/ARPF. Furthermore, the UDM/ARPF selects the KDFs to be used at AMF and SEAF (serving AMF & SEAF) based on the received AMF KDF capability and SEAF KDF capability and UE subscription information. The KDFs (UDM/ARPF KDF, AUSF KDF, SEAF and AMF KDF) selected by the network should be the KDF with the reasonable highest priority in the UE and the all corresponding 5GS network functions.

The UDM/ARPF uses the selected UDM/ARPF KDF for the CK/IK or CK/IK' or any key derivation or authenticator vector generation.

The selected/available KDF parameter contains the UDM/ARPF KDF identification information (KDF ID), AUSF KDF ID and SEAF KDF ID.

The network selected KDF can be used for all key derivation involved in the 5GS.

7. The UDM/ARPF then sends the network selected KDFs (available KDFs) such as UDM/ARPF KDF ID, AUSF KDF ID and SEAF KDF ID in the authentication information response message to the AUSF along with the UE identification information and the home network generated KDF MAC tag of the network selected KDF ID(s) such as UDM/ARPF KDF identification information (KDF ID), AUSF KDF ID and SEAF KDF ID to prevent KDF bidding down attacks.

8. The AUSF sends the received network selected KDF information (available KDFs such as UDM/ARPF KDF ID, AUSF KDF ID and SEAF KDF ID) and it's corresponding KDF MAC tag to the SEAF in the authentication response message. The AUSF locally stores the AUSF KDF ID and the UE Identification information.

9. The SEAF sends the received network selected KDF (available KDFs) information (UDM/ARPF KDF ID, AUSF KDF ID and SEAF KDF ID) and it's corresponding KDF MAC tag to the AMF in the authentication request message. The SEAF locally stores the SEAF KDF ID and the UE identification information if received.

10. The AMF sends the received network selected KDF (available KDFs) information (UDM/ARPF KDF ID, AUSF KDF ID and SEAF KDF ID) and it's corresponding KDF MAC tag to the AMF/SEAF to the UE in the authentication request message. The AMF locally stores the SEAF KDF ID and the UE identification information if received.

11. The UE/USIM verifies the received KDF MAC tag. If the verification is successful, the UE further verifies if the received network selected KDFs (UDM/ARPF KDF ID, AUSF KDF ID and SEAF KDF ID, and optionally AMF KDF ID) is in accordance with the UE KDF capability. If the UE supports the received network selected KDFs, then the UE derives all 5GS related security keys (CK/IK or CK'/IK', master key, anchor key, NAS keys, AS keys etc.) using the KDFs pointed by the received UDM/ARPF KDF ID, AUSF KDF ID and SEAF KDF ID.

If the UE finds any discrepancy with the network selected KDF (available KDFs) and UE KDF capability, the UE can either send the KDF error message to the network in any subsequent NAS message or renegotiate with the 5G core network by sending the received network selected KDF information and UE KDF capabilities with the KDF reselection indicator with the related cause value.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

The KDF MAC or KDF MAC tag contains the message authentication code or digest or hash of the UE KDF capabilities. The KDF MAC can be generated using a keyed hash or salted hash. The KDF MAC or KDF MAC tag is used for integrity protection of the UE KDF capabilities against bidding down attacks in case of less trusted AMFs and less trusted serving network deployments.

The KDF MAC tag can also be generated over all the KDF related information sent in a message to ensure integrity protection of the KDF information against bidding down attacks.

12. The UE can send its preferred KDF according to its own KDF capabilities and network KDF capabilities inferred from the available KDF using the KDF re-selection request in the authentication response message to the AMF along with the UE KDF capability and KDF MAC tag. This message can also contain the UE ID.

13. The authentication response message can be forwarded by the AMF to the SEAF.

14. The authentication response message can be forwarded by the SEAF to the AUSF.

15. Then the AUSF can send the authentication information request message to the UDM/ARPF along with the KDF re-selection request.

16. The UDM/ARPF verifies the KDF MAC tag and the re-selection request and the cause value and, if it is genuine, the UDM/ARPF selects the KDF indicated by the UE as its preference and re-derives CK/IK or CK'/IK' and other key materials using the newly selected KDF. The UDM/ARPF sends the authentication response message to the AUSF along with the KDF ID selected as a token of acknowledgement to the UE along with the AV in the authentication information response message. Then the AUSF sends the received selected KDF ID, RAND and AUTN to the SEAF. The SEAF sends the received selected KDF ID, RAND and AUTN to the AMF. The AMF then sends the received selected KDF ID, RAND and AUTN to the UE. The UE uses the received KDF ID for all subsequent key derivation.

If the home network generated KDF MAC tag verification fails at the UE, the UE sends the UE KDF negotiation failure notification to the network in the subsequent NAS message.

17. The remaining authentication procedure is performed.

18. Following a successful authentication procedure, as a proof for bidding down prevention, the AMF/SEAF can replay the UE KDF capability along the KDF selected by the AMF for generating NAS keys in the NAS security mode command message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF. The UE can use the AMF KDF ID indicated by the AMF for derivation of NAS keys.

19. Following a successful NAS security, the AMF/SEAF can send an initial AS security context setup message to the gNB along with the UE KDF capability.

20. The gNB can send the AS security mode command message to the UE along with the UE KDF capability and the gNB KDF ID for generating the AS security keys. The UE can verify the correctness of the received UE KDF capability. If the verification is successful, the UE can send a "KDF negotiation success indication" in the AS security mode complete message back to the gNB. If the verification fails the UE can send the "KDF negotiation failure indication" in the AS security mode complete message back to the gNB. The UE can use the gNB KDF ID indicated by the gNB for derivation of AS keys.

Figure 27:
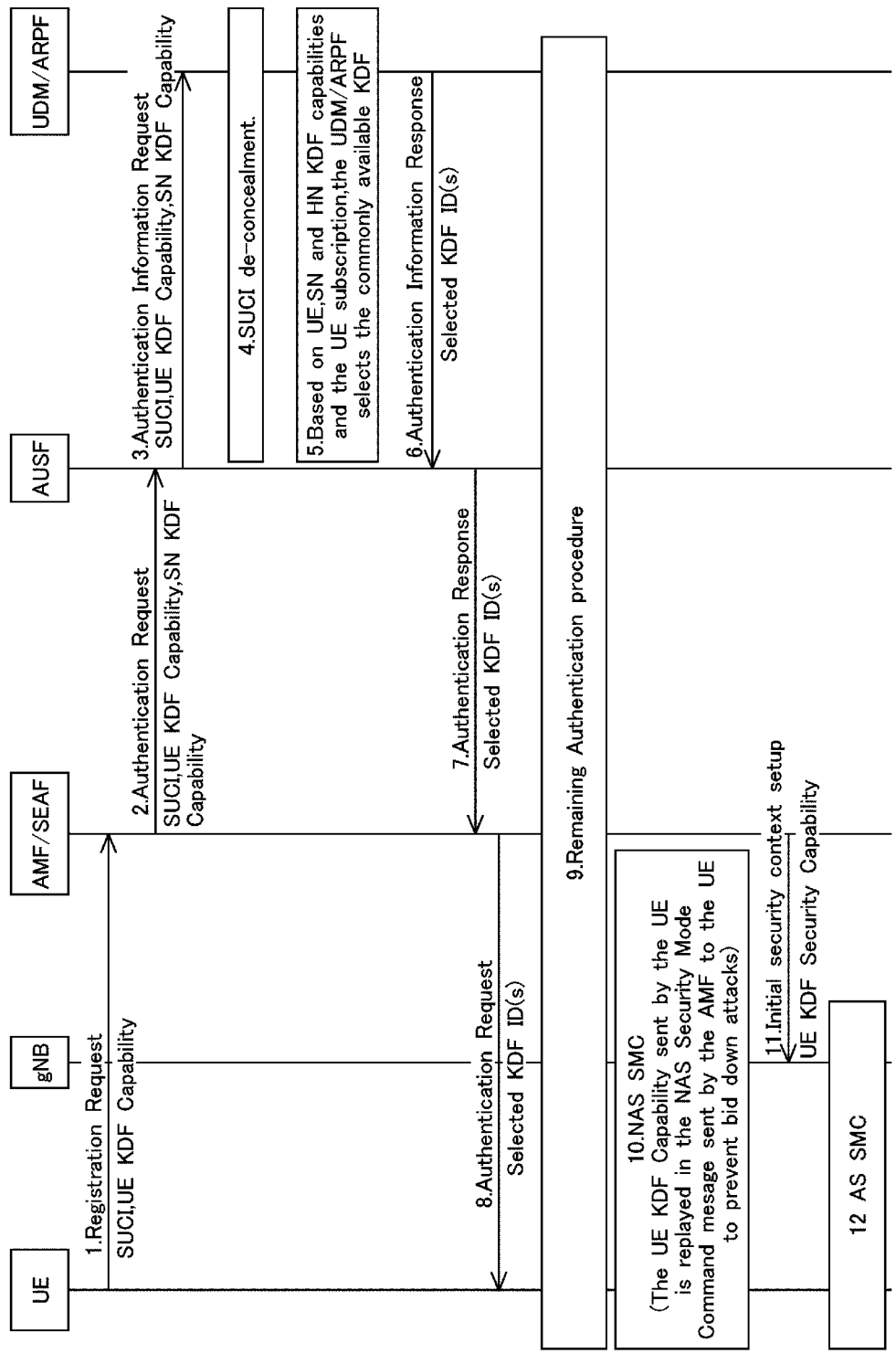
FIG. 27 is a sequence chart illustrating a UE initiated KDF negotiation procedure for common KDF negotiation with a trusted AMF.

According to an embodiment of the present disclosure as shown in FIG. 27, the UE initiated KDF negotiation procedure for common KDF negotiation with a trusted AMF is described.

A person skilled in the art would appreciate that if the SEAF may or may not be co-located with the AMF. The core network selection of a common KDF has no implication on SEAF location/implementation.

1. The UE can send its identity information (UE ID) such as SUCI, IMSI or GPSI and the UE KDF capabilities in the registration request message to the AMF/SEAF.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

2. The AMF/SEAF can initiate the authentication by including the received UE ID, UE KDF capabilities and its AMF/SEAF KDF capabilities in the authentication request message and send the authentication request message to the AUSF. The AMF/SEAF can locally store the UE KDF capabilities.

3. The AUSF can send the received UE ID, UE KDF capabilities, AMF/SEAF KDF capabilities along with its AUSF KDF capabilities in the authentication information request message to the UDM/ARPF.

4. If the SUCI is received in the authentication information request message, the SIDF (offered by the UDM or located elsewhere) can de-conceal the SUCI to retrieve the SUPI.

5. The UDM/ARPF selects, based on its own network KDF capabilities and the received network function/entity's KDF capabilities, UE KDF capabilities and UE subscription, the commonly available, the most suitable KDF in all the network functions and the UE and/or the KDF with the highest priority.

The UDM/ARPF uses the selected KDF for the CK/IK or CK/IK' or any key derivation or authenticator vector generation.

The selected KDF parameter can either include a single KDF identification information (KDF ID) or a list/set of KDF IDs with the selected KDF ranked with the highest priority indicator.

The network selected KDF can be used for all key derivation involved in the 5GS.

6. The UDM/ARPF then sends the network selected common KDF which is available in both UE and in all network function in the authentication information response message to the AUSF.

7. The AUSF sends the received network selected KDF information to the AMF/SEAF in the authentication response message.

8. The AMF/SEAF sends the received network selected KDF information to the UE in the authentication request message.

The UE/USIM verifies if the received network selected KDF is in accordance with the UE KDF capability. If the UE supports the received network selected KDFs, then the UE uses the received network selected KDF to derive all 5GS related security keys.

9. The remaining authentication procedure is performed.

If the UE finds any discrepancy with the network selected KDF and UE KDF capability, the UE can either send the KDF error message to the network in any subsequent NAS message or renegotiate with the 5G core network by sending the received network selected KDF information and UE KDF capabilities with the KDF reselection indicator with the related cause value.

10. Following a successful authentication procedure, as a proof for bidding down prevention, the AMF/SEAF can replay the UE KDF capability in the NAS security mode command message. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF.

11. Following a successful NAS security, the AMF/SEAF can send an initial AS security context setup message to the gNB along with the UE KDF capability.

12. The gNB can send the AS security mode command message to the UE along with the UE KDF capability. The UE can verify the correctness of the received UE KDF capability. If the verification is successful, the UE can send a "KDF negotiation success indication" in the AS security mode complete message back to the gNB. If the verification fails the UE can send the "KDF negotiation failure indication" in the AS security mode complete message back to the gNB.

Figure 28:
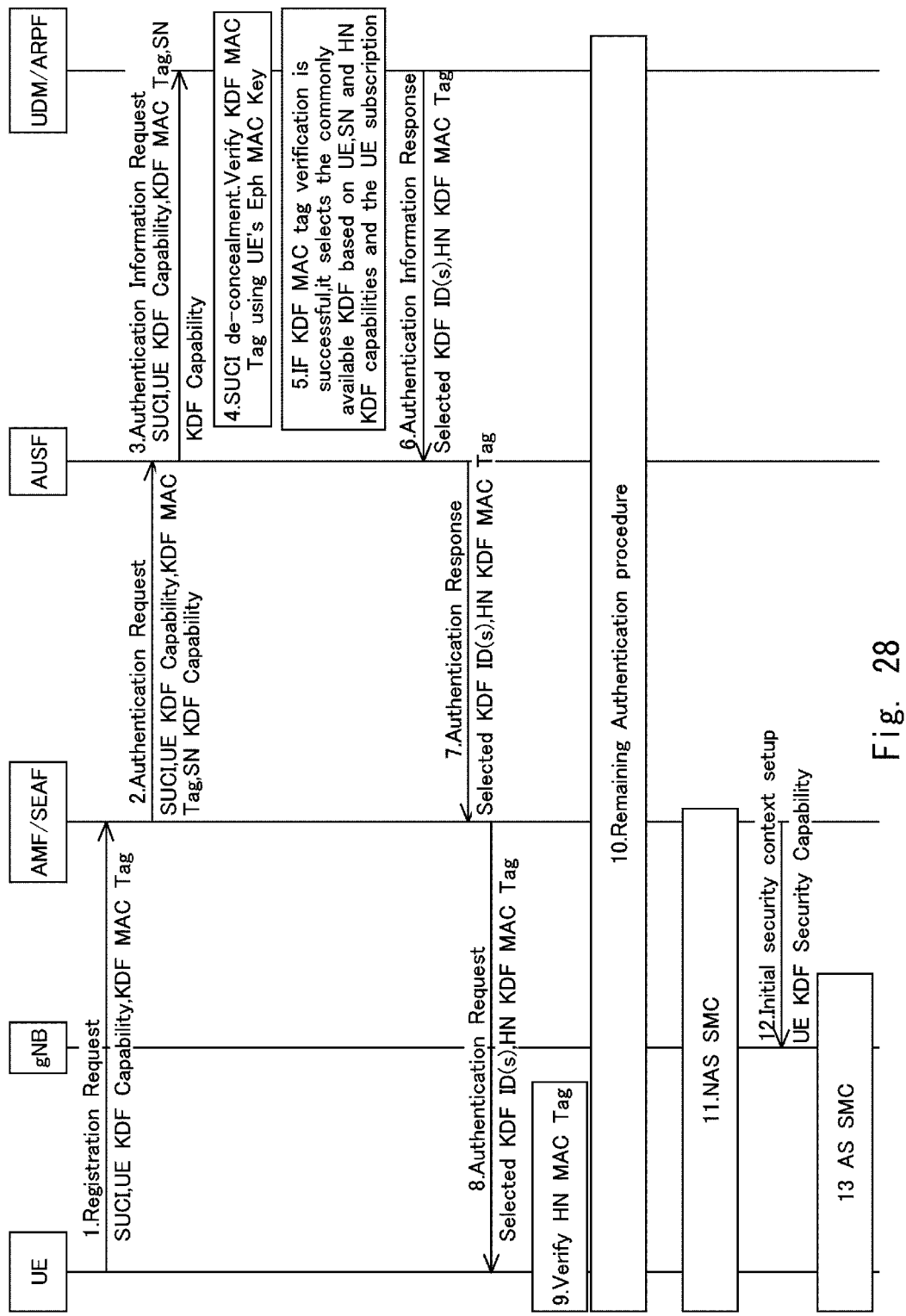
FIG. 28 is a sequence chart illustrating a UE initiated KDF negotiation procedure for common KDF negotiation with a less trusted AMF.

According to an embodiment of the present disclosure as shown in FIG. 28, the UE initiated KDF negotiation procedure for common KDF negotiation with a less trusted AMF.

A person skilled in the art would appreciate that the SEAF may or may not be co-located with the AMF. The core network selection of a common KDF has no implication on SEAF location.

1. The UE can send its identity information (UE ID) such as SUCI, IMSI or GPSI, the UE KDF capabilities and the KDF MAC in the registration request message to the AMF/SEAF.

The UE KDF capabilities parameter contains information on the KDFs supported by the UE/USIM. It can also include information on the UE's preference over the KDF selection in terms of priority. The KDF can either hold the supported KDF identifiers or release specific information to denote a set of KDFs supported with that release.

The KDF MAC or KDF MAC tag contains the message authentication code or digest or hash of the UE KDF capabilities. The KDF MAC can be generated by the UE using a keyed hash or salted hash. The KDF MAC or KDF MAC tag is used for integrity protection of the UE KDF capabilities against bidding down attacks in case of less trusted AMFs and less trusted serving network deployments.

2. The AMF/SEAF can initiate the authentication by including the received UE ID, KDF capabilities and KDF MAC tag along with the AMF/SEAF KDF capabilities in the authentication request message and send the authentication request message to the AUSF. The AMF/SEAF can locally store the UE KDF capabilities.

3. The AUSF can send the received UE ID, UE KDF capabilities, KDF MAC tag and AMF/SEAF KDF capabilities along with its AUSF KDF capabilities in the authentication information request message to the UDM/ARPF.

4. If the SUCI is received in the authentication information request message, the SIDF (offered by the UDM or located elsewhere) can de-conceal the SUCI to retrieve the SUPI. The UDM/ARPF can verify the KDF MAC tag by retrieving the security context (UE's ephemeral MAC key) related to the SUPI.

5. If the KDF MAC tag verification at the UDM/ARPF is successful, the UDM/ARPF selects, based on its own network KDF capabilities and the received UE KDF capabilities, network (AMF/SEAF, AUSF, UDM/ARPF) KDF capabilities and UE subscription, the commonly available in both UE and all network functions, the most suitable KDF and/or the KDF with the highest priority.

If the KDF MAC tag verification fails at UDM/ARPF, a failure notification is sent to the UE along with the authentication request or authentication failure message with the related KDF error cause value.

The UDM/ARPF uses the selected commonly available KDF for the CK/IK or CK/IK' or any key derivation or authenticator vector generation.

The selected KDF parameter can either include a single KDF identification information (KDF ID) or a list/set of KDF IDs with the selected KDF ranked with the highest priority indicator.

The network selected KDF can be used for all key derivation involved in the 5GS.

6. The UDM/ARPF then sends the network selected KDF in the authentication information response message to the AUSF along with the KDF MAC tag of the network selected KDF ID(s) to prevent KDF bidding down attacks. The KDF MAC tag can derived as shown in FIG. 6 or using any keyed/salted hash.

7. The AUSF sends the received network selected KDF information along with its KDF MAC tag to the AMF/SEAF in the authentication response message.

8. The AMF/SEAF sends the received network selected KDF information along with its KDF MAC tag to the UE in the authentication request message.

9. The UE/USIM verifies KDF MAC tag. If the verification is successful, the UE/USIM further verifies if the received network selected KDF is in accordance with the UE KDF capability. If the UE supports the received network selected KDFs, then the UE uses the received network selected KDF to derive all 5GS related security keys.

10. The remaining authentication procedure is performed.

If the UE finds any discrepancy with the network selected KDF and UE KDF capability, the UE can either send the KDF error message to the network in any subsequent NAS message or renegotiate with the 5G core network by sending the received network selected KDF information and UE KDF capabilities with the KDF reselection indicator with the related cause value.

If the KDF MAC tag verification fails at the UE, the UE sends the UE KDF negotiation failure notification to the network.

11. Following a successful authentication procedure, the AMF/SEAF can replay the UE KDF capability in the NAS security mode command message as a token of confirmation that the indicated KDF is used for NAS protection related key generation. The UE can verify the correctness of the received UE KDF capability. If the verification is successful, the UE can send a "KDF negotiation success indication" in the NAS security mode complete message back to the AMF. If the verification fails, the UE can send the "KDF negotiation failure indication" in the NAS security mode complete message back to the AMF.

12. Following a successful NAS security, the AMF/SEAF can send an initial AS security context setup message to the gNB along with the UE KDF capability.

13. The gNB can send the AS security mode command message to the UE along with the UE KDF capability as a token of confirmation that the indicated KDF is used for AS protection related key generation. The UE can verify the correctness of the received UE KDF capability. If the verification is successful, the UE can send a "KDF negotiation success indication" in the AS security mode complete message back to the gNB. If the verification fails the UE can send the "KDF negotiation failure indication" in the AS security mode complete message back to the gNB.

Figure 29:
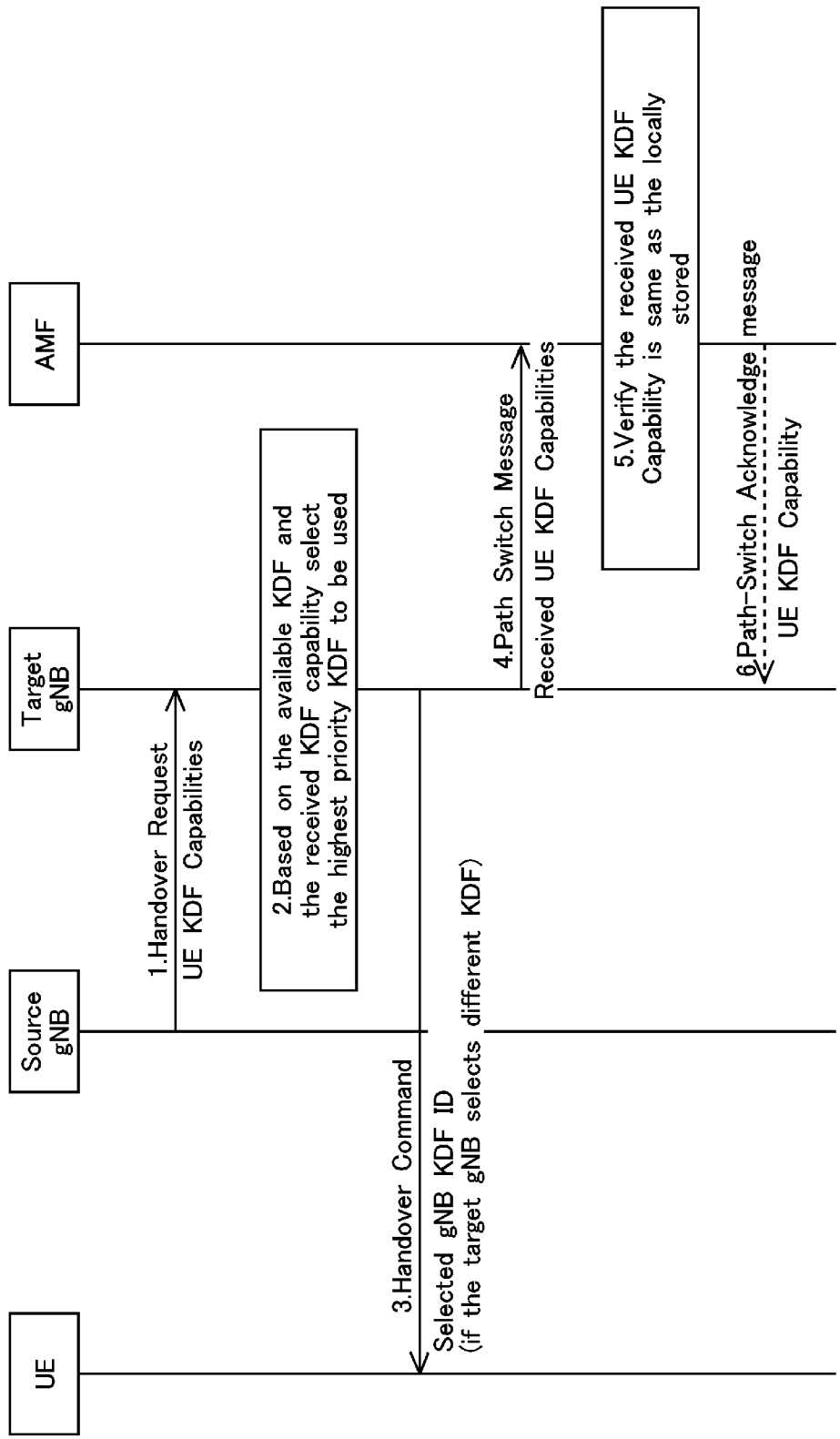
FIG. 29 is a sequence chart illustrating a KDF Negotiation procedure for an Xn handover scenario.

According to an embodiment of the present disclosure as shown in FIG. 29, KDF Negotiation for an Xn handover scenario is described.

A person skilled in the art would appreciate that if there is a mismatch, the AMF shall send its locally stored KDF capabilities of the UE to the target gNB in the path-switch acknowledge message. Additionally, the AMF may log the event and may take additional measures, such as raising an alarm.

1. The source gNB can send the handover request message to the target gNB. The handover request message sent by the source gNB to the target gNB following a UE initiated/network initiated Xn handover can include the UE KDF capabilities locally stored at the source gNB.

2. The target gNB can select, based on the available KDF and the received UE KDF capability, the highest priority KDF which is supported by both the UE and the target gNB.

3. The target gNB sends the handover command message to the UE. If the target gNB selects different KDF, the target gNB includes the selected KDF ID in the handover command message. The selected KDF is sent to the UE by the target gNB in a transparent NAS container.

4. The target gNB sends the received UE KDF capability to the AMF after the successful handover in the path switch request message.

5. The AMF verifies if the received UE KDF capability is the same as the locally store one.

6. If there is a change, the AMF notifies about it to the target gNB by sending the UE KDF capability in the path switch acknowledge message. If the target gNB receives UE KDF capabilities from the AMF in the path switch acknowledge message, the target gNB can update the AS security context of the UE with these UE KDF capabilities of the UE.

The target gNB can select the KDF with the highest priority from these 5G KDF capabilities according to the locally configured prioritized list of KDFs.

If the KDFs selected by the target gNB are different from the KDFs used at the source gNB, then the target gNB shall initiate intra-cell handover procedure which includes an RRC connection reconfiguration procedure indicating the selected KDFs to the UE.

Figure 30:
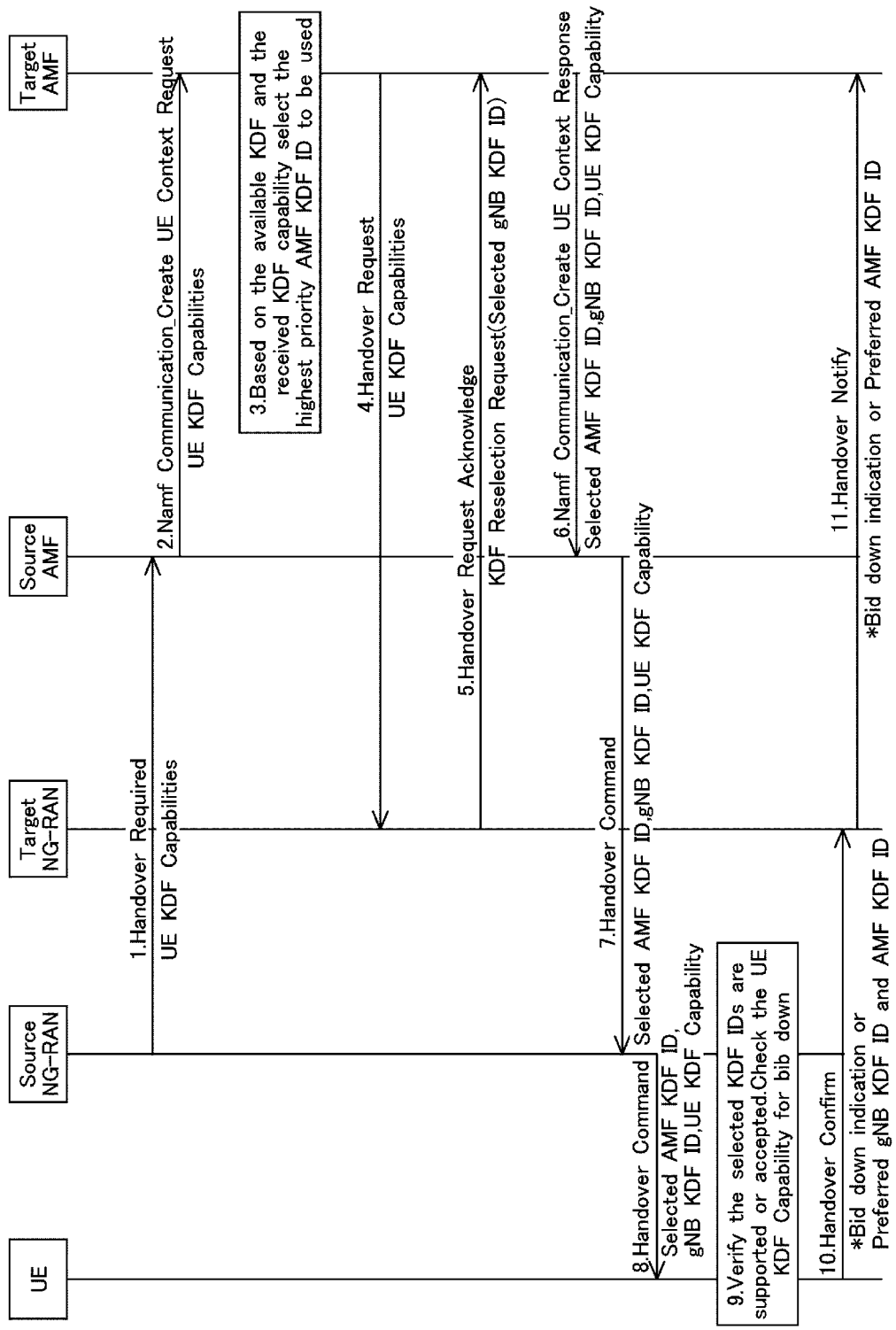
FIG. 30 is a sequence chart illustrating a KDF Negotiation procedure for an N2 handover scenario.

According to an embodiment of the present disclosure as shown in FIG. 30, KDF Negotiation for an N2 handover scenario is described.

1. The source NG-RAN sends the locally stored UE KDF capabilities to the source AMF in the handover required message.

2. The Source AMF sends the received UE KDF capabilities in the Namf_Communication_Create UE context request message.

3. The target AMF selects, based on the available KDF and the received KDF capability, the highest priority AMF KDF to be used for NAS security key generation.

4. The target AMF sends the UE KDF capability to the target NG-RAN.

5. The target NG-RAN selects the gNB based on the UE KDF capability and send it to the target AMF in the handover request acknowledge message.

6. The target AMF sends the Namf_Communication_Create UE context response message to the Source AMF with the selected AMF KDF ID and the gNB KDF ID along with the received UE KDF capability to prevent bid down attacks.

7. The source AMF sends the received KDF negotiation parameters (the selected AMF KDF ID, the gNB KDF ID and the received UE KDF capability) in the handover command message to the Source NG-RAN.

8. The source NG-RAN forwards the handover command message to the UE.

9. The UE verifies if the selected KDF IDs are supported or accepted according to its UE KDF capability and verifies if any bid-down attacks are attempted.

10. If the verification is successful, the UE sends the handover confirm message to the target NG-RAN. If the verification fails due to bid down attacks, the UE sends the bid down indicator in the handover failure message to the target NG-RAN.

11. The target NG-RAN sends the handover notify message to the target AMF.

According to an embodiment of the present disclosure, the Enhanced ABBA parameter with a 5GS KDF capability indication is described.

The ABBA parameter can be assigned a parameter value to indicate Rel-16 security feature. Where it can denote the mandatory KDFs that need to be supported by a ME or USIM, gNB, AMF, SEAF, AUSF and UDM/ARPF.

The ABBA parameter is provided to the UE from the SEAF/AUSF/UDM/ARPF and can be used as an input parameter for all key derivation between the UE and the 5G NFs.

The ABBA parameter can be sent to the UE by the SEAF/AUSF/USM/ARPF after KDF negotiation or during KDF negotiation in any NAS message.

| ABBA parameter value | Description |
| --- | --- |
| Any fixed value (example→0x1000) | Initial/Mandatory set of security features defined for Rel-16 5GS including support for KDFs. |

According to an embodiment of the present disclosure backwards compatibility with EAP-AKA' is described. It is to be noted that where the network initiates the negotiation (10, 11, 12, 13, 14, 15, 18, 19, 20, 21) and where the network would use EAP-AKA' to negotiate different KDFs for different network functions, a backwards compatible solution will have to be sought. In particular, when a UE that does not support KDF negotiation for multiple KDFs, EAP AKA' should somehow fall back to the default behavior with only one KDF.

In EAP-AKA' (NPL2, clause 3.2), the AT_KDF field is carried to negotiate the KDF. This field may appear more than once and the order in which the fields occur indicates the network preferences. The field is structured as follows:

| ID (8 bits) | Length (8 bits) | KDF values (16 bits) |
| --- | --- | --- |
| Set to 24 | Must be equal to 1 | Value indicating the KDF |

A UE will respond based on the value in the KDF. So, for solution 10, the KDF negotiation for the ARPF and the AUSF could be done as follows:

The ARPF includes one AT_KDF field with the KDF value set to 1 as the last element in the list.

For preceding elements, the AT_KDF field is used as follows:

| ID (8 bits) | Length (8 bits) | KDF values (16 bits) |
| --- | --- | --- |
| Set to 24 | Must be equal to 1 | KDF for the AUSF (8 bits)/ KDF for the ARPF (8 bits) |

A UE that supports KDF negotiation for multiple NFs will understand the format and select one of these fields. A UE that does not understand the KDF negotiation will select the lowest priority one and indicate that back to the network.

The ARPF then knows that the UE does not support KDF negotiation for different NFs and will run EAP-AKA' with the default KDF.

Note that in this case there is no need for a KDF MAC TAG, because the AT_KDF field is already protected by the AUTN.

Similarly, for solutions where the serving network indicates its preferences for a particular KDF to the home network (18, 19, 20, 21), the KDF values field can be partitioned accordingly. A possible drawback is that if there are too many NFs negotiating, the 16 allocated bits may become too small.

An alternative way to achieve backwards compatibility is to introduce a new field. In NPL5, attributes with a value <127 are non-skippable. If the UE does not understand these attributes, the authentication fails. The above embodiments can leverage this mandatory behavior by introducing new fields, e.g. 25 for the AUSF KDF, 26 for the SEAF KDF, etc. If these fields are included, a non-compatible UE will indicate so and the ARPF can initiate an authentication without the KDF negotiation capability. Of course, this only works for those scenarios where the serving network's capabilities are known to the home network at the time of generating the AV, so only for the embodiments mentioned at the beginning of this section.

A person would appreciate that the user equipment (or "UE", "mobile station", "mobile device" or "wireless device") in the present disclosure is an entity connected to a network via a wireless interface.

It should be noted that the UE in the present disclosure is not limited to a dedicated communication device, and can be applied to any device, having a communication function as a UE described in the present disclosure, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery.

It will be appreciated that the terms "UE" and "wireless device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks;

motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "Internet of Things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may include automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE may support one or more IoT or MTC applications. Some examples of MTC applications are listed in the below table (source: 33GPP TS 22.368, Annex B, the contents of which are incorporated herein by reference). This list is not exhaustive and is intended to be indicative of some examples of machine type communication applications.

Some Examples of Machine-Type Communication Applications

| Service Area | MTC applications |
|---|---|
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS (Personal Handy-phone System)/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary embodiments described in the present disclosure. Needless to say, these technical ideas and embodiments are not limited to the above-described UE and various modifications can be made thereto.

User Equipment (UE)

Figure 31:
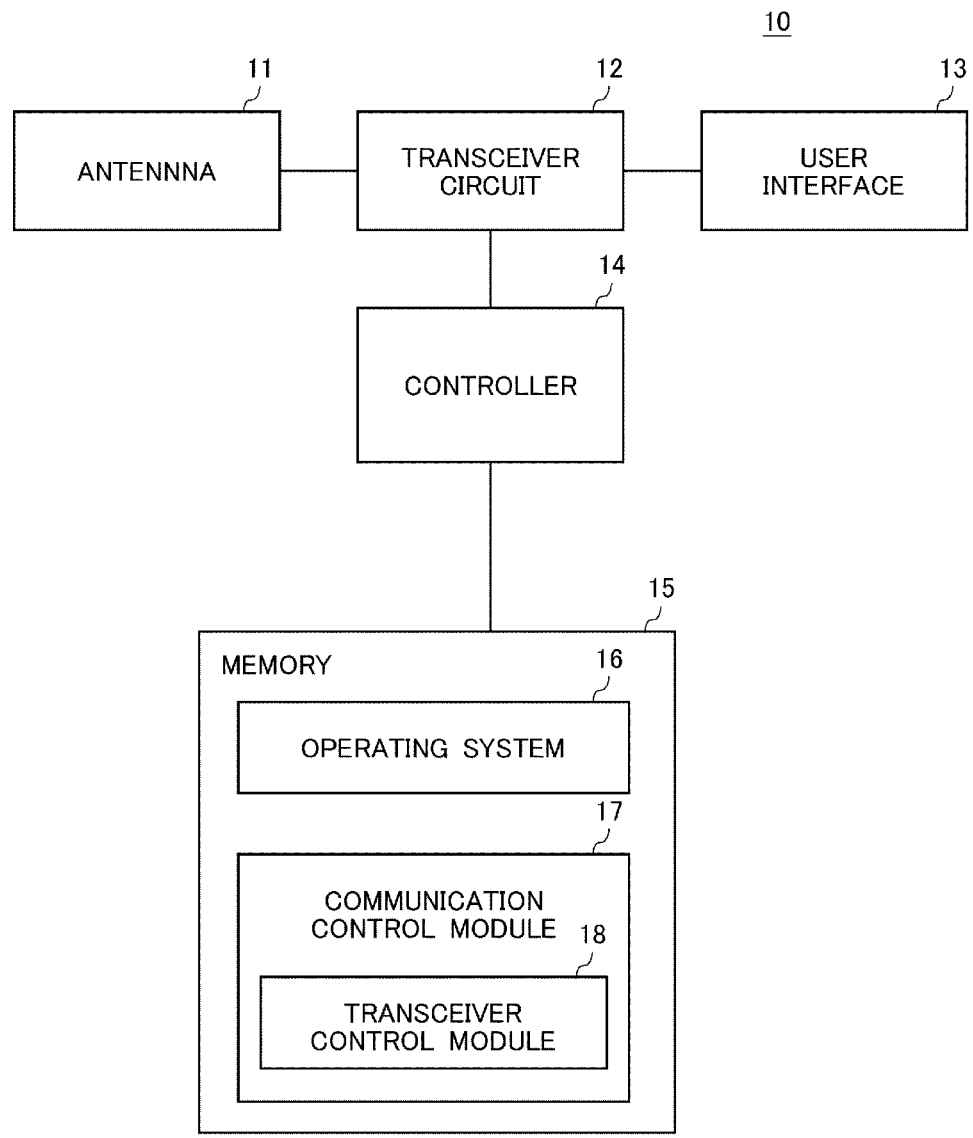
FIG. 31 is a block diagram illustrating a UE according to an embodiment of the present disclosure.

FIG. 31 shows main components of a UE according to an embodiment of the present disclosure. As shown, the UE 10 includes a transceiver circuit 12 which is operable to transmit signals to and to receive signals from the connected node(s) via one or more antenna 11. Although not necessarily shown in FIG. 31, the UE 10 will of course have all the usual functionality of a conventional mobile device (such as a user interface 13) and this may be provided by any one or any combination of hardware, software and firmware, as appropriate. Software may be pre-installed in a memory 15 and/or may be downloaded via the telecommunication network or from a removable data storage device (RMD), for example.

A controller 14 controls the operation of the UE 10 in accordance with software stored in the memory 15. For example, the controller 14 may be realized by Central Processing Unit (CPU). The software includes, among other things, an operating system 16 and a communications control module 17 having at least a transceiver control module 18. The communications control module 18 (using its transceiver control sub-module) is responsible for handling (generating/sending/receiving) signalling and uplink/downlink data packets between the UE 10 and other nodes, such as the base station/(R)AN node, a MME, the AMF (and other core network nodes). Such signalling may include, for example, appropriately formatted signalling messages relating to connection establishment and maintenance (e.g. RRC messages), NAS messages such as periodic location update related messages (e.g. tracking area update, paging area updates, location area update) etc.

(R)AN Node

Figure 32:
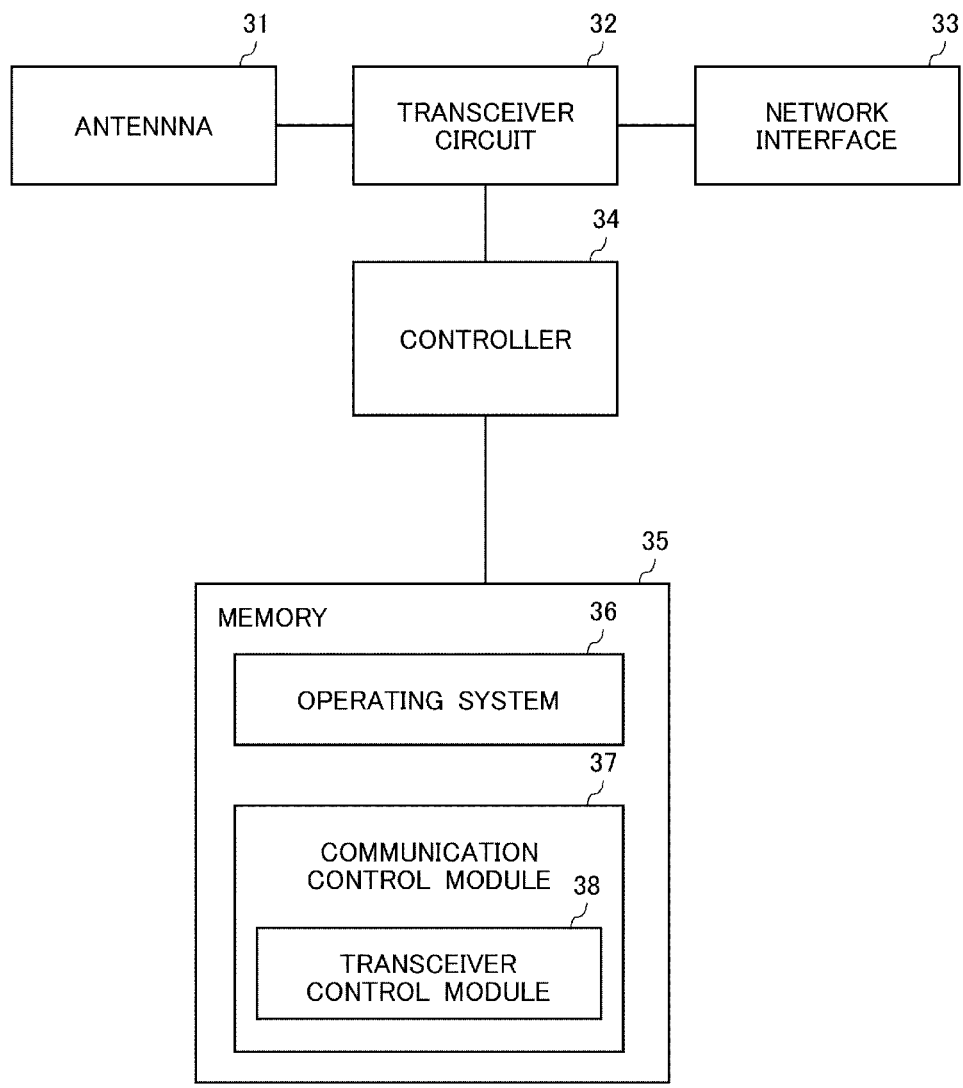
FIG. 32 is a block diagram illustrating an RAN node according to an embodiment of the present disclosure.

FIG. 32 shows main components of an exemplary (R)AN node, for example a base station ('eNB' in LTE, 'gNB' in 5G) according to an embodiment of the present disclosure. As shown, the (R)AN node 30 includes a transceiver circuit 32 which is operable to transmit signals to and to receive signals from connected UE(s) via one or more antenna 31 and to transmit signals to and to receive signals from other network nodes (either directly or indirectly) via a network interface 33. A controller 34 controls the operation of the (R)AN node 30 in accordance with software stored in a memory 35. For example, the controller 34 may be realized by Central Processing Unit (CPU). Software may be pre-installed in the memory 35 and/or may be downloaded via the telecommunication network or from a removable data storage device (RMD), for example. The software includes, among other things, an operating system 36 and a communications control module 37 having at least a transceiver control module 38.

The communications control module 37 (using its transceiver control sub-module) is responsible for handling (generating/sending/receiving) signalling between the (R)AN node 30 and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller 35 is also configured (by software or hardware) to handle related tasks such as, when implemented, UE mobility estimate and/or moving trajectory estimation.

AMF

Figure 33:
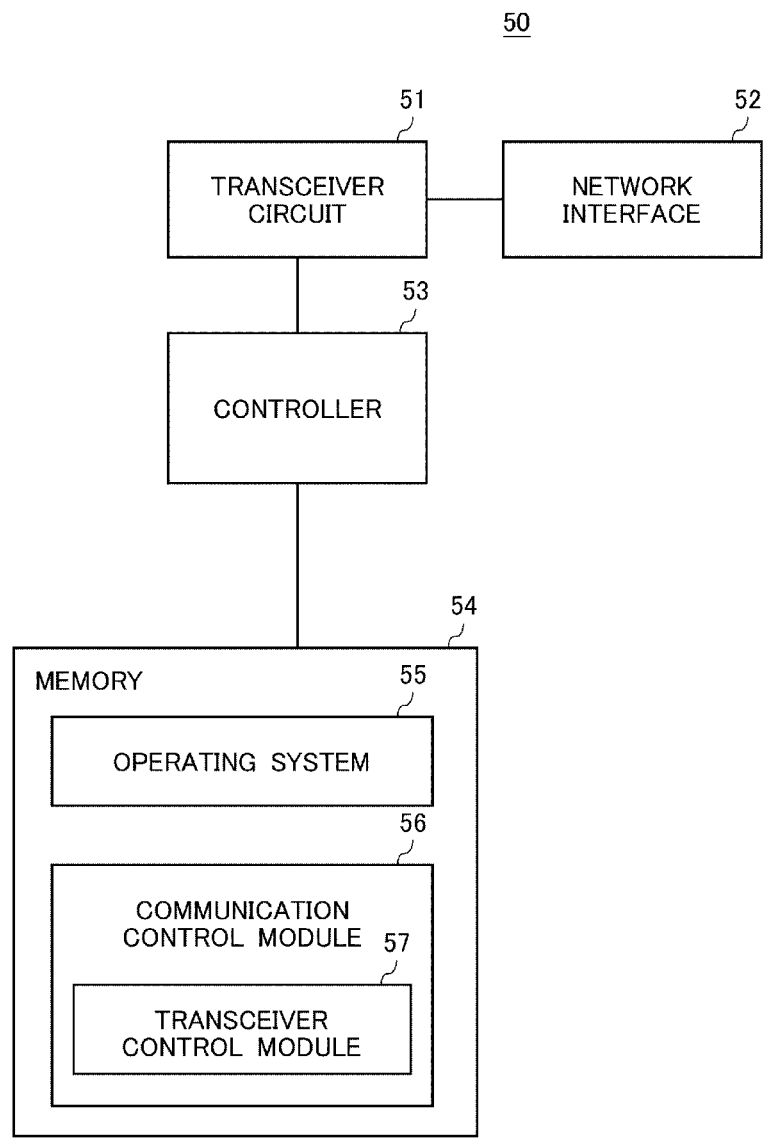
FIG. 33 is a block diagram illustrating a core network node according to an embodiment of the present disclosure.

FIG. 33 shows main components of an AMF according to an embodiment of the present disclosure. The AMF 50 is included in the 5GC. As shown, the AMF 50 includes a transceiver circuit 51 which is operable to transmit signals to and to receive signals from other nodes (including the UE) via a network interface 52. A controller 53 controls the operation of the AMF 50 in accordance with software stored in a memory 54. For example, the controller 53 may be realized by Central Processing Unit (CPU). Software may be pre-installed in the memory 54 and/or may be downloaded via the telecommunication network or from a removable data storage device (RMD), for example. The software includes, among other things, an operating system 55 and a communications control module 56 having at least a transceiver control module 57.

The communications control module 56 (using its transceiver control sub-module) is responsible for handling (generating/sending/receiving) signalling between the AMF and other nodes, such as the UE, base station/(R)AN node (e.g. "gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

As will be appreciated by one of skill in the art, the present disclosure may be embodied as a method, and system. Accordingly, the present disclosure may take the form of an entirely hardware embodiment, a software embodiment or an embodiment combining software and hardware aspects.

It will be understood that each block of the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. A general-purpose processor may be a microprocessor, but in the alternative, the processor may be any conventional processor, controller, microcontroller, or state machine. A processor may also be implemented as a combination of computing devices, e.g., a plurality of microprocessors, one or more microprocessors, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

The previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

For the purposes of the present document, the abbreviations given in NPL1 and the following apply. An abbreviation defined in the present document takes precedence over the definition of the same abbreviation, if any, in NPL1.

5GC 5G Core Network
5GS 5G System
5G-AN 5G Access Network
5G-GUTI 5G Globally Unique Temporary Identifier
5G S-TMSI 5G S-Temporary Mobile Subscription Identifier
5QI 5G QoS Identifier
AF Application Function
AMF Access and Mobility Management Function
AN Access Node
AS Access Stratum
AUSF Authentication Server Function
CM Connection Management
CP Control Plane
CSFB Circuit Switched (CS) Fallback
DL Downlink
DN Data Network
DNAI DN Access Identifier
DNN Data Network Name
EDT Early Data Transmission
EPS Evolved Packet System
EPC Evolved Packet Core
FQDN Fully Qualified Domain Name
GFBR Guaranteed Flow Bit Rate
GMLC Gateway Mobile Location Centre
GPSI Generic Public Subscription Identifier
GUAMI Globally Unique AMF Identifier
HR Home Routed (roaming)
I-RNTI I-Radio Network Temporary Identifier
LADN Local Area Data Network
LBO Local Break Out (roaming)
LMF Location Management Function
LRF Location Retrieval Function
MAC Medium Access Control
MFBR Maximum Flow Bit Rate
MICO Mobile Initiated Connection Only
MME Mobility Management Entity
N3IWF Non-3GPP Inter Working Function
NAI Network Access Identifier
NAS Non-Access Stratum
NEF Network Exposure Function
NF Network Function
NG-RAN Next Generation Radio Access Network
NR New Radio
NRF Network Repository Function
NSI ID Network Slice Instance Identifier
NSSAI Network Slice Selection Assistance Information
NSSF Network Slice Selection Function
NSSP Network Slice Selection Policy
PCF Policy Control Function
PEI Permanent Equipment Identifier
PER Packet Error Rate
PFD Packet Flow Description
PLMN Public land mobile network
PPD Paging Policy Differentiation
PPI Paging Policy Indicator
PSA PDU Session Anchor
QFI QoS Flow Identifier
QoE Quality of Experience
(R)AN (Radio) Access Network
RLC Radio Link Control
RM Registration Management
RQA Reflective QoS Attribute
RQI Reflective QoS Indication
RRC Radio Resource Control
SA NR Standalone New Radio
SBA Service Based Architecture
SBI Service Based Interface
SD Slice Differentiator
SDAP Service Data Adaptation Protocol
SEAF Security Anchor Functionality
SEPP Security Edge Protection Proxy
SMF Session Management Function
S-NSSAI Single Network Slice Selection Assistance Information
SSC Session and Service Continuity
SST Slice/Service Type
SUCI Subscription Concealed Identifier
SUPI Subscription Permanent Identifier
UDSF Unstructured Data Storage Function
UICC Universal Integrated Circuit Card
UL Uplink
UL CL Uplink Classifier
USIM Universal Subscriber Identity Module
UPF User Plane Function
UDR Unified Data Repository
URSP UE Route Selection Policy
SMS Short Message Service
SMSF SMS Function
MT Mobile Terminated
UAC Unified Access Control
ODACD Operator Defined Access Category Definitions
OS Operating System
EAP Extensible Authentication Protocol
AKA Authentication and Key Agreement
RFC Request for Comments
HMAC Hash-based Message Authentication Code
SHA Secure Hash Algorithm
UE User Equipment
IK Integrity Key
TS Technical Specifications
AUTN Authentication Token
IMSI International Mobile Subscriber Identity
UDM Unified Data Management
ARPF Authentication credential Repository and Processing Function
SMC Security Mode Command
gNB next generation NodeB
SIDF Subscriber Identity De-concealing Function
ME Mobile Equipment For example, all or some of the embodiments disclosed above can be described like in, but not limited to, the following supplementary notes.

(Supplementary Note 1)

A method for providing key derivation function, KDF, negotiation in a 5G network comprising:
 obtaining UE KDF information;
 selecting a specific KDF at a core network for at least one security related key derivation;
 transmitting, said selected KDF to the UE and to other network functions to indicate said selected KDF for generating a specific security key at a receiver side.

(Supplementary Note 2)

The method according to supplementary note 1, wherein a prioritized KDF list is generated by the core network based on UE subscriber information and a capability list of the core network.

(Supplementary Note 3)

The method according to supplementary note 1, wherein a serving network KDF capability is provided by the core network for the KDF selection for a serving network.

(Supplementary Note 4)

The method according to supplementary note 1, wherein a high priority in a KDF list is allocated to the most common KDF stored in the core network.

(Supplementary Note 5)

The method according to supplementary note 1, wherein said selected KDF transmitted from the core network to the UE and other network functions includes at least one KDF or a list of KDF with a priority set, wherein the core network selected KDF is indicated with highest priority in the list.

(Supplementary Note 6)

The method according to supplementary note 1, wherein the UE re-requests an alternate KDF from a selected list sent by the core network upon non-acceptance of the core network selected KDF by the UE or the receiving function.

(Supplementary Note 7)

The method according to supplementary note 1, further comprising indicating KDF capabilities by the UE upon non-agreement on the KDF indicated by the core network and requesting the core network to reselect the KDF from a commonly supported KDF.

(Supplementary Note 8)

A method for providing key derivation function, KDF, negotiation in a 5G network, comprising:
  transmitting, at least one UE KDF capability to a core network to support a KDF negotiation; and
  selecting a KDF to be used at a network function, NF, and the UE for deriving a similar security key using KDF capability of the at least one NF and at least one UE KDF capability;
  storing network KDF capability information upon non-availability of KDF capabilities at the core network;
  selecting at least one KDF based on the UE KDF capability, subscription information and the corresponding NF KDF capability;
  indicating the selected KDFs to a target NF and the UE;
  selecting, by the core network, a KDF for NAS security key generation based on the UE KDF capability and a network capability;
  negotiating the KDF, for AS security context generation, between the UE and a gNB;
  selecting, by the gNB, the UE KDF capability and the gNB capability; and
  storing, by the core network, the UE KDF capability and the network selected KDF indicated by the core network.

(Supplementary Note 9)

The method according to any one of supplementary notes 1 to 8, comprising:
  generating, a KDF MAC, by the UE;
  sending, the UE KDF, by the UE to the network, in a registration request message;
  replaying, at the UE and by the core network, a registration request (NAS) including security mode command message during KDF selection for a NAS security key;
  replaying, at the UE and by the core network, a registration request (AS) including security mode command message during KDF selection for an AS security key.

(Supplementary Note 10)

The method according to supplementary note 9, comprising:
  sending, UE KDF capability, from a source gNB to a target gNB to initiate KDF selection at the target gNB for AS security key derivation;
  selecting, a KDF, by the target gNB, based on the UE KDF capability and a target gNB KDF capability;
  verifying, by the target gNB, the UE KDF capability with core network;
  providing, by the core network, the UE KDF capability in an acknowledgement message upon an incorrect UE KDF sent by the UE;
  providing, by the core network, a selected KDF for AS security in a handover command message.

(Supplementary Note 11)

The method according to supplementary note 10, comprising:
  sending, by the source gNB, the UE KDF capability to the core network;
  sending, by the core network, the UE KDF capability to a target core network,
  wherein the target core network is configured to send the UE KDF capability to the target gNB;
  selecting, by the target core network, a KDF for NAS security key derivation based on core network KDF capability and the UE KDF capability.

(Supplementary Note 12)

The method according to supplementary note 11, comprising:
  sending, an ABBA parameter, to the UE by the core network;
  sending, the ABBA parameter, to the UE by the core network during KDF negotiation in a registration request message;
  replaying, ABBA parameter, between the UE and the network;
  selecting, a KDF, based on the ABBA parameter.

(Supplementary Note 13)

A user equipment for providing key derivation function (KDF) negotiation in a 5G network, comprising:
  a communication control module;
  an operating system;
  a controller; and a transceiver circuit;
  wherein the controller is configured to select a specific KDF for at least one security related key derivation;
  the controller is further configured to re-request an alternate KDF from a selected list sent by the core network; wherein
  the operating system of the UE is configured to re-negotiate KDF capabilities upon non-agreement on a KDF indicated by the network.

(Supplementary Note 14)

A network for providing key derivation function (KDF) negotiation with a UE, comprising:
  a communication control module;
  an operating system;
  a controller; and
  a transceiver circuit;
  wherein the communication control module is configured to acquire a specific KDF sent by the UE;
  the controller is configured to generate a prioritized KDF list based on UE subscriber information;
  the controller is further configured to provide a serving network KDF capability for the serving network;
  wherein a transceiver control module of the network is configured to transmit a selected KDF and a list of KDF with a priority set to the UE and other network functions, wherein the selected KDF indicates the highest priority in the list; and the transceiver control module is configured to receive a request requesting an alternate KDF from the UE and to re-negotiate with the UE, upon non-agreement on the selected KDF, to reselect a KDF from a commonly supported KDF stored in a memory of the network.

This application is based upon and claims the benefit of priority from Indian patent applications No. 201811041581, filed on Nov. 2, 2018, the disclosure of which is incorporated herein in its entirety by reference.

REFERENCE SIGNS LIST

10 UE
11 ANTENNA
12 TRANSCEIVER CIRCUIT
13 USER INTERFACE
14 CONTROLLER
15 MEMORY
16 OPERATING SYSTEM
17 COMMUNICATIONS CONTROL MODULE
18 TRANSCEIVER CONTROL MODULE
30 (R)AN NODE
31 ANTENNA
32 TRANSCEIVER CIRCUIT
33 NETWORK INTERFACE
34 CONTROLLER
35 MEMORY
36 OPERATING SYSTEM
37 COMMUNICATIONS CONTROL MODULE
38 TRANSCEIVER CONTROL MODULE
50 AMF
51 TRANSCEIVER CIRCUIT
52 NETWORK INTERFACE
53 CONTROLLER
54 MEMORY
55 OPERATING SYSTEM
56 COMMUNICATIONS CONTROL MODULE
57 TRANSCEIVER CONTROL MODULE

What is claimed is:

1. A target eNB connected to a target Access and Mobility Management Function (AMF) node, the target eNb comprising:
one or more memories storing instructions; and
one or more processors configured to process the instructions to control the target eNB to:
at N2 handover, using an N2 reference point, from a source eNB connected to a source AMF node to the target eNB node, receive, from the target AMF node, a handover request message including security capability information of a User Equipment (UE);
select information using the security capability information of the UE; and
send a handover request acknowledge message to the target AMF node so that the selected information is sent to the UE.

2. The target eNB according to claim 1, wherein the target AMF node receives the security capability information of the UE from a source AMF node.

3. The target eNB according to claim 1, wherein the security capability information of the UE includes UE Key Derivation Function (KDF) capabilities.

4. A communication method of a target eNB connected to a target Access and Mobility Management Function (AMF) node, the communication method comprising:
at N2 handover, using an N2 reference point, from a source eNB connected to a source AMF node to the target eNB, receiving, from the target AMF node, a handover request message including security capability information of a User Equipment (UE);
selecting information using the security capability information of the UE; and
sending a handover request acknowledge message to the target AMF node so that the selected information is sent to the UE.

5. The communication method according to claim 4, wherein the target AMF node receives the security capability information of the UE from the source AMF node.

6. The communication method according to claim 4, wherein the security capability information of the UE includes UE Key Derivation Function (KDF) capabilities.

7. A non-transitory computer-readable recording medium embodying a program, which when executed, causes a target eNB connected to a target Access and Mobility Management Function (AMF) node to perform a method comprising:
at N2 handover, using an N2 reference point, from a source eNB connected to a target AMF node to the target eNB node, receiving, from the target AMF node, a handover request message including security capability information of a User Equipment (UE);
selecting information using the security capability information of the UE; and
sending a handover request acknowledge message to the target AMF node so that the selected information is sent to the UE.

8. The non-transitory computer-readable recording medium according to claim 7, wherein the target AMF node receives the security capability information of the UE from the source AMF node.

9. The non-transitory computer-readable recording medium according to claim 7, wherein the security capability information of the UE includes UE Key Derivation Function (KDF) capabilities.

* * * * *